(12) United States Patent
Bedolla Pantoja et al.

(10) Patent No.: US 10,907,038 B2
(45) Date of Patent: Feb. 2, 2021

(54) TEMPLATED SYNTHESIS OF SHAPE-CONTROLLED POLYMERIC NANOFIBERS BY CHEMICAL VAPOR DEPOSITION (CVD) IN LIQUID CRYSTALS

(71) Applicants: THE REGENTS OF THE UNIVERSITY OF MICHIGAN, Ann Arbor, MI (US); WISCONSIN ALUMNI RESEARCH FOUNDATION, Madison, WI (US)

(72) Inventors: Marco A. Bedolla Pantoja, Fitchburg, WI (US); Nicholas L. Abbott, Madison, WI (US); Kenneth Cheng, Ann Arbor, MI (US); Joerg Lahann, Ann Arbor, MI (US)

(73) Assignees: THE REGENTS OF THE UNIVERSITY OF MICHIGAN, Ann Arbor, MI (US); Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 16/093,570

(22) PCT Filed: Apr. 14, 2017

(86) PCT No.: PCT/US2017/027764
§ 371 (c)(1),
(2) Date: Oct. 12, 2018

(87) PCT Pub. No.: WO2017/181108
PCT Pub. Date: Oct. 19, 2017

(65) Prior Publication Data
US 2019/0136033 A1    May 9, 2019

Related U.S. Application Data

(60) Provisional application No. 62/322,598, filed on Apr. 14, 2016.

(51) Int. Cl.
*C08L 25/18* (2006.01)
*B82Y 30/00* (2011.01)
(Continued)

(52) U.S. Cl.
CPC .............. *C08L 25/18* (2013.01); *B82Y 30/00* (2013.01); *C09D 133/00* (2013.01); *D01D 5/00* (2013.01);
(Continued)

(58) Field of Classification Search
CPC ... C08L 25/18; D01F 6/00; D01F 6/46; D01D 5/00; C09D 133/00; G02F 1/133711; G02F 1/13718; B82Y 30/00
(Continued)

(56) References Cited

U.S. PATENT DOCUMENTS

2008/0269456 A1* 10/2008 Lahann ................ C08G 61/025
528/212
2012/0171107 A1    7/2012 Chen et al.

FOREIGN PATENT DOCUMENTS

CN         102208653 A    10/2011
CN         102548896 A    7/2012
(Continued)

OTHER PUBLICATIONS

Bedolla Pantoja ("Design principles for functional liquid crystals", Marco A. Bedolla Pantoja, dissertation, published 2015 (Year: 2015).*
(Continued)

*Primary Examiner* — Michael P Wieczorek
*Assistant Examiner* — Michael G Miller
(74) *Attorney, Agent, or Firm* — Harness, Dickey & Pierce, P.L.C.

(57) ABSTRACT

Methods are provided for fabricating functional nanostructures (e.g., nanowires/nanofibers) via chemical vapor depo-
(Continued)

sition polymerization of paracyclophanes or substituted paracyclophanes onto and through a structured fluid, such as a film of liquid crystals, on a substrate. A one-step process is provided that does not require the use of any solid templates, nor does it require any volatile solvents, additives or catalysts. The resulting nanowires/nanofibers can be in the form of aligned nanowires/nanofibers arrays supported on any solid material, in the form of nanofibers mats supported on porous materials, or as individual free-standing nanowires/nanofibers. By using chiral liquid crystals, chiral nanofibers can be fabricated. The functional nanowires/nanofibers can contain one or more type of surface reactive groups that allows for post surface chemical modifications on the nanowires/nanofibers. Such nanostructures can be used in a range of different applications, including in biomedical applications.

25 Claims, 35 Drawing Sheets

(51) Int. Cl.
*D01F 6/00* (2006.01)
*D01D 5/00* (2006.01)
*C09D 133/00* (2006.01)
*D01F 6/46* (2006.01)
*G02F 1/1337* (2006.01)
*G02F 1/137* (2006.01)

(52) U.S. Cl.
CPC .................. *D01F 6/00* (2013.01); *D01F 6/46* (2013.01); *G02F 1/13718* (2013.01); *G02F 1/133711* (2013.01)

(58) Field of Classification Search
USPC .............................. 427/248.1–255.7, 162–169
See application file for complete search history.

(56) References Cited

FOREIGN PATENT DOCUMENTS

| | | |
|---|---|---|
| CN | 103193264 A | 7/2013 |
| CN | 103647104 A | 3/2014 |

OTHER PUBLICATIONS

Catalog Physical UW-Madison, https://search.library.wisc.edu/catalog/9912304370802121, accessed online Mar. 14, 2020 (Year: 2020).*
Catalog Online UW-Madison, https://search.library.wisc.edu/catalog/9912288057802121, accessed online Mar. 14, 2020 (Year: 2020).*
D. Huang et al ("Polyaniline nanowires by electropolymerization from liquid crystalline phases", Huang et al, J. Mater. Chem, 2002, 12, 388-391) (Year: 2002).*
E. Forney ("Controlled polymer nanostructure and properties through photopolymerization in lyotropic liquid crystal templates", Forney, Dissertation, University of Iowa, 2013) (Year: 2013).*
Bondarenko, Lidija. et al., "Cyclophanes. Part LII: Ethynyl[2.2]paracyclophanes—New Building Blocks for Molecular Scaffolding," Synthesis-Stuttgart, 16, pp. 2751-2759, Published online Jul. 10, 2004, DOI: 10.1055/s-2004-834872 (2004).
Lahann, Jörg et al., "Surface-Initiated Ring-Opening Polymerization of ε-Caprolactone from a Patterned Poly(hydroxymethyl-p-ylylene)," *Macromol. Rapid Comm.*, 22, pp. 968-971 (2001).
International Search Report and Written Opinion of the International Searching Authority issued in PCT/US2017/027764, dated Jul. 27, 2017; ISA/US.
Bedolla Pantoja, M.: "Design Principles for Functional Liquid Crystals", Doctor of Philosophy Thesis, University of Wisconsin Madison (2015) (embargoed for publication until after Dec. 2, 2016), pp. 1-184.
Hou, H. et al.: "Poly(p-xylylene) Nanotubes by Coating and Removal of Ultrathin Polymer Template Fibers", Macromolecules, vol. 35, Issue 7 (2002), pp. 2429-2431.
Lahann, J. et al.: "Novel Poly(p-xylylenes): Thin Films with Tailored Chemical and Optical Properties", Macromolecules, vol. 35, Issue 11 (2002), pp. 4380-4386.
Zeng, J. et al.: "Poly(vinyl alcohol) Nanofibers by Electrospinning as a Protein Delivery System and the Retardation of Enzyme Release by Additional Polymer Coatings", Biomacromolecules, vol. 6, Issue 3 (2005), pp. 1484-1488.
Extended European Search Report regarding European Patent Application No. 17783312.6, dated Dec. 10, 2019.
Office Action regarding Chinese Patent Application No. 201780031262.6, dated Sep. 2, 2020. Translation provided by Unitalen Attorneys at Law.
Akagi, K. et al., "Helical Polyacetylene Synthesized with a Chiral Nematic Reaction Field." Science, vol. 282, No. 5394, pp. 1683-1686 (Nov. 27, 1998).
Liang, Xiao et al., "A nano-structured and highly ordered polypyrrole-sulfur cathode for lithium-sulfur batteries." Journal of Power Sources, vol. 196, No. 16, pp. 6951-6955 (Aug. 15, 2011).
Ren, Hui et al., "Modified composition with templates." in: *Micron-Nanometers Energetic Materials*, 1st Edition, Beijing Institute of Technology Press, Beijing, pp. 369-370 (Apr. 30, 2015).

* cited by examiner (c)

(d)

A library of functional (–R) groups (e)

A

B

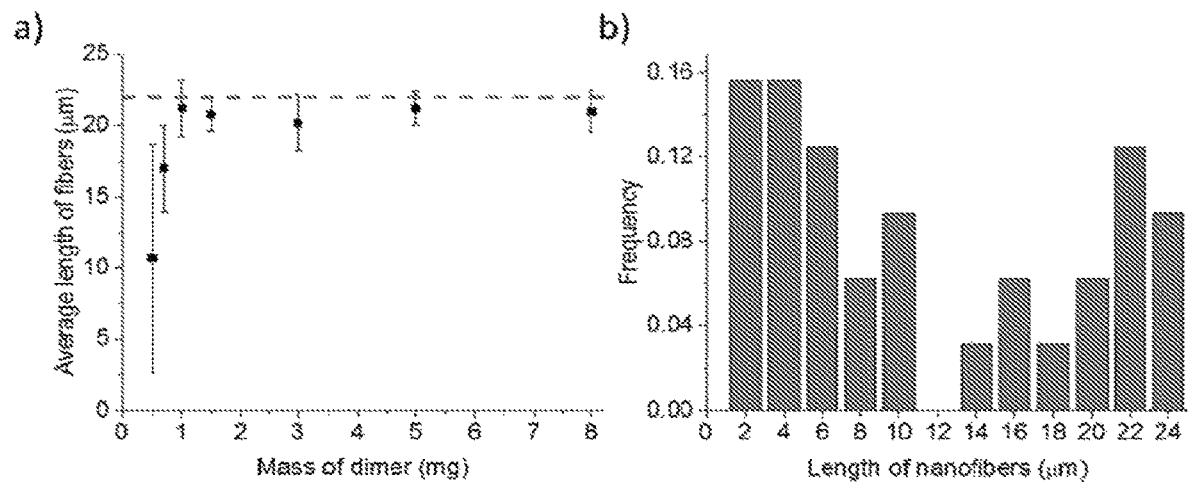
Figures 15A–15B
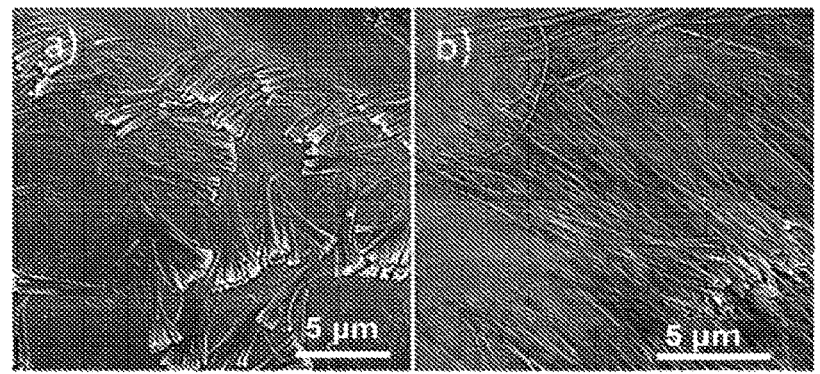
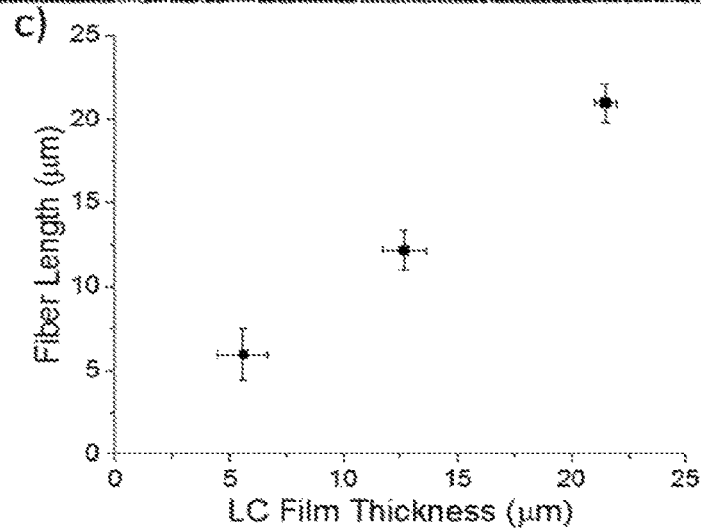
Figures 16A–16C

US 10,907,038 B2

TEMPLATED SYNTHESIS OF SHAPE-CONTROLLED POLYMERIC NANOFIBERS BY CHEMICAL VAPOR DEPOSITION (CVD) IN LIQUID CRYSTALS

CROSS-REFERENCE TO RELATED APPLICATIONS

This application is the U.S. National Phase Application under 35 U.S.C. 371 of International Application No. PCT/US2017/027764 filed on Apr. 14, 2017, which claims the benefit of U.S. Provisional Application No. 62/322,598, filed on Apr. 14, 2016. The entire disclosures of the above applications are incorporated herein by reference.

GOVERNMENT RIGHTS

This invention is made with government support under W911NF-11-1-0251 awarded by the Army Research Office. The Government has certain rights in the invention.

FIELD

The present disclosure relates to methods for templated synthesis of shape-controlled polymeric nanofibers by chemical vapor deposition conducted in a structured fluid.

BACKGROUND

This section provides background information related to the present disclosure which is not necessarily prior art.

Surfaces decorated with oriented arrays of fibers are ubiquitous in the natural world, because they can provide functionalities such as sensing (hair cells), thermal insulation (polar bear fur), enhanced mass transport (microtubules), extreme wetting behaviors (lotus leaves) and remarkable adhesive properties (gecko feet). Few synthetic methods exist, however, to fabricate organized arrays of surface-supported fibers to engineer comparable functionalities. Extrusion, electrospinning and fiber drawing are used widely to create functional materials based on polymeric fibers, but these approaches offer limited control over the size, shape, orientation and lateral organization of fibers on surfaces. It would be desirable for improved facile methods for forming polymeric nanofibers, including nanofiber arrays, which provide a high degree of control over orientation, size, chirality, and other desired properties of the nanofibers.

SUMMARY

This section provides a general summary of the disclosure, and is not a comprehensive disclosure of its full scope or all of its features.

In certain variations, the present disclosure provides a method of making a polymeric nanostructure, which may be a nanofiber. The method may comprise introducing at least one reactive monomer under reduced pressure into a reaction chamber having a substrate. A structured fluid is disposed over one or more exposed areas of the substrate. The at least one reactive monomer then polymerizes through the structured fluid onto the substrate to form the polymeric nanofiber on the substrate.

In one aspect, the method further comprises removing the structured fluid.

In one aspect, at least one of a shape, an orientation, or a chirality of the polymeric nanofiber is manipulated by modifying an orientation of the structured fluid.

In one aspect, the structured fluid assumes a liquid crystalline phase as the polymeric nanofiber is formed.

In one aspect, the structured fluid comprises thermotropic liquid crystals and at least one of a shape or an orientation of the polymeric nanofiber is manipulated by modifying a temperature of the structured fluid.

In one aspect, the polymeric nanofiber has a diameter of greater than or equal to about 50 nanometers (nm) to less than or equal to about 500 nanometers (nm) and a length of greater than or equal to about 200 nanometers (nm) to less than or equal to about 100 micrometers (μm).

In one aspect, the polymeric nanofiber is a plurality of nanofibers that form an array of aligned nanofibers on the substrate.

In one aspect, a thickness of the structured fluid is substantially equal to a length of the nanofiber formed.

In one aspect, the method further comprises reacting a reactive functional group on a surface of the polymeric nanofiber with a second reactive functional group on a moiety to conjugate the moiety to the surface.

In one aspect, the structured fluid comprises a liquid crystalline phase selected from the group consisting of: a nematic phase, a smectic phase, a C*-smectic phase, a blue phase, and combinations thereof.

In one aspect, the structured fluid comprises calamitic liquid crystals.

In one aspect, the structured fluid further comprises a chiral dopant to form a cholesteric liquid crystal, so that polymeric nanofiber exhibits chirality.

In one aspect, the reactive monomer is derived from a [2,2]-paracyclophane.

In a further aspect, the method further comprises sublimating a precursor comprising a substituted [2,2]-paracyclophane under vacuum. The method also comprises introducing the precursor into a heat source having a temperature of greater than or equal to about 500° C. to less than or equal to about 800° C. to pyrolyze the precursor to form the at least one paracyclophane reactive monomer.

In one aspect, the reactive monomer is derived from a 1,4-xylylene.

In certain other variations, the present disclosure contemplates methods of making a plurality of polymeric nanofibers. In one variation, the method comprises introducing at least one paracyclophane reactive monomer into a chemical vapor deposition chamber. The at least one paracyclophane reactive monomer is deposited onto one or more regions of a surface of a substrate coated with a structured fluid, so as to conduct anisotropic polymerization of the one paracyclophane reactive monomer from the one or more regions of the substrate through the structured fluid. The method may further comprise removing the structured fluid to form a plurality of polymeric nanofibers on the one or more regions of the substrate.

In one aspect, the structured fluid comprises a liquid crystalline phase and at least one of a shape, an orientation, or a chirality of the plurality of polymeric nanofibers is manipulated by controlling a director profile of liquid crystals in the structured fluid.

In one aspect, the structured fluid comprises thermotropic liquid crystals and at least one of a shape or an orientation of the plurality of polymeric nanofibers is manipulated by modifying a temperature of the structured fluid.

In one aspect, the plurality of nanofibers has an average diameter of greater than or equal to about 50 nanometers (nm) to less than or equal to about 500 nanometers (nm) and a length of greater than or equal to about 200 nanometers (nm) to less than or equal to about 100 micrometers (μm).

In one aspect, the plurality of nanofibers forms an array of aligned nanofibers on the substrate.

In one aspect, a thickness of the structured fluid is substantially equal to an average length of the plurality of nanofibers formed.

In one aspect, the method further comprises reacting a reactive functional group on a surface of the plurality of polymeric nanofibers with a second reactive functional group on a moiety to conjugate the moiety to the respective surfaces.

In one aspect, the structured fluid comprises a liquid crystalline phase selected from the group consisting of: a nematic phase, a smectic phase, a C*-smectic phase, a blue phase, and combinations thereof.

In one aspect, the structured fluid further comprises a chiral dopant to form a cholesteric liquid crystal, so that polymeric nanofiber exhibits chirality.

In one aspect, the method further comprises sublimating a precursor comprising a substituted [2,2]-paracyclophane under vacuum. The method further includes introducing the precursor into a heat source having a temperature of greater than or equal to about 500° C. to less than or equal to about 800° C. to pyrolyze the precursor to form the at least one paracyclophane reactive monomer.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The drawings described herein are for illustrative purposes only of selected embodiments and not all possible implementations, and are not intended to limit the scope of the present disclosure.

FIGS. 1A-1E. FIG. 1A shows a schematic of a chemical vapor deposition (CVD) deposition system in which processes in accordance with certain aspects of the present disclosure may occur to form a polymeric nanostructure. FIG. 1B shows a detailed cross-sectional view of a substrate having a structured fluid disposed on a surface thereof that is disposed within the CVD reaction chamber shown in FIG. 1A. FIG. 1C shows a mechanism of chemical vapor deposition (CVD) polymerization of substituted [2,2]-paracyclophane into substituted poly(p-xylylene) (PPX-R), where R corresponds to —$CH_2OH$, —C≡CH, or —$H^3$. FIG. 1D shows a library of potential exemplary and non-limiting R groups for the substituted poly(p-xylylene) (PPX-R). FIG. 1E shows structures for representative substituted paracyclophane precursors that form substituted poly(p-xylylene) (PPX-R) reactive monomers, where R is a methoxy group for compound 1a and polymer 2a is formed therefrom, R is an ethynyl group for compound 1b and polymer 2b is formed therefrom, for compound 1c and polymer 2c, a mixture of two substituted poly(p-xylylene) (PPX-R) reactive monomers are provided where R is either a methoxy or an ethynyl group, and for compound 1d and polymer 2d that is formed therefrom, R is a hydrogen and is therefore substituted.

FIGS. 2A-2C. FIG. 2A shows a suitable liquid crystal material that may be used in the structured fluid: 4-pentyl-4'-cyanobiphenyl (5CB). FIG. 2B shows another suitable liquid crystal material that is a nematic mixture of cyanobiphenyls and terphenyls referred to as E7. FIG. 2C shows yet another suitable liquid crystal material that is a nematic mixture of halogenated biphenyls and terphenyls referred to as TL205. The numbers beside each compound in FIGS. 2B and 2C indicate the weight percent of the respective compound in the nematic mixture.

FIGS. 3A-3C. FIG. 3A shows a cross-sectional view of a schematic where polymer nanofibers are formed via CVD polymerization in a liquid crystal phase that is subsequently removed. FIG. 3B shows a scanning electron micrograph of an array of aligned polymer nanofibers formed. Scale is 1 micrometer. FIG. 3C shows a schematic of a main axis polymeric nanofiber formed in accordance with certain methods of the present disclosure where the orientation of the polymer chains aligns along the optical axis.

FIGS. 4A-4H. FIG. 4A shows frequency distribution of nanofiber diameters obtained by polymerizing 6 mg of compound 1a to form polymer 2a into distinct liquid crystals, namely 5CB (blue), E7 (green) and TL205 (red). The inset shows a typical TEM image of an individual fiber templated in 5CB. FIG. 4B shows nanofiber length as a function of the LC film thickness used during the polymerization process. Representative SEM images and FTIR spectra of FIGS. 4C, 4F showing polymer/compound 2b shown in inset of FIG. 4C, FIGS. 4D and 4G showing polymer/compound 2c shown in inset of FIG. 4D, and FIGS. 4E and 4H showing polymer/compound 2d shown in inset of FIG. 4E templated into TL205 liquid crystal. TL205 is removed prior to imaging and IR analysis. FIGS. 4F-4H show IR spectra of the nanofibers (red) compared to the corresponding polymer films synthesized without the LC phase (blue).

FIGS. 5A-5F. Templated synthesis in chiral media is shown. FIG. 5A shows a representative SEM image of resulting helical nanofiber bundles obtained from polymerization of compound 1a into a right-handed (top) and left-handed (bottom) cholesteric LC. All LCs are anchored on OTS-treated quartz slides and the LC phase is removed prior to imaging. Inset: PLM image of right-handed (top) and left-handed (bottom) cholesteric LC used as the template. FIG. 5B shows schematics of (top) right-handed and (bottom) left-handed cholesteric LCs (E7 with 5 wt. % chiral dopant). FIG. 5C shows high-magnification SEM image of the helical nanofibers obtained by polymerization of compound 1a into right-handed (top) and left-handed (bottom) cholesteric LC. FIG. 5D shows circular dichroism (CD) and UV-Vis absorption spectra of left-handed (blue) cholesteric, right-handed cholesteric (red) and non-cholesteric (grey) LCs (E7). FIG. 5E shows CD and UV-Vis absorption spectra of helical nanofiber bundles prepared by polymerization of compound 1a into right-handed cholesteric (red), left-handed cholesteric (blue) and non-cholesteric (grey) LCs. FIG. 5F shows CD and UV-Vis absorption spectra of respective nanofibers from FIG. 5E after removal from the surface and dispersion in methanol to ensure random alignment of the nanofibers.

FIGS. 6A-6P. Templated synthesis of multifunctional polymer nanofibers in complex geometries is shown. FIG. 6A shows CVD of compound 1a on an exterior surface of a glass tube coated with a 5.1±2.1 um thick layer of E7 (blue) and FIG. 6B shows SEM images of corresponding nanofibers formed in accordance with certain aspects of the present disclosure. FIG. 6C shows CVD of compound 1a on a luminal surface of a glass capillary coated with E7 and FIG. 6D shows SEM images ((3) indicates the region closest to the orifice). FIG. 6E shows CVD of compound 1a on a glass surface decorated with E7 microdroplets and FIG. 6F shows SEM images of the nanofiber assemblies formed on the microdroplets formed in accordance with certain aspects of the present disclosure. FIG. 6G shows CVD of compound 1a on a stainless steel (SS) mesh coated with E7 and FIG. 6H shows an SEM image of a suspended nanofiber film formed in openings thereof in accordance with certain aspects of the present disclosure. FIG. 6I shows an SEM image of nanofiber membrane spanning the tip of a glass capillary, which is initially intact, but is opened during microscopy revealing an ultrathin nanofiber array. FIG. 6J shows an immersion of microparticles into E7 prior to CVD and (FIGS. 6K and 6L) SEM images of microparticles decorated with nanofiber bundles formed in accordance with certain aspects of the present disclosure. FIG. 6M shows immobilization of (1) biotin-PEG-COOH via EDC chemistry, (2) azide-Alexafluor596 via Huisgen cycloaddition and (3) streptavidin-Alexafluor647 on nanofiber arrays (squares) containing hydroxymethyl and alkyne groups. Fluorescence Image confirming immobilization of azide-Alexafluor596 (FIG. 6N) and strepavidin-Alexafluor647 (FIG. 6O). FIG. 6P is an overlay of images of (FIG. 6N) and (FIG. 6O).

Figures 9A, 9B:
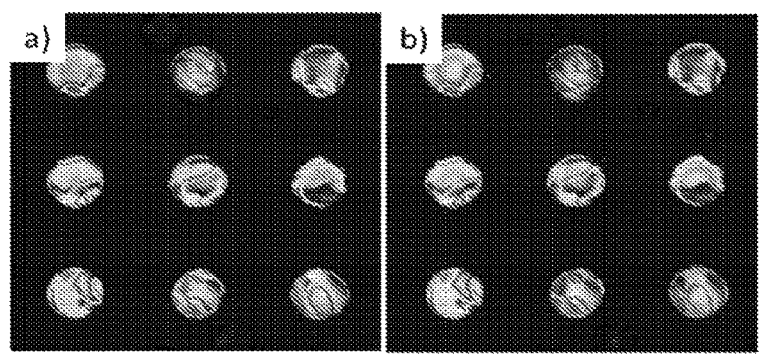

FIGS. 9A-9B. Films of E7 liquid crystal are shown before (FIG. 9A) and after (FIG. 9B) CVD polymerization. The LC films had thicknesses of 21.7±0.5 µm and diameters of 200 µm.

Figures 10A, 10B, 10C, 10D:
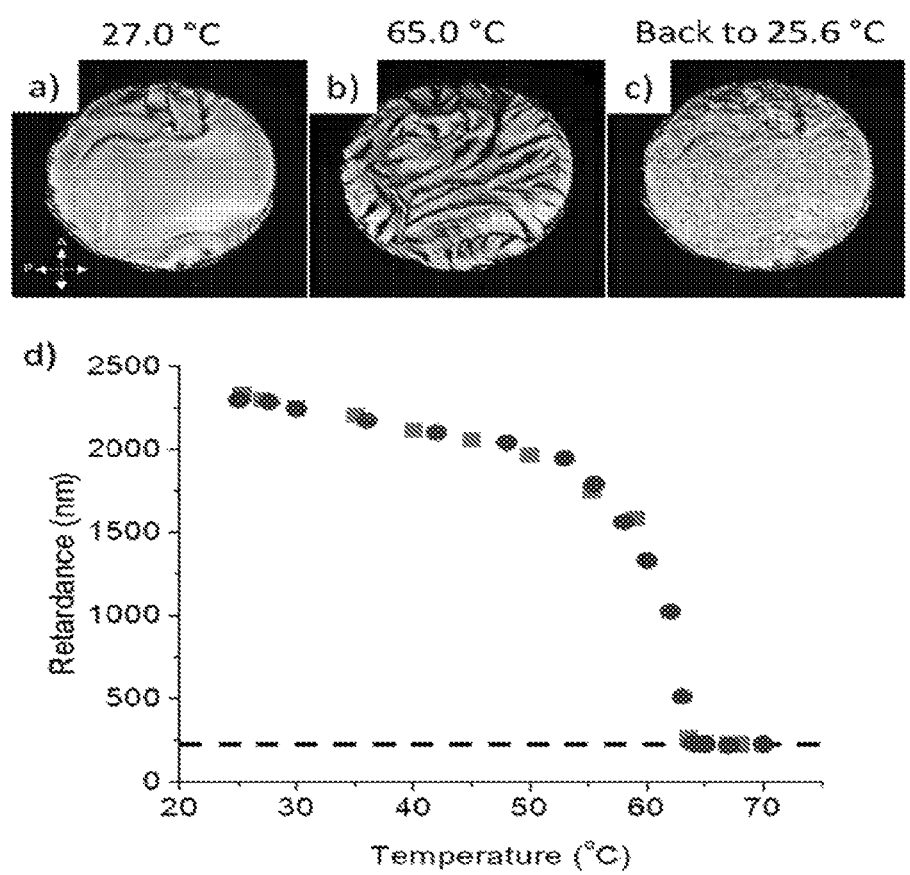

FIGS. 10A-10D. FIG. 10A shows a film of E7 liquid crystal after CVD polymerization at room temperature. FIG. 10B shows a film heated to 65° C., 5° C. above the clearing temperature of E7. Note the residual birefringence on the sample. FIG. 10C shows a film cooled back to room temperature recovers original retardance colors, but texture does not recover. FIG. 10D shows retardance measurements as a function of temperature on heating (red squares) and cooling (blue circles) for film depicted on FIGS. 10A-10C. Note that above 60° C., the retardance of the sample remains constant at 240 nm even after the film is heated to 70° C. The thickness of the film of E7 is 21.7±0.5 µm. The diameter of the film is 200 µm. The amount deposited on the LC film is 50 mg.

Figure 11:
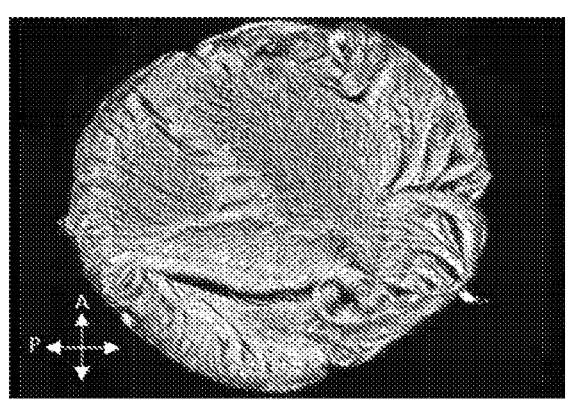

FIG. 11 shows an image of a birefringent structure remaining after removal of the LC. Bristle-like elements are apparent inside the grooves of the circular structure. The diameter of the circular structure was 200 µm.

Figures 12A, 12B:
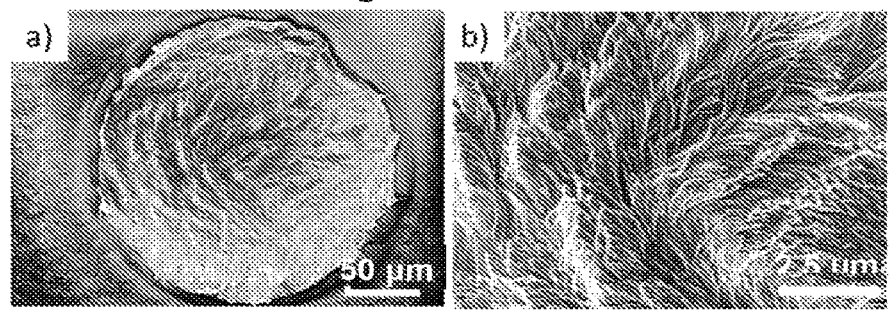

FIGS. 12A-12B. SEM images of a nanofiber mat created by deposition of PPX-CH$_2$OH into films of E7 formed in accordance with certain aspects of the present disclosure. FIGS. 12A and 12B are images of the same sample at different magnification levels (scale bar in FIG. 12A is 50 µm and in FIG. 12B is 1.5 µm). The thickness of the LC film is 21.7±0.5 µm.

Figures 13A, 13B, 13C, 13D:
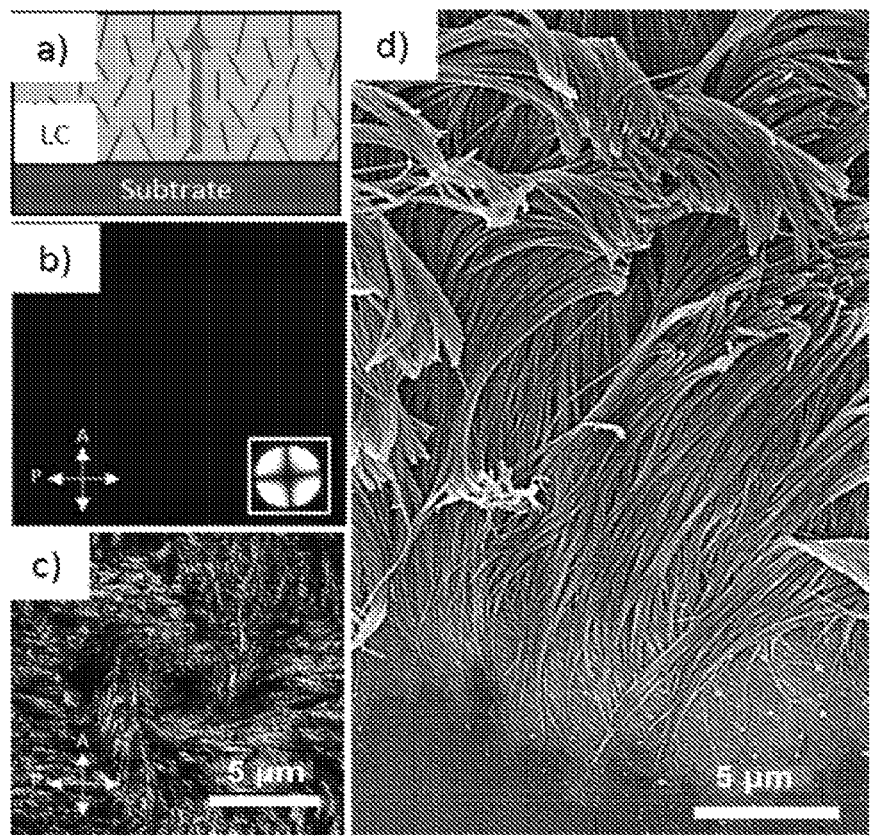

FIGS. 13A-13D. FIG. 13A is a schematic showing the alignment of the mesogens (black lines) within the LC film. The average director orientation is in the direction perpendicular to the substrate, as indicated by the arrow. FIG. 13B is an image of film of homeotropic-aligned E7 with a thickness of 21.7±0.5 µm viewed through cross polars. The orientation of the polarizer and analyzer is shown in the lower left corner of the image. The image obtained by conoscopic observation of the film is presented in the lower right corner. FIG. 13C is an image of a sample after CVD polymerization onto film of E7 and subsequent removal of the LC by immersion in ethanol. Mass of dimer used is 8 mg. FIG. 13D is an SEM image of mat of fibers. The fibers are anchored at the OTS-coated substrate (bottom) and extend into the vacuum (top).

Figures 14A, 14B:
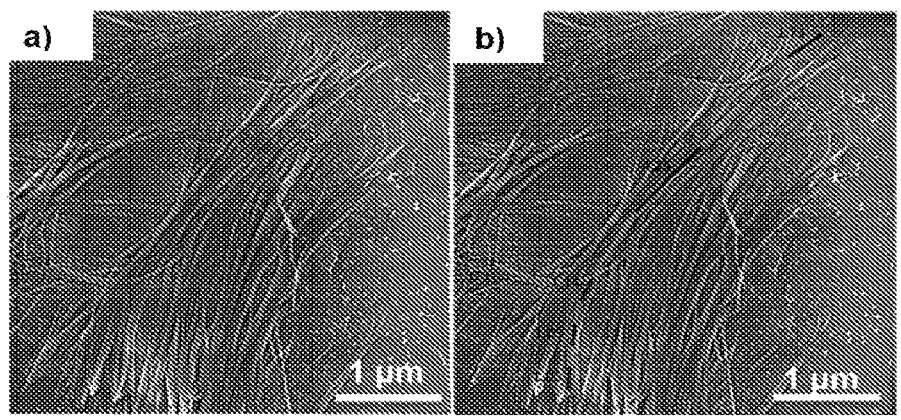

FIGS. 14A-14B. FIG. 14A is an SEM image of nanofibers laying on the substrate. FIG. 14B is an example of a technique used to measure the lengths of the fibers using ImageJ. Red and black segments delineate length of fiber. The measured length of the fiber in this example (sum of lengths of segments) is 21.3 µm. The sample corresponds to a fiber fabricated by CVD polymerization onto a film of E7 with thickness of 21.7±0.5 µm in accordance with certain aspects of the present disclosure. The mass of dimer used was 8 mg.

FIGS. 15A-15B. FIG. 15A shows a chart of length of fibers as a function of mass of dimer used during CVD onto films of E7 with thicknesses of 21.7±0.5 µm. For each data point about 30 to about 50 individual fibers are analyzed. The dotted line represents the average thickness of the LC films in the microwells. FIG. 15B shows frequency distribution of fiber lengths of a sample prepared from 0.5 mg of dimer during CVD polymerization.

FIGS. 16A-16C. FIGS. 16A-16B show images of nanofibers fabricated in accordance with certain aspects of the present disclosure into homeotropic E7 films with thicknesses of 5.6±1.1 (FIG. 16A) and 21.7±0.5 µm (FIG. 16B). The area enclosed by the dotted line highlights the fiber bundles of different lengths observed in each sample. FIG. 16C shows characterization of fiber lengths revealing a strong relationship between the lengths of the fibers and the LC film thicknesses.

Figures 17A, 17B, 17C:
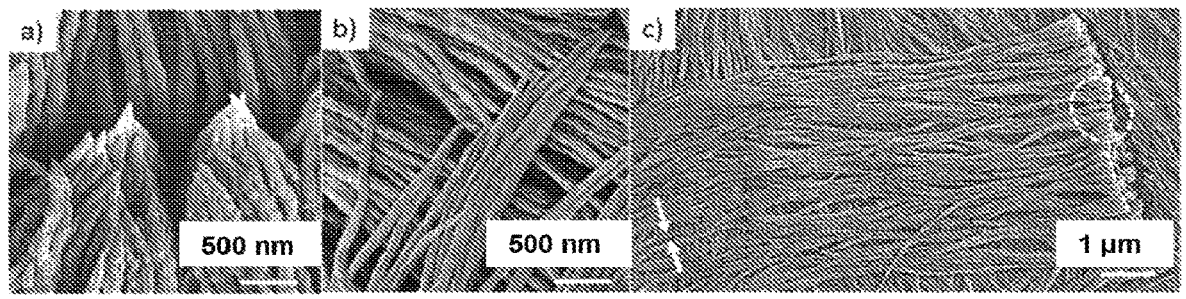

FIGS. 17A-17C. Images of fibers fabricated by CVD polymerization of PPX-CH$_2$OH into liquid crystals of 5CB (FIG. 17A), E7 (FIG. 17B), and TL205 (FIG. 17C) in accordance with certain aspects of the present disclosure. The fibers fabricated in TL205 exhibit an enlargement of their diameter at the end of the fiber (white dotted circle), as compared to the body of the fiber (white arrows).

Figure 18:
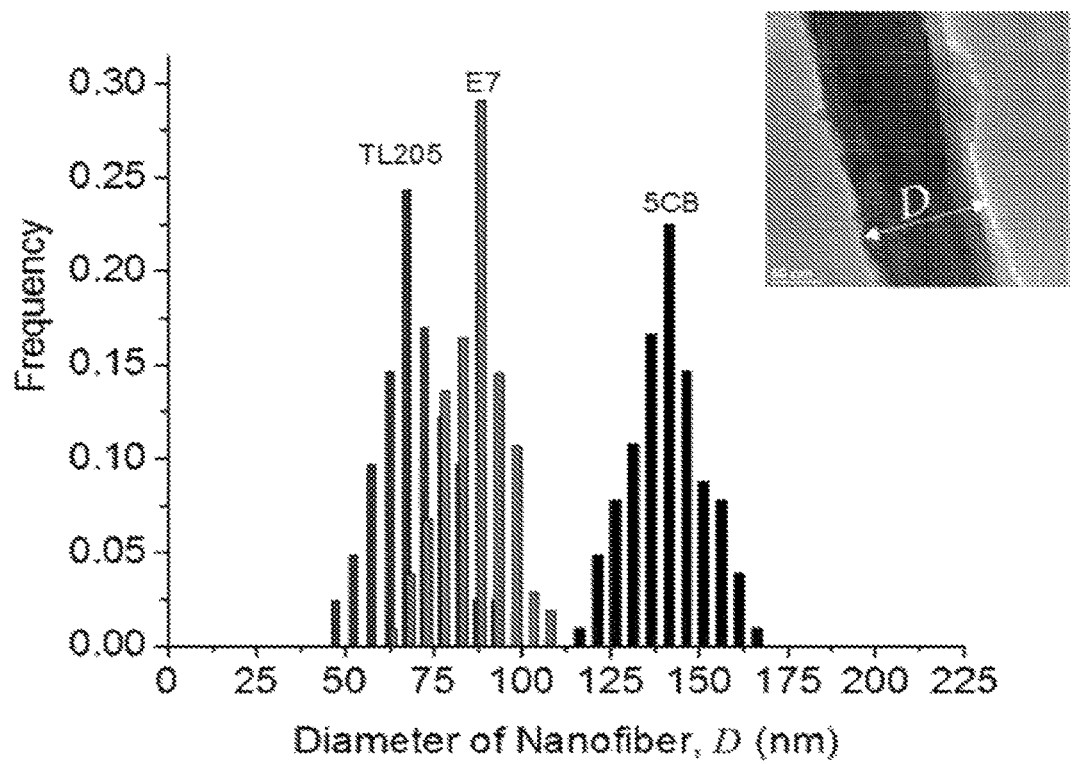

FIG. 18 shows frequency distribution of nanofiber diameters templated from 5CB (black), E7 (red) or TL205 (blue). The inset shows a TEM image of a fiber templated using E7. The average diameter for fibers made on 5CB, E7 and TL205 is about 141 nm, about 86 nm and about 67 nm, respectively. Diameter of fibers is measured from SEM images using ImageJ. (inset) TEM image of fiber obtained from CVD polymerization on 5CB. White double arrow shows the diameter, D, of the fiber.

Figures 19A, 19B, 19C, 19D, 19E:
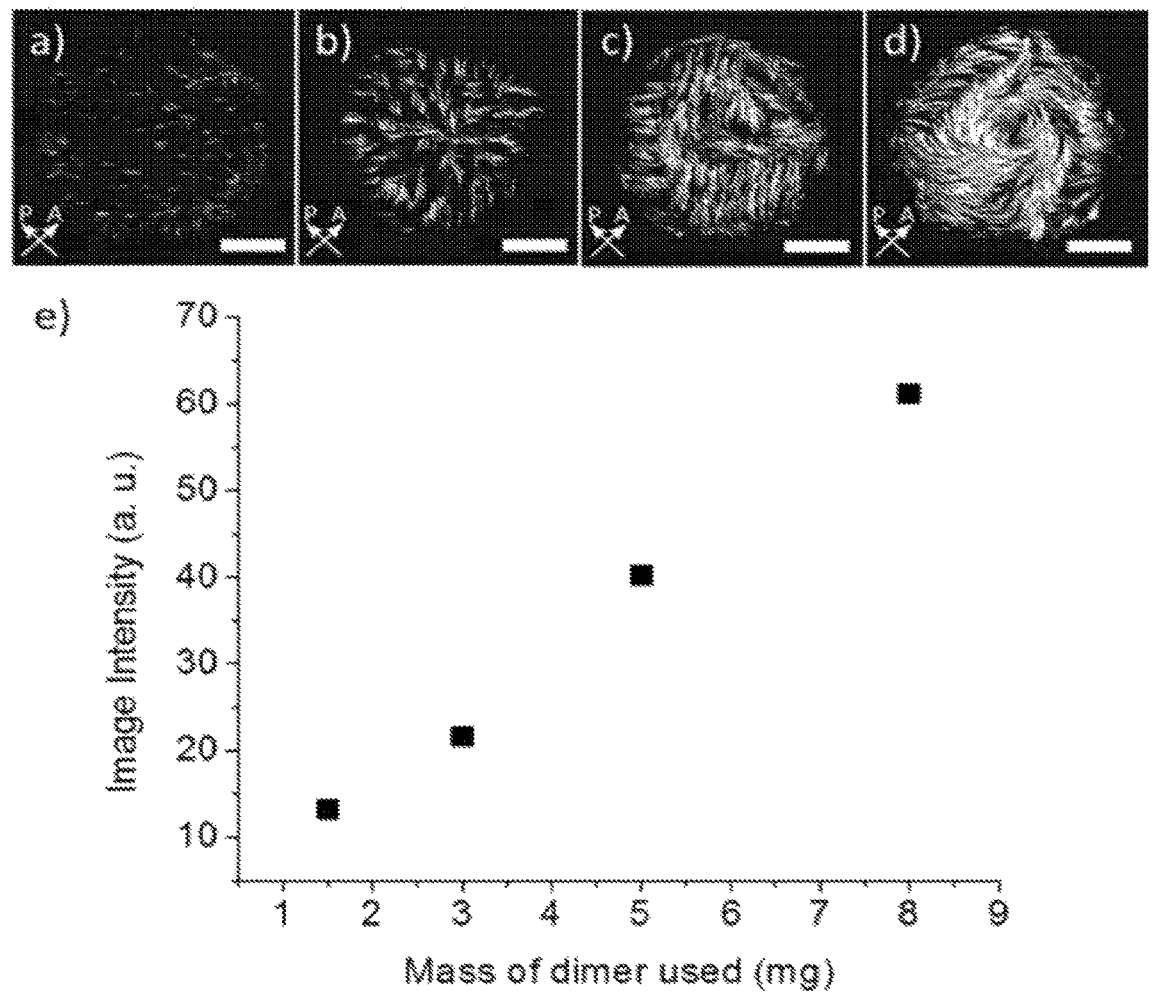

FIGS. 19A-19E. Crossed-polarized light microscopy images of fiber mats formed in accordance with certain aspects of the present disclosure by CVD polymerization onto films of E7 with homeotropic anchoring conditions. E7 is removed prior to imaging by submerging the sample in ethanol. The amount of the hydroxyl-substituted dimer introduced into the CVD chamber was different for each sample: (FIG. 19A) 1.5 mg, (FIG. 19B) 3 mg, (FIG. 19C) 5 mg, and (FIG. 19D) 8 mg. E7 is removed prior to imaging by submerging the sample in ethanol batch. Scale bars are 50 µm. The thickness of the LC films is 21.7±0.5 µm. FIG. 19E shows image intensity of images presented in FIGS. 19A-19D as a function of the mass of dimer using during CVD polymerization. Image intensity is measured using ImageJ.

Figures 20A, 20B, 20C, 20D:
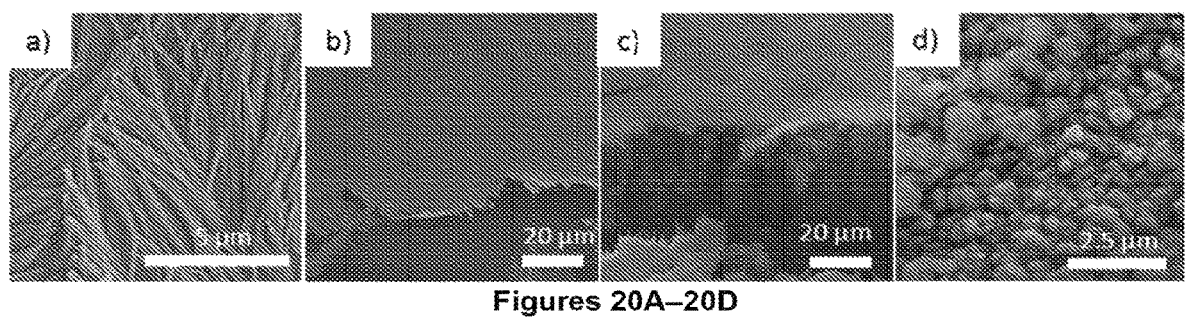

FIGS. 20A-20D. SEM images of structures created by deposition of PPX-CH$_2$OH onto different substrates in accordance with certain aspects of the present disclosure are shown for: FIG. 20A into nematic 5CB at 25° C., FIG. 20B into solid 5CB at 15° C., FIG. 20C into isotropic 5CB at 37° C. and FIG. 20D into isotropic silicone oil. The thickness of the liquid films is 21.7±0.5 µm. The mass of the dimer used during CVD is 10 mg.

Figures 21A, 21B:
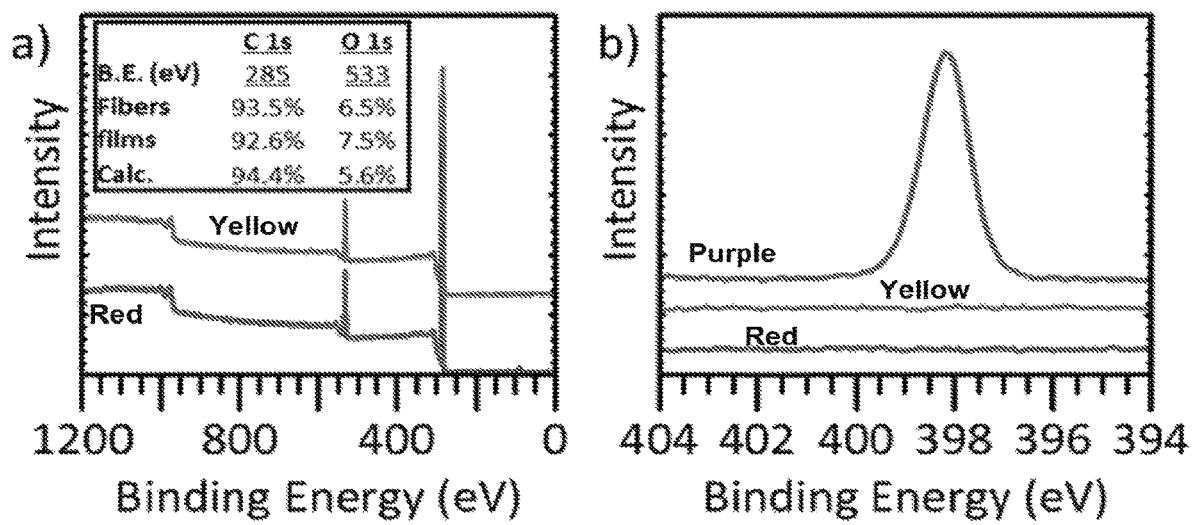

FIGS. 21A-21B. FIG. 21A shows X-ray photoelectron emission spectra of (yellow) nanofibers grown by polymerization of PPX-CH$_2$OH in 5CB in accordance with certain aspects of the present disclosure and (red) homogeneous film of PPX-CH$_2$OH deposited into a silicon wafer for comparison (no nanofiber formation). Note that the XPS spectra are identical in both cases and that only oxygen (533 eV) and carbon (285 eV) peaks are present, consistent with the chemical structure of PPX-CH$_2$OH. FIG. 21B shows XPS high resolution N1s spectra obtained on homogeneous film of PPX-CH$_2$NH$_2$ deposited onto a silicon wafer (purple), nanofibers grown by polymerization of PPX-CH$_2$OH in E7 in accordance with certain aspects of the present disclosure (yellow) and homogeneous film of PPX-CH$_2$OH deposited into a silicon wafer for comparison (red). The absence of a signal for nitrogen (398 eV) (present in the chemical structure of E7) indicates that the molecules of 5CB are not incorporated into the fibers.

Figure 22:
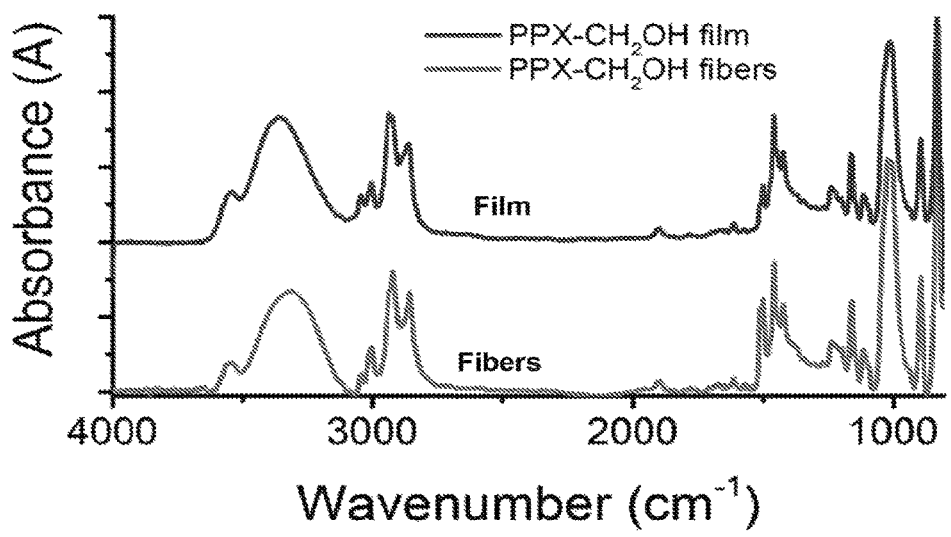

FIG. 22 shows FTIR Spectra of mats of fibers grown by CVD polymerization of PPX-CH$_2$OH onto a film of nematic 5CB (red) in accordance with certain aspects of the present disclosure. For comparison, the spectra of an unstructured, homogeneous film of PPX-CH$_2$OH are shown in blue.

Figures 23A, 23B:
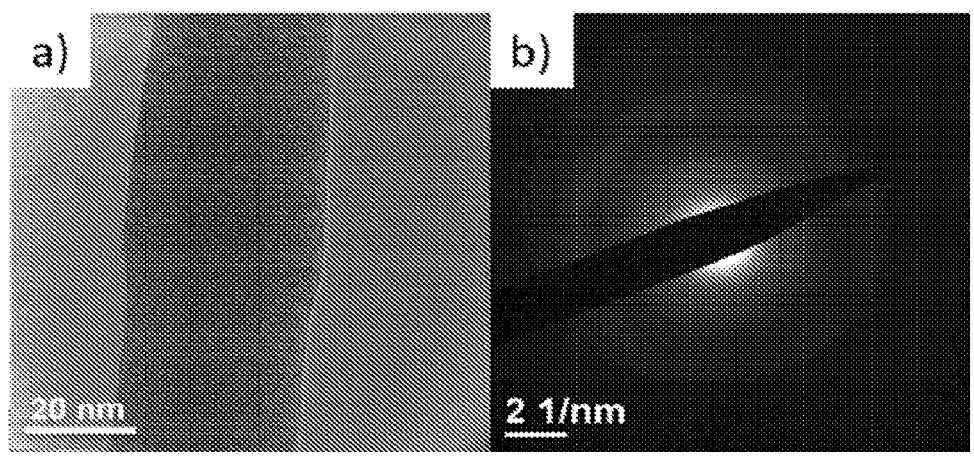

FIGS. 23A-23B. FIG. 23A shows a transmission electron microscope (TEM) image of an individual fiber prepared by deposition of PPX-CH$_2$OH into a film of E7. FIG. 23B shows an electron diffraction pattern, obtained by TEM from the fiber presented in FIG. 23A that indicates that the polymer in the fibers is amorphous.

Figures 24A, 24B, 24C:
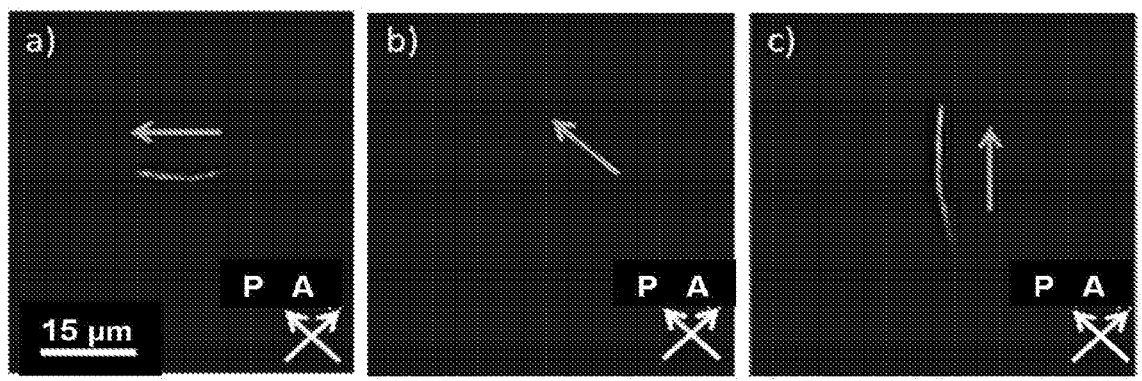

FIGS. 24A-24C. Crossed-polarized light microscopy images of single fibers formed in accordance with certain aspects of the present disclosure. When the orientation of the fiber is rotated, the fiber appears bright when not oriented along the polarizer or analyzer as shown in FIGS. 24A and 24C. In contrast, the fiber appears dark when oriented along the polarize direction as shown in FIG. 24B. Scale bar is 15 µm in all images.

Figures 25A, 25B, 25C, 25D:
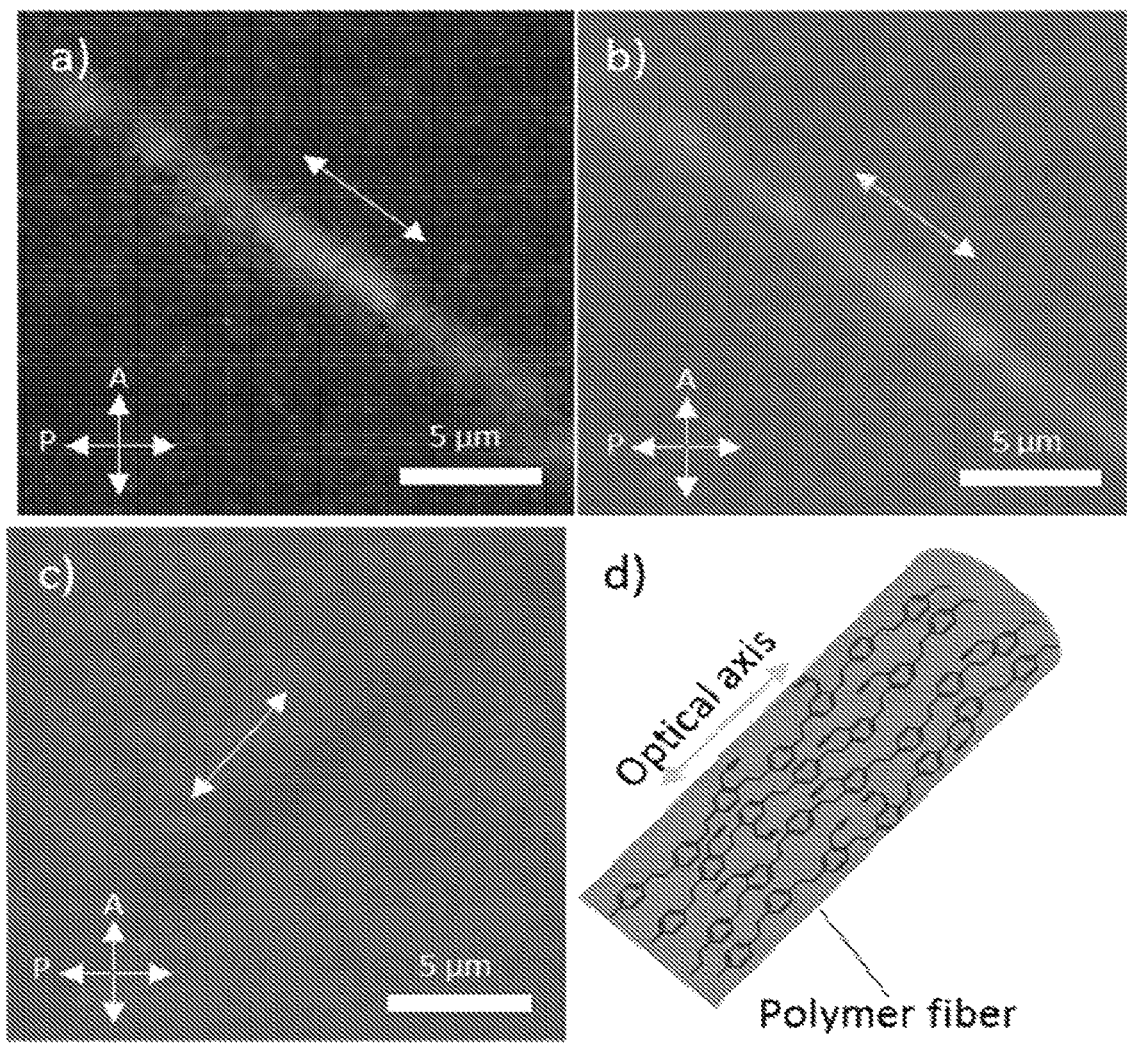

FIGS. 25A-25D. FIG. 25A is an image of polymer nanofiber observed by cross-polarized light microscopy. The orientation of the analyzer and polarizer is shown in the double-arrow cross at the bottom left corner of the image. FIG. 25B is an image of a polymer nanofiber viewed with a quarter wave plate and oriented perpendicular to the slow axis of the plate. The orientation of the slow axis of the plate is shown by the red double-arrow at the bottom left corner of the image. FIG. 25C is an image of polymer nanofiber viewed with a quarter wave plate and oriented parallel to the slow axis of the plate. FIG. 25D is a schematic of a representative polymer fiber showing the optical axis and the polymer chains within the fiber orient along the length of the fiber.

Figures 26A, 26B, 26C, 26D, 26E, 26F, 26G, 26H:
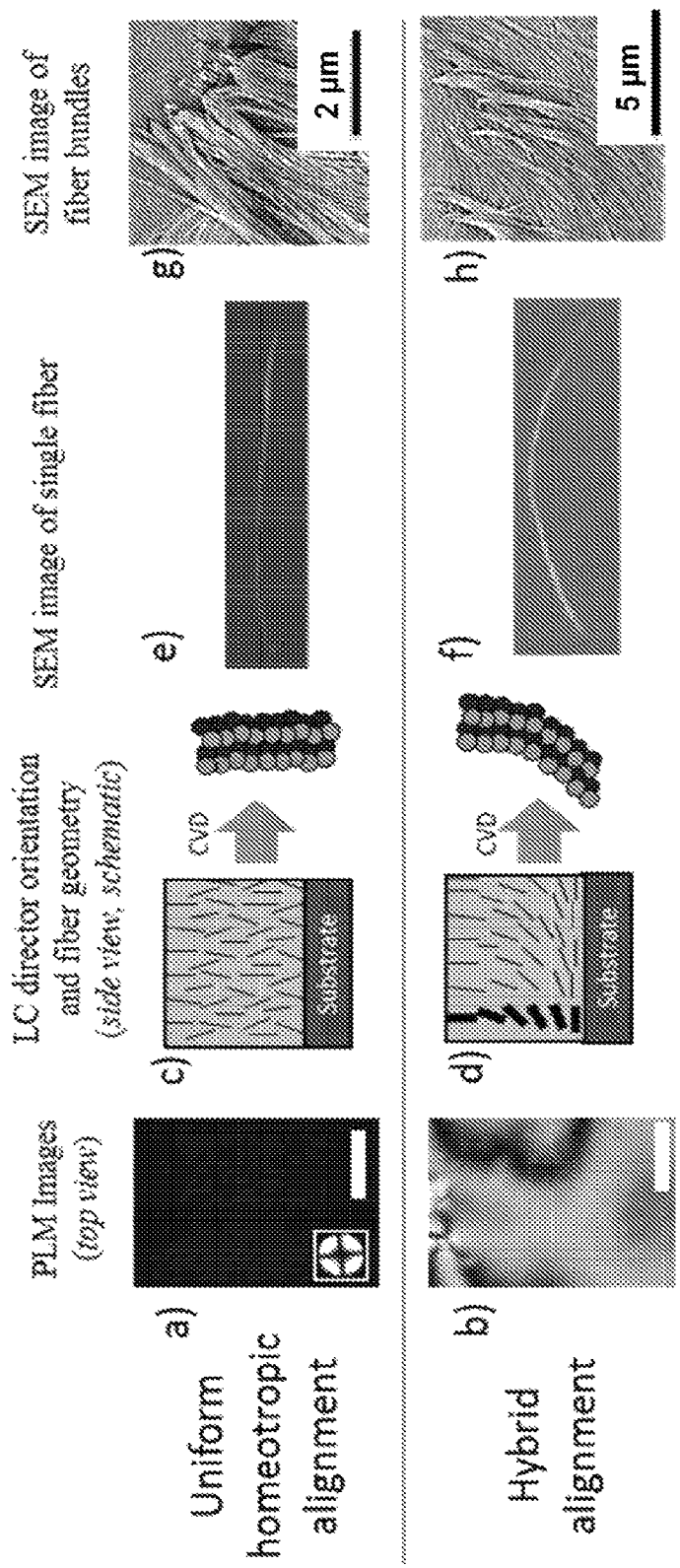

FIGS. 26A-26H. Control of fiber morphology via LC alignment is show. Polarized light microscope (PLM) images of E7 films with different director configurations: FIG. 26A shows nematic, uniform homeotropic alignment and FIG. 26B shows nematic, hybrid alignment. These films are supported on microwells with a thickness of 5.6±1.1 µm. Scale bar is 20 µm. In FIGS. 26C-26D, a director orientation of the different LC samples is shown in the schematics. In FIGS. 26E-26F, after CVD polymerization of PPX-CH$_2$OH onto these LC films, fibers with different geometries are obtained. FIGS. 26G-26H show bundles formed by several fibers formed by polymerization on the different LC films. The mass of dimer used during CVD polymerization is 1.5 mg.

Figures 27A, 27B:
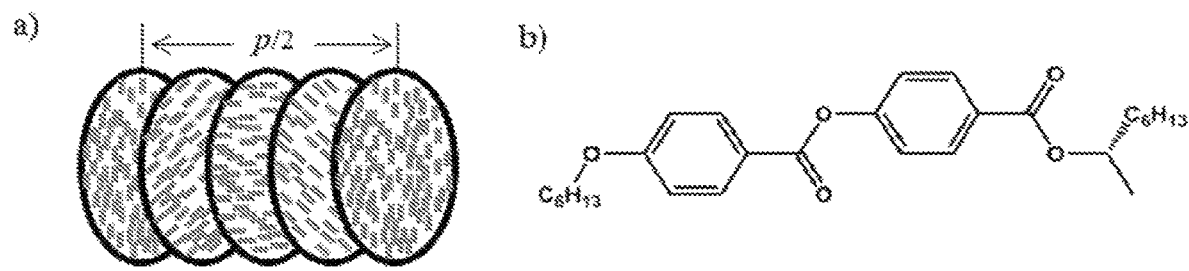

FIGS. 27A-27B. FIG. 27A shows an example of helical distortion of a director in a cholesteric LC. The pitch size of the helical twist is represented by p. The cylinders represent individual mesogens and the dark circles represent local regions within the bulk of the cholesteric. FIG. 27B shows a chemical structure of a chiral dopant 4-[[(2S)-2-octanyloxy] carbonyl] phenyl 4-(hexyloxy) benzoate (S-811).

Figures 28A, 28B, 28C, 28D:
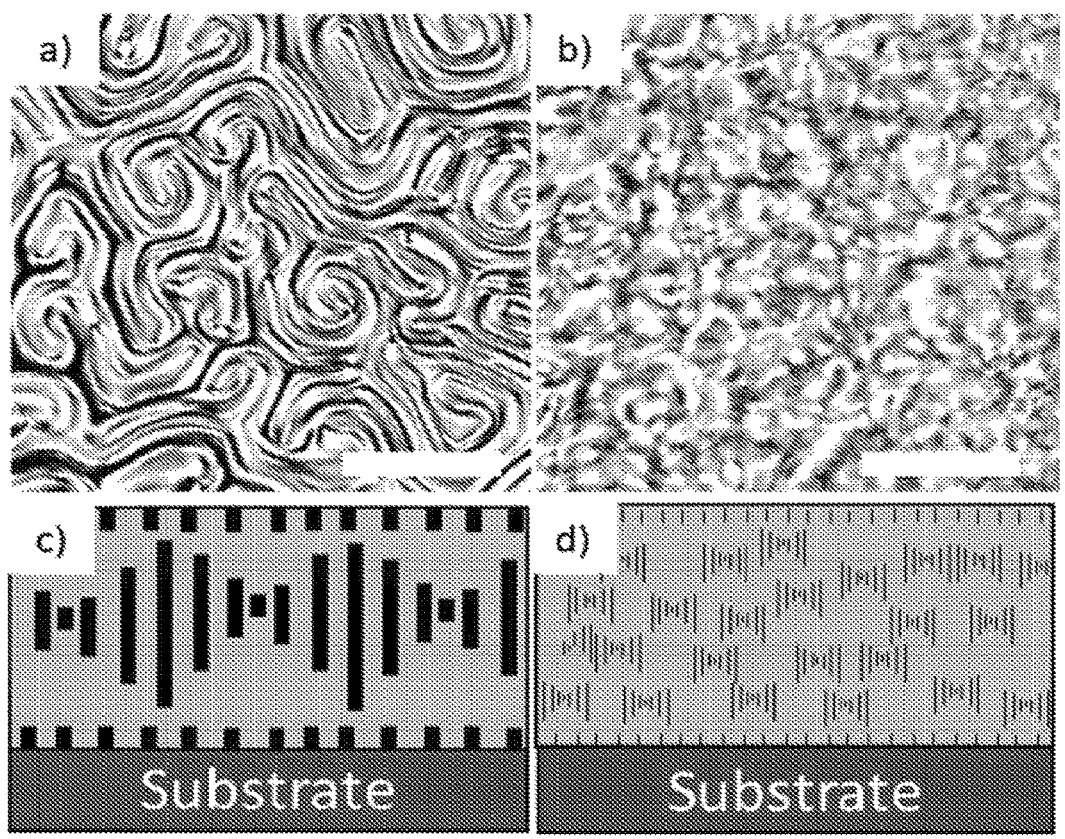

FIGS. 28A-28D. PLM images of cholesteric LC films formed by addition of 1.5 wt. % of a chiral dopant in E7 liquid crystal shown in FIG. 28A and 20 wt. % chiral dopant into E7 liquid crystal shown in FIG. 28B. The thickness of the LC films is 5.6±1.1 µm. Scale bar: 10 µm. FIG. 28C shows a schematic director profile in cholesteric LC with pitch size commensurate to film thickness. Black lines represent the local director orientation, which rotates in the direction parallel to the substrate. FIG. 28D shows a schematic director profile of a cholesteric film where the pitch is smaller than the thickness of the film.

Figures 29A, 29B, 29C, 29D:
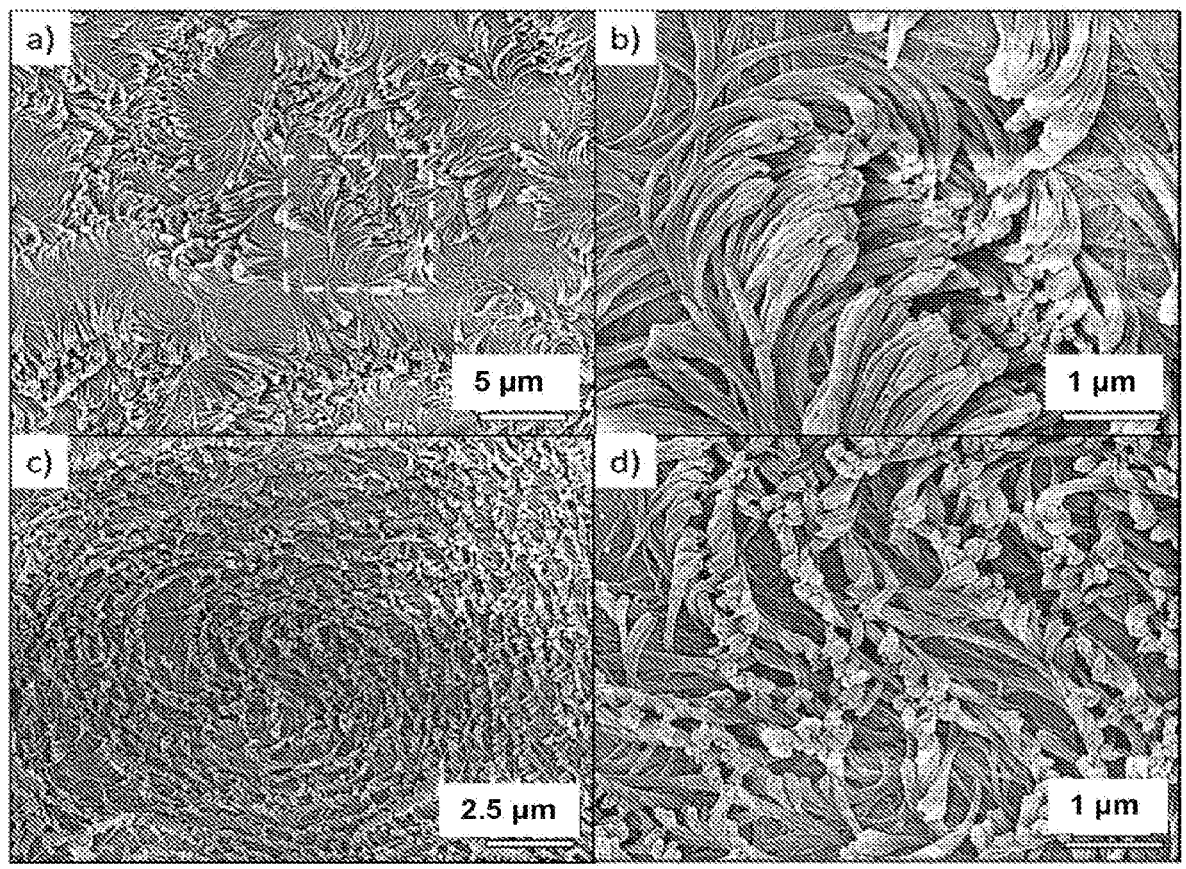

FIGS. 29A-29D. FIG. 29A shows low magnification and FIG. 29B shows high magnification SEM images of mats of fibers resulting from CVD polymerization into films of cholesteric LC containing 1.5 wt. % of S-811. A dotted box in FIG. 29A indicates the regions corresponding to the high magnification image shown in FIG. 29B. The red dashed line in FIG. 29B corresponds to the approximate width of the fiber assembly and has a length of 4.3 µm. FIG. 29C shows low magnification and FIG. 29D shows high magnification SEM images of mats of fibers resulting from CVD polymerization into films of cholesteric LC containing 20 wt. % S-811 in accordance with certain aspects of the present disclosure.

Figures 30A, 30B, 30C, 30D:
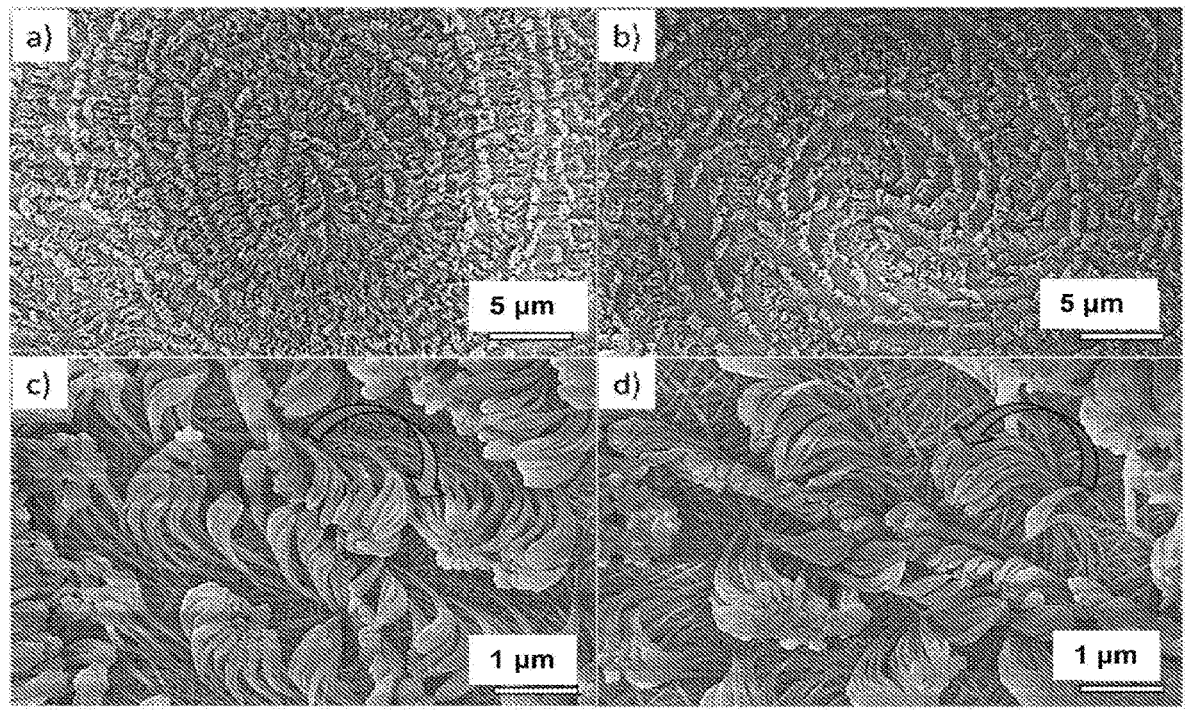

FIGS. 30A-30D. FIGS. 30A-30B are low magnification images of mats of nanofibers resulting from CVD polymerization onto cholesteric LCs containing 5 wt. % of S-811 (FIG. 30A) and R-811 (FIG. 30B) in accordance with certain aspects of the present disclosure. FIGS. 30C-30D show high magnification images of mats of nanofibers obtained from CVD polymerization onto cholesteric LCs containing S-811 (FIG. 30C) and R-811 (FIG. 30D). The blue and red arrows in FIGS. 30C and 30D, respectively, illustrate the bottom-to-top twist of the fiber assemblies. Images are obtained after extracting the LC with ethanol.

Figures 31A, 31B:
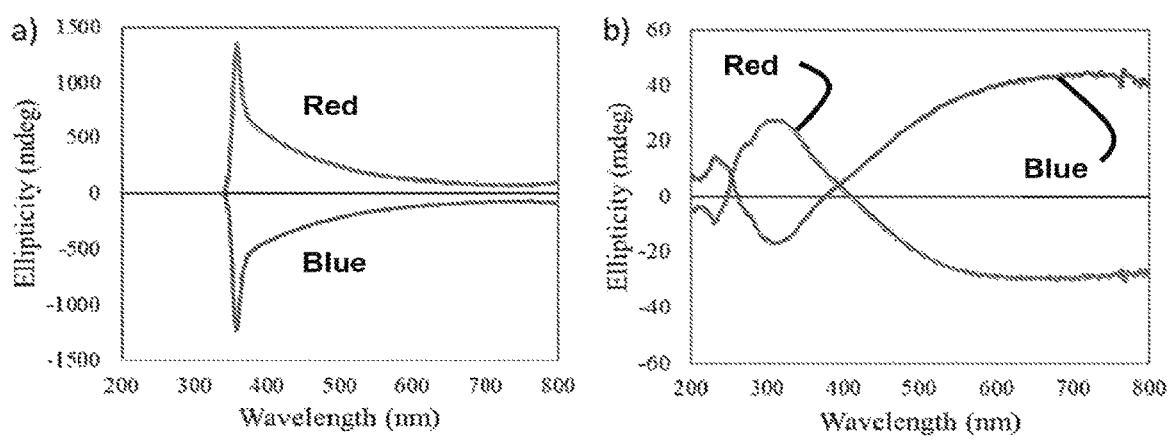

FIGS. 31A-31B. FIG. 31A shows circular dichroism (CD) spectra of cholesteric LC films containing 5 wt. % of S-811 (blue trace) or R-811 (red trace) chiral dopants. FIG. 31B shows CD spectra of mats of nanofibers resulting from CVD polymerization into cholesterics containing either S-811 (blue trace) or R-811 (red trace).

Figure 32:
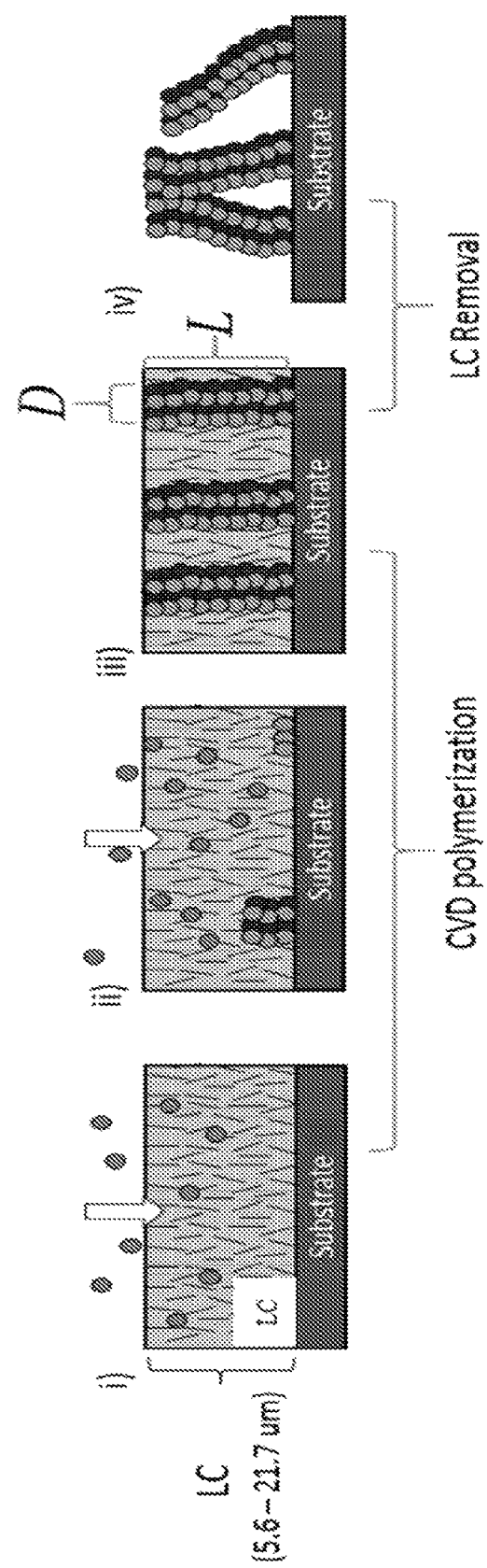

FIG. 32 shows a mechanism for polymerization of PPX in the anisotropic environment of LCs in accordance with certain aspects of the present disclosure including four steps (i)-(iv).

Figure 33:
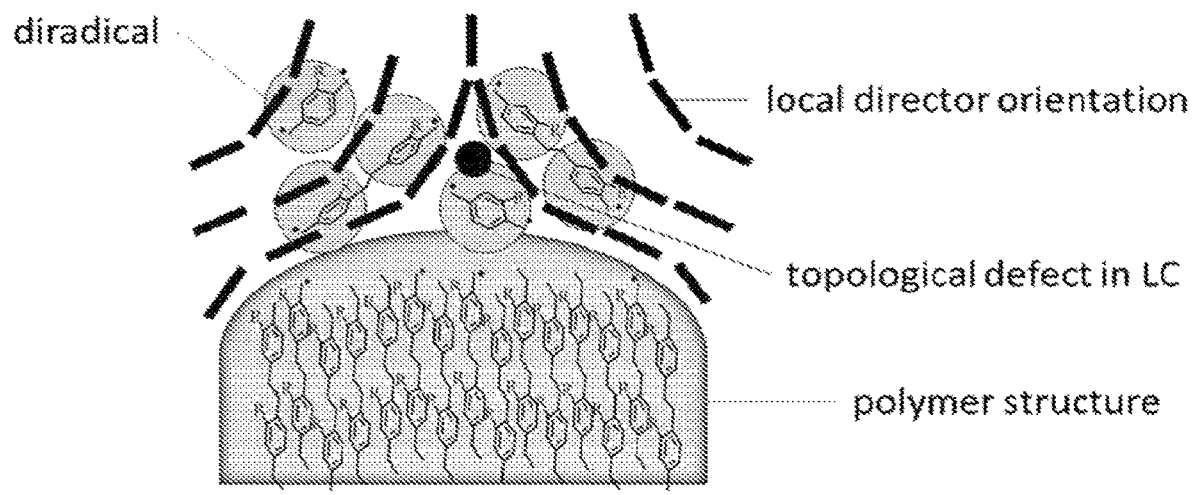

FIG. 33 shows a proposed mechanism of anisotropic polymerization of PPX in the environment of the LC. At an interface between the LC and the solid substrate, the growing polymer structure distorts the director orientation such that a topological defect is created. The elastic distortion in the LC around the core of the defect leads to preferential diffusion of the diradical monomer towards the top of the polymer structure.

Figures 34A, 34B, 34C, 34D:
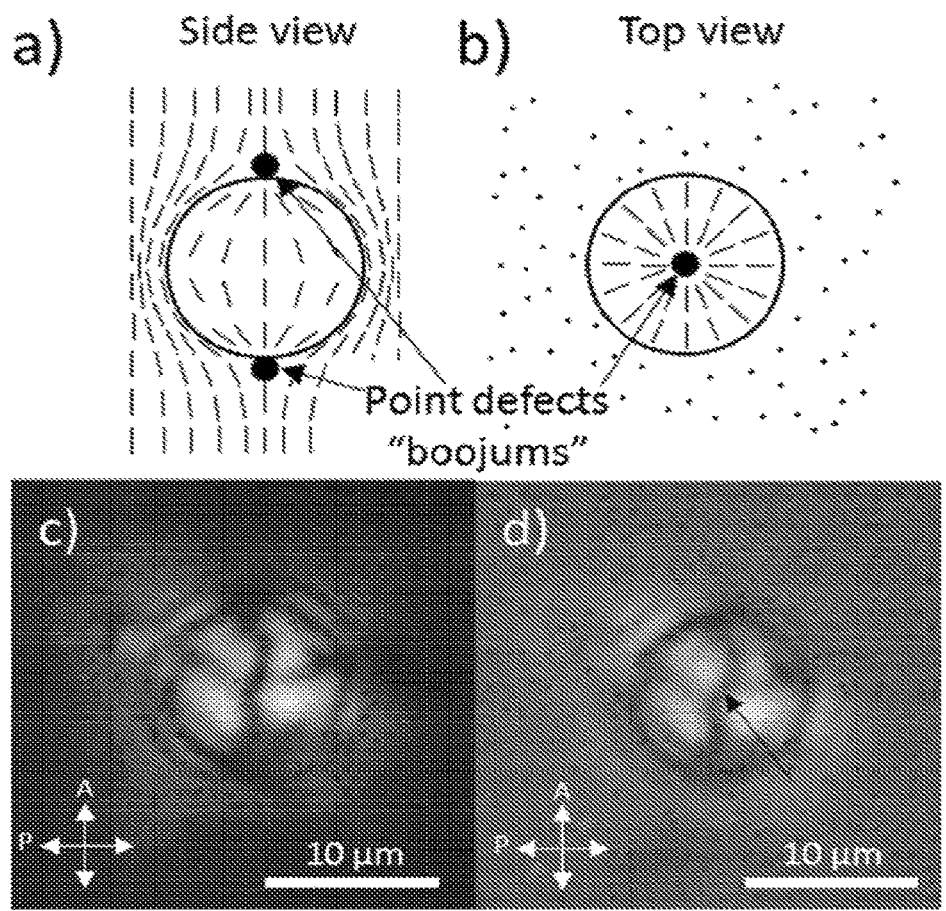

FIGS. 34A-34D. FIGS. 34A-34B show schematics of the orientation of an LC director around a particle and the formation of a pair of boojum defects (dark circles) within the LC at opposite poles of the particle. Black bars denote the local LC director orientation. FIG. 34C shows a PLM image of a polystyrene (PS) particle within a film of E7 supported on a substrate functionalized with OTS. A diameter of the particle is 10.0±0.2 µm and a thickness of LC film is approximately 18 µm. The orientation of analyzer (A) and polarizer (P) is the indicated by double arrows at the bottom left corner of the image. FIG. 34D shows an image of nanoparticle obtained using a quarter-wave plate. The red and blue colors denote the local LC director orientation around the PS particle. Black arrow indicates the expected location of the boojum defect in the LC atop the particle. The red arrow at the bottom left corner of the image indicates the orientation of the slow axis (γ) of the quarter-wave plate.

Figures 35A, 35B, 35C:
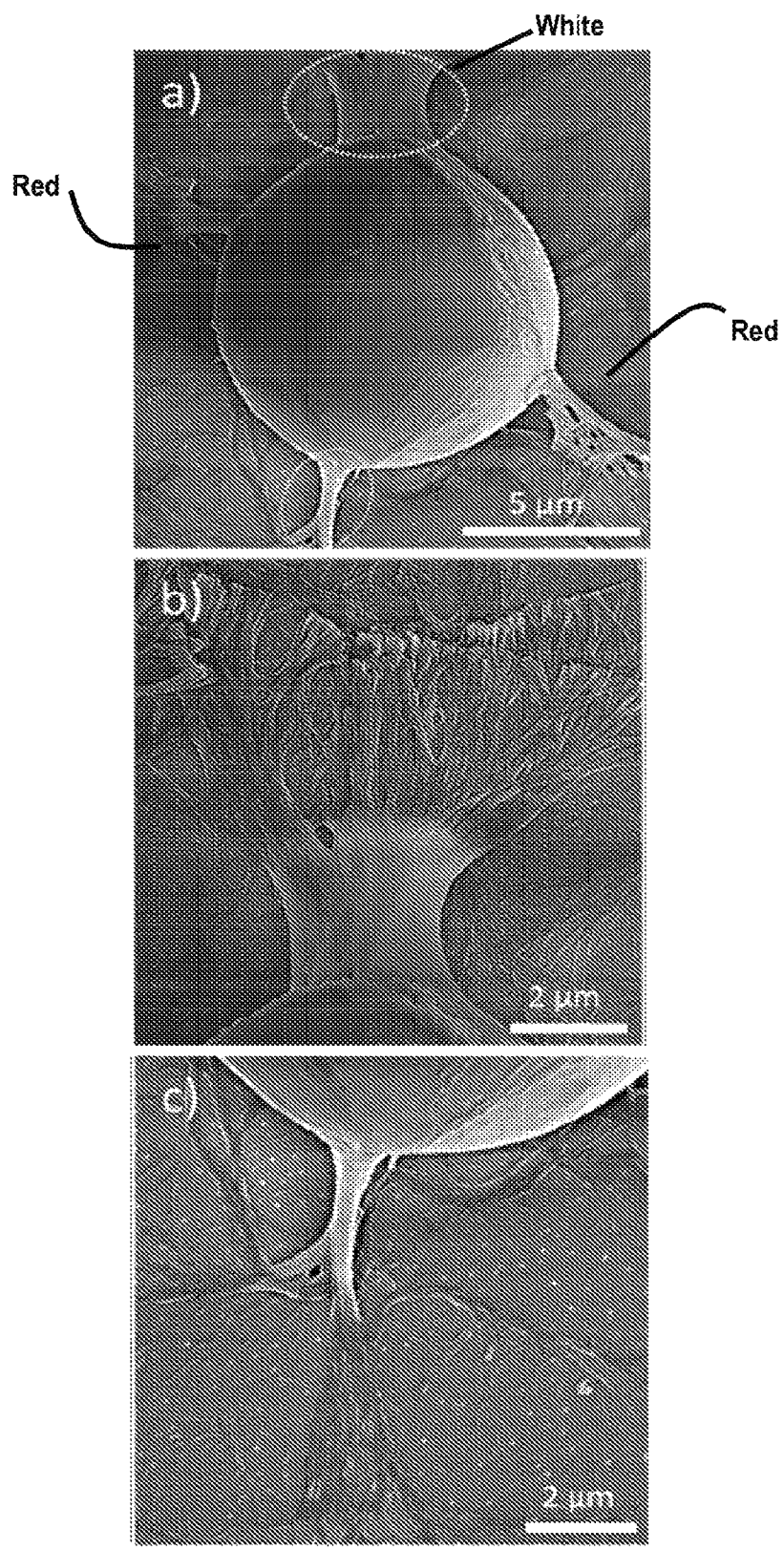
Figures 36A, 36B, 36C, 36D:
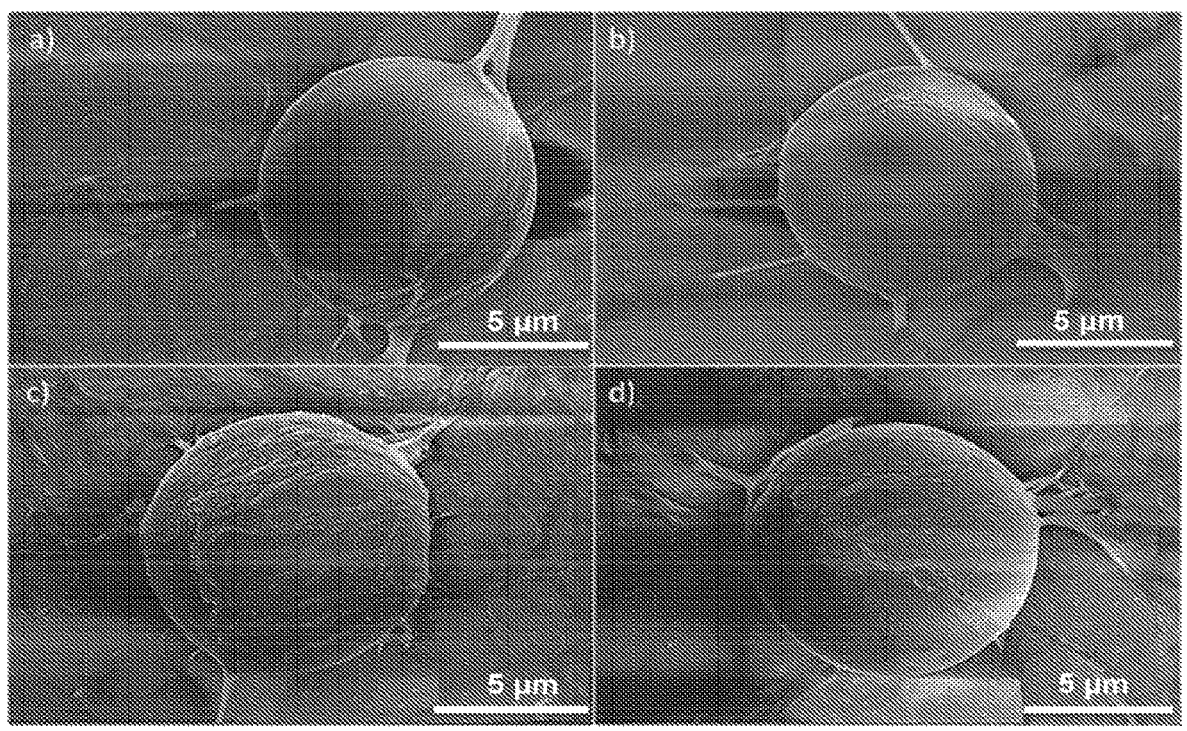

FIGS. 35A-35C. FIG. 35A shows an SEM image of a polystyrene (PS) particle after CVD polymerization of PPX-$CH_2OH$ onto particle-loaded LC and subsequent removal of the LC by evaporation. White dotted circles denote regions at opposite poles of the particle that coincide with the expected placement of "boojum" point defects in the LC. These regions contain elongated polymer structures that branch into thinner fibers. Red circles indicate other regions at opposite ends of the particle that also contain polymer structures. The scale bar is 5 µm. FIG. 35B shows a high magnification SEM image of polymer structure at top end of the particle, where the scale bar is 2 µm. FIG. 35C shows high magnification SEM images of a polymer structure at the bottom end of the particle, where the scale bar is 2 µm.

FIGS. 36A-36D. FIGS. 36A-36D show various SEM images of polystyrene particles observed after CVD polymerization onto particle-loaded LCs and subsequent removal of the LC by evaporation.

Figure 37:
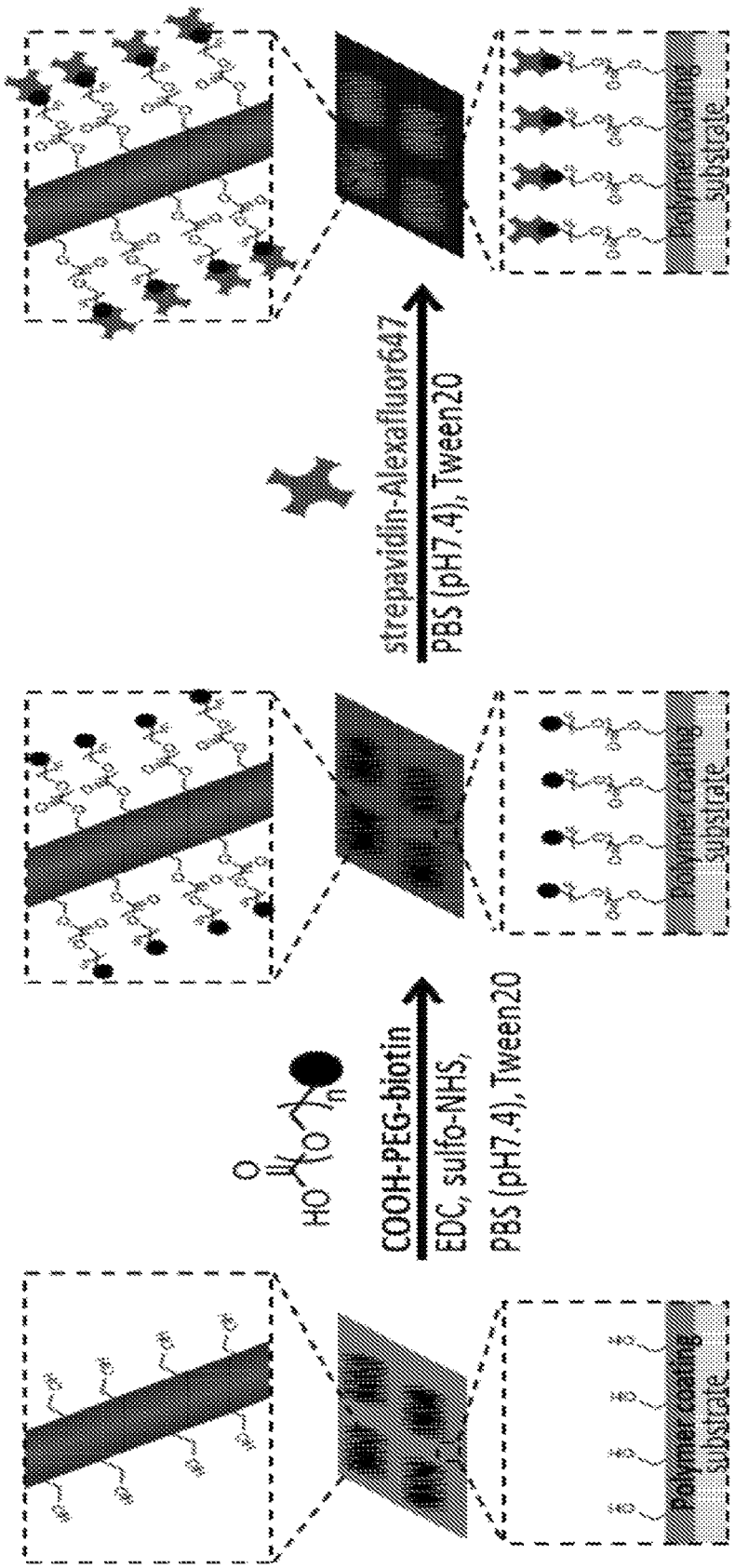

FIG. 37 shows an experimental scheme for treating surface of nanofibers formed in accordance with certain aspects of the present disclosure, where streptavidin-Alexafluor647 is conjugated on a surface patterned with PPX-$CH_2OH$ fibers (inside the square regions) and PPX-$CH_2OH$ film (outside the square regions).

Figures 38A, 38B:
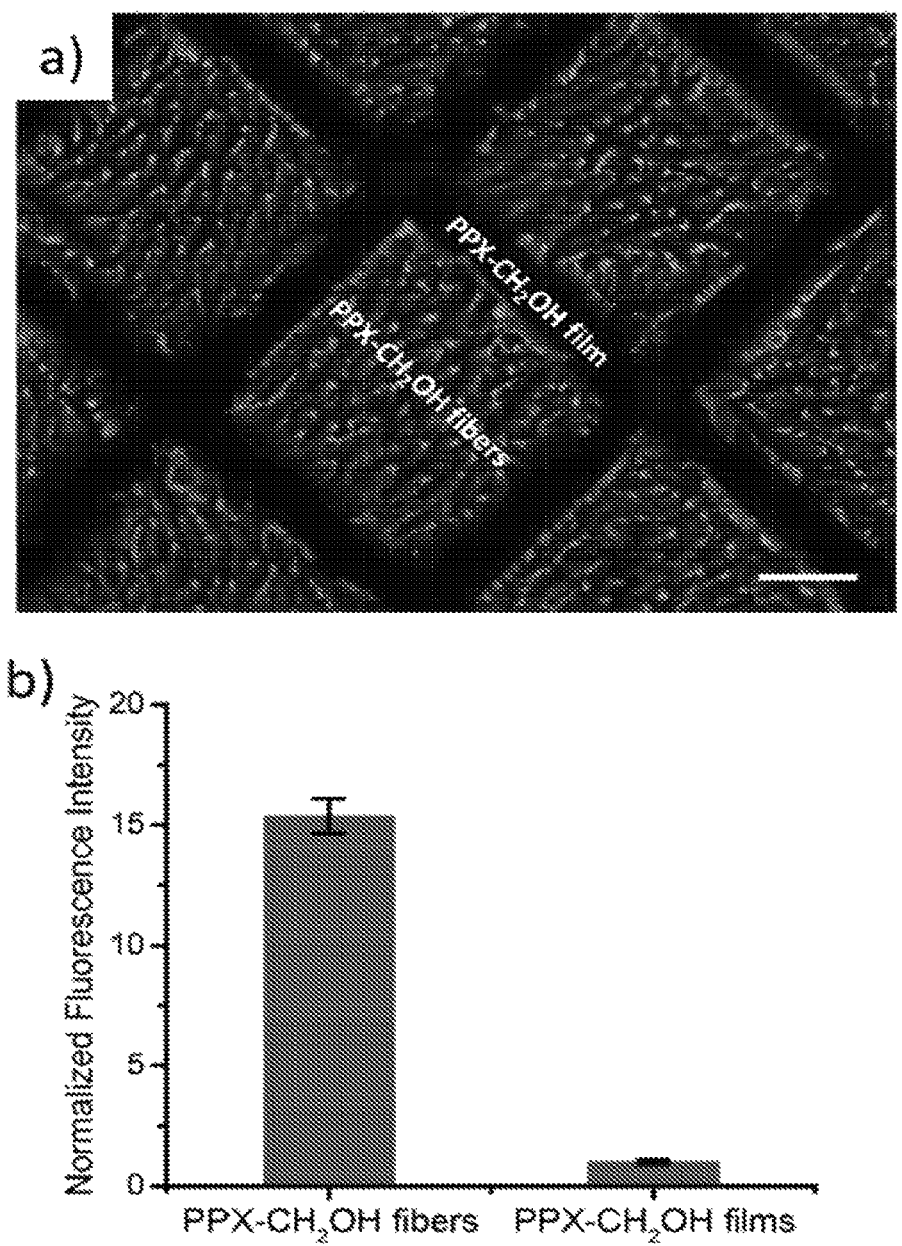

FIGS. 38A-38B. FIG. 38A shows a fluorescence image of substrates patterned with PPX-$CH_2OH$ fibers (inside the square regions) and PPX-$CH_2OH$ film (outside the square regions) that is functionalized with streptavidin-Alexafluor647. Scale bar is 100 µm. FIG. 38B shows mean fluorescence intensity of regions containing nanofibers and unstructured PPX-$CH_2OH$ functionalized with streptavidin-Alexafluor647. Mats of nanofibers possess higher surface area the unstructured polymers, which enables higher loadings of the fluorophore and higher fluorescence intensity.

Figure 39:
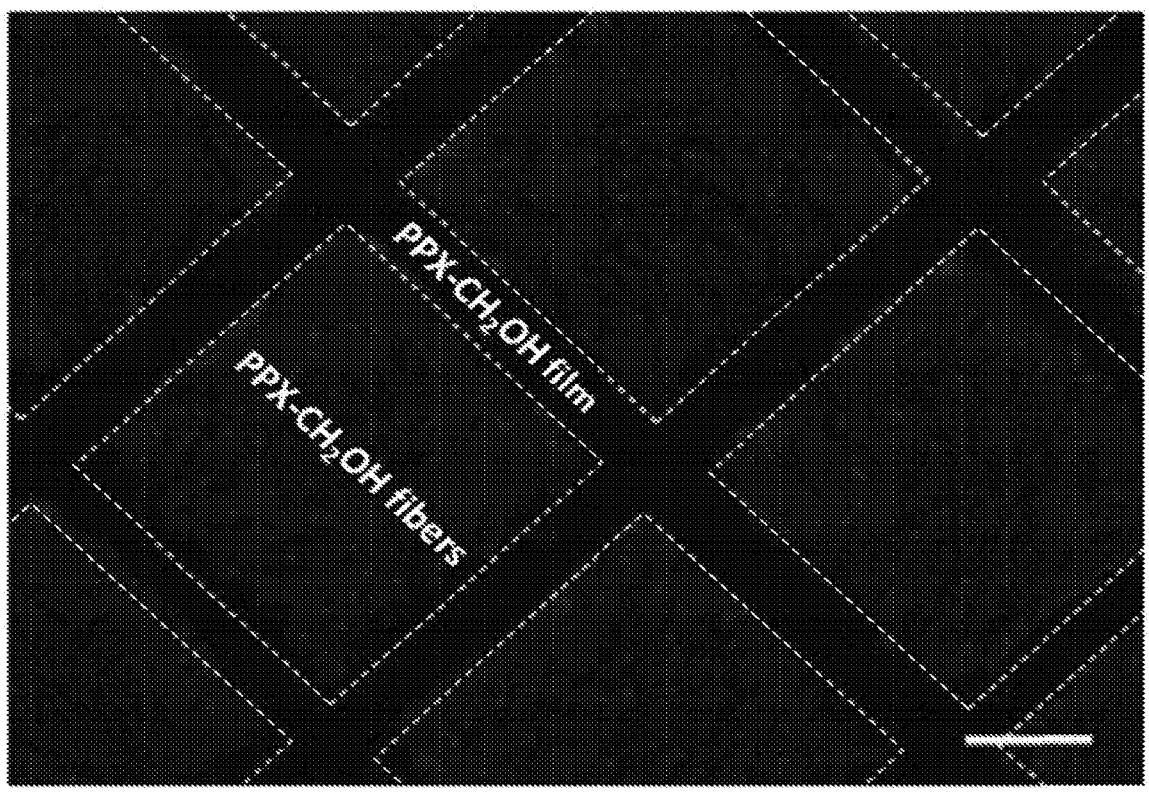

FIG. 39 shows a fluorescence image of non-biotinylated PPX-$CH_2OH$ fibers incubated in a solution of streptavidin-Alexafluor647. The absence of biotin attached to the polymer prevents the conjugation of the protein into the fibers. Scale bar is 100 µm.

Figures 40A, 40B, 40C:
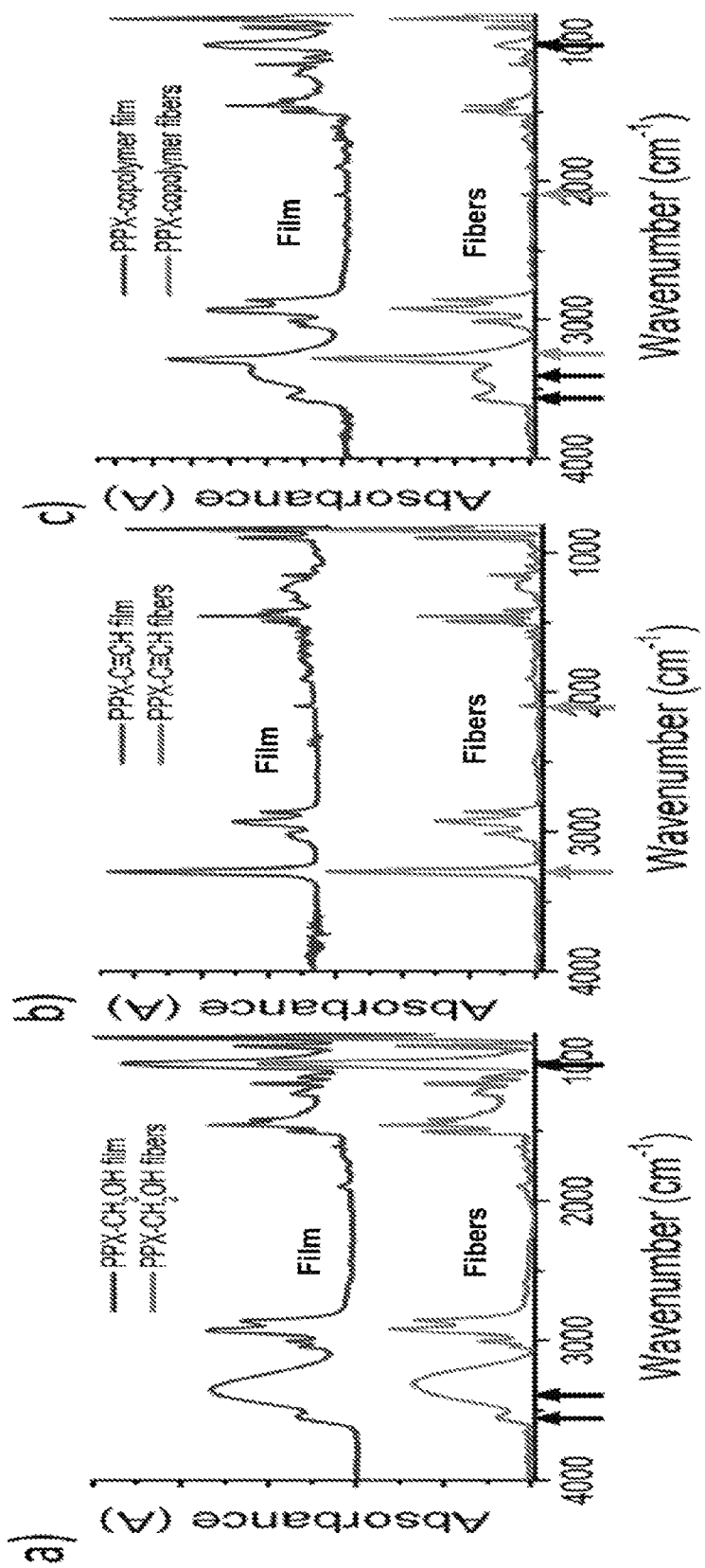

FIGS. 40A-40C. FIG. 40A shows FTIR spectra of unstructured films (blue trace) and nanofibers (red trace) fabricated by CVD polymerization of PPX-$CH_2OH$. Characteristic peaks are located at 1020, 3350 and 3600 $cm^{-1}$ (see black arrows at the abscissa). FIG. 40B shows FTIR spectra of unstructured films (blue trace) and nanofibers (red trace) fabricated by CVD polymerization of PPX-C≡CH. Characteristic peaks are located at 3325 $cm^{-1}$ and 2126 $cm^{-1}$ (see green arrows at the abscissa). FIG. 40C shows FTIR spectra of homogeneous film of PPX copolymer containing both —C≡CH and —$CH_2OH$ anchor groups (blue) and nanofibers grown by polymerization of the corresponding PPX-copolymer in TL205 (red). Characteristic peaks of both functional groups are indicated by arrows at the abscissa (—$CH_2OH$: black arrows; —C≡CH: green arrows).

Figure 41A:
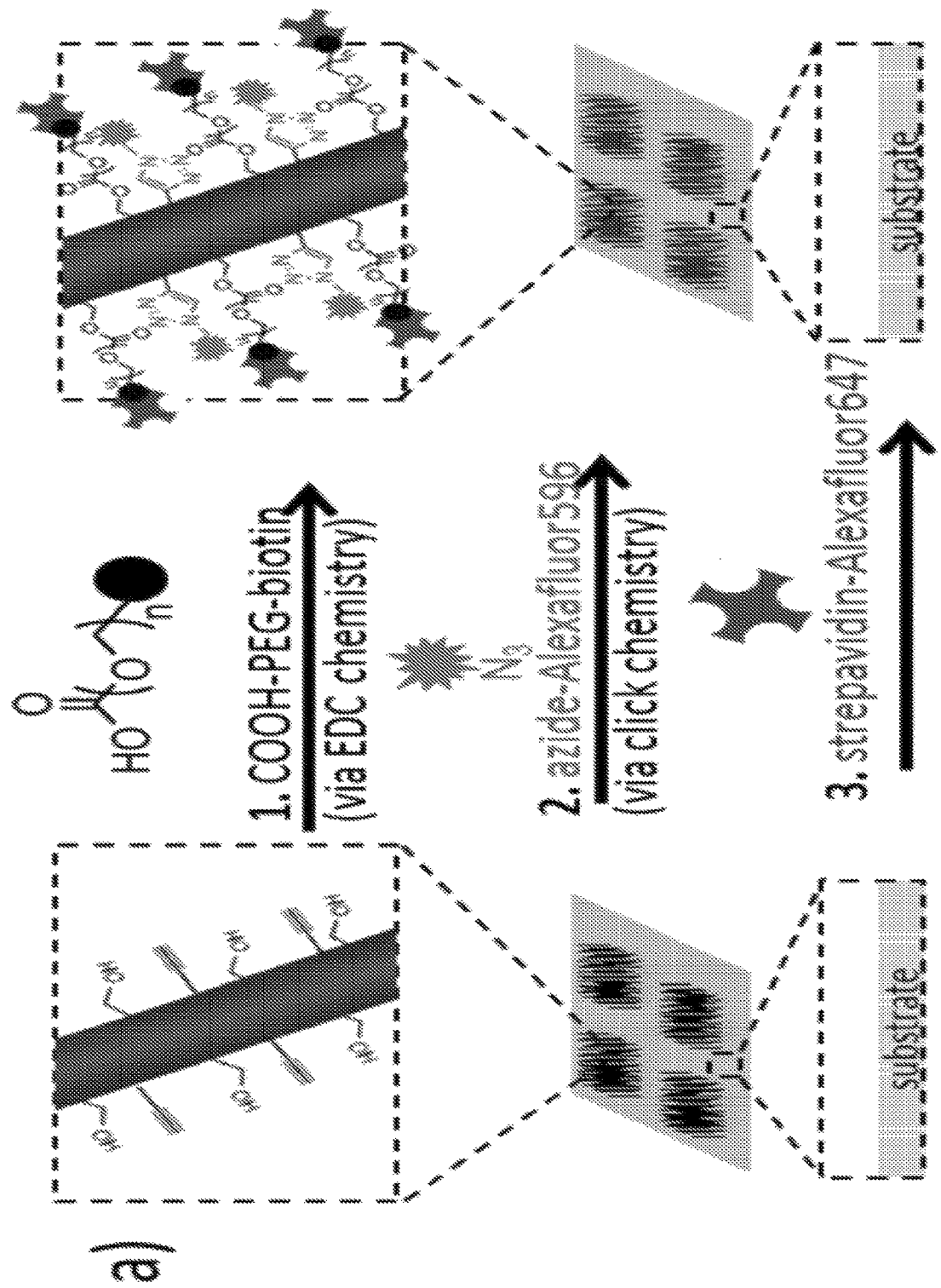
Figures 41B, 41C:
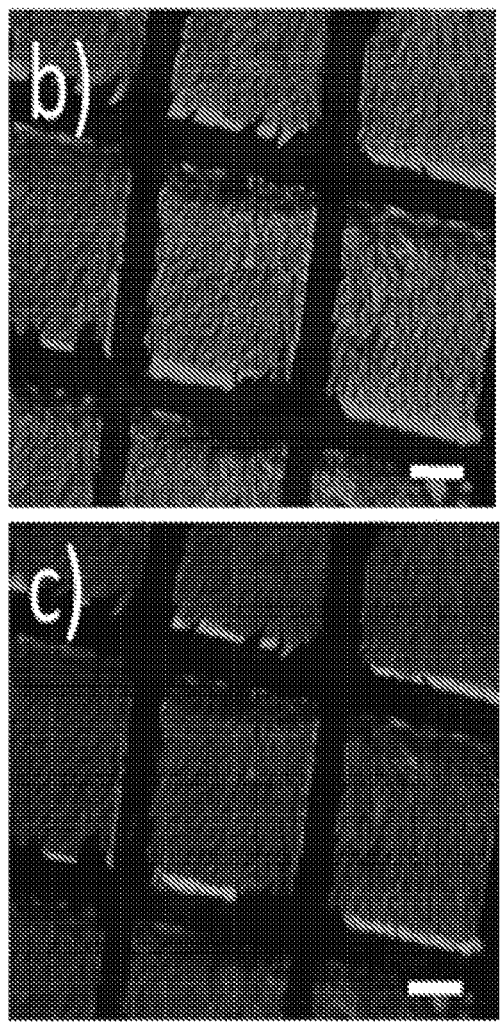

FIGS. 41A-41C. FIG. 41A shows an experimental scheme for the conjugation reaction of azide-Alexafluor596 and streptavidin-Alexafluor647 on polymer fibers containing hydroxymethyl and alkyne groups. FIG. 41B shows a fluorescence image showing the presence of azide-Alexafluor596 on a glass surface patterned with copolymer fiber arrays (inside the square regions). FIG. 41C shows a fluorescence image indicating the presence of strepavidin-Alexafluor647 on a glass surface patterned with copolymer fiber arrays (inside the square regions). Scale bars are 100 µm.

Figures 42A, 42B, 42C, 42D, 42E, 42F, 42G, 42H:
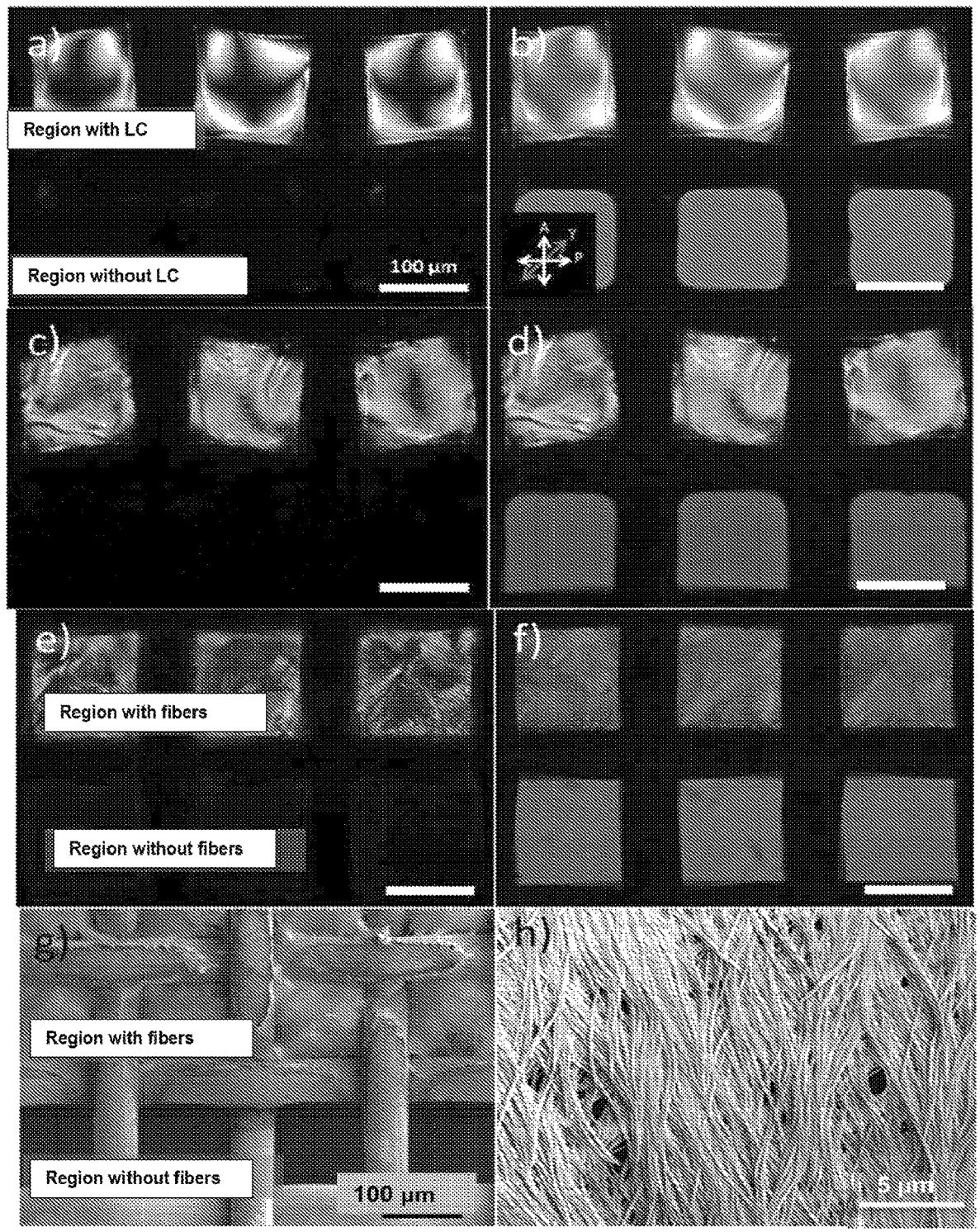

FIGS. 42A-42H. FIG. 42A shows a PLM image of a stainless steel mesh with region of pores filled with E7 (top) and region of pores without E7 (bottom). The pore area is 100 µm×100 µm. FIG. 42B shows an image of same area using a quarter-wave plate. The inset at the bottom left shows the orientation of the polarizer (P) and analyzer filters (A), as well as the orientation of the slow axis of the quarter-wave plate (γ). FIG. 42C shows a PLM image of mesh containing LC after CVD polymerization of PPX-$CH_2OH$ using 8 mg of precursor. FIG. 42D shows an image of the LC-containing mesh after CVD polymerization using quarter-wave plate. FIG. 42E shows a PLM image of mesh after CVD polymerization and removal of LC. FIG. 42F shows an image of mesh after removal CVD polymerization and removal of LC using a quarter-wave plate. FIG. 42G shows an SEM microscope image of mesh after CVD polymerization and subsequent removal of LC. The fibers span the area of the pore of the mesh previously filled with LC. No fibers are formed in the regions without LC. FIG. 42H shows a high magnification SEM image of nanofibers fabricated inside the pores of the mesh.

Figure 43:
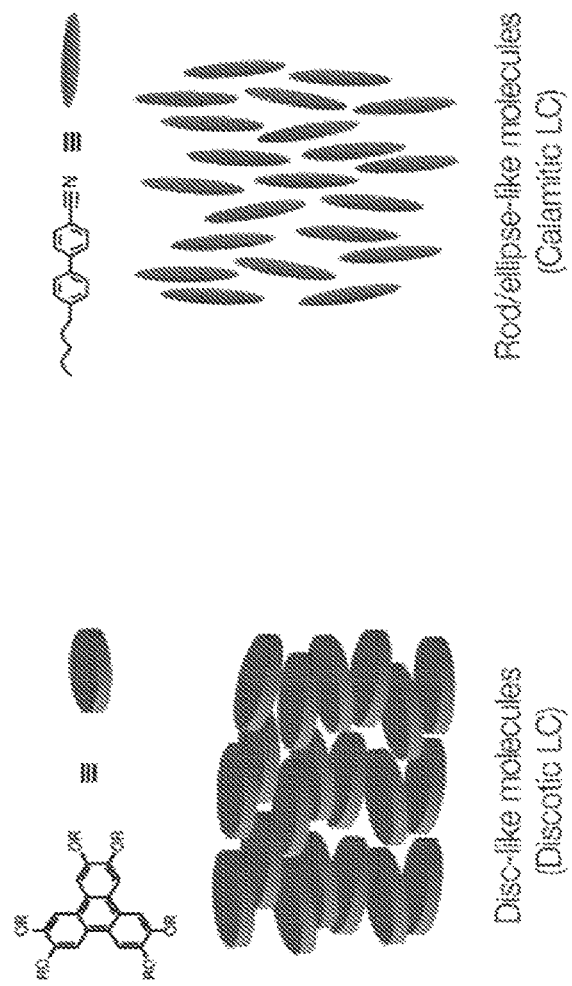
Figure 43:
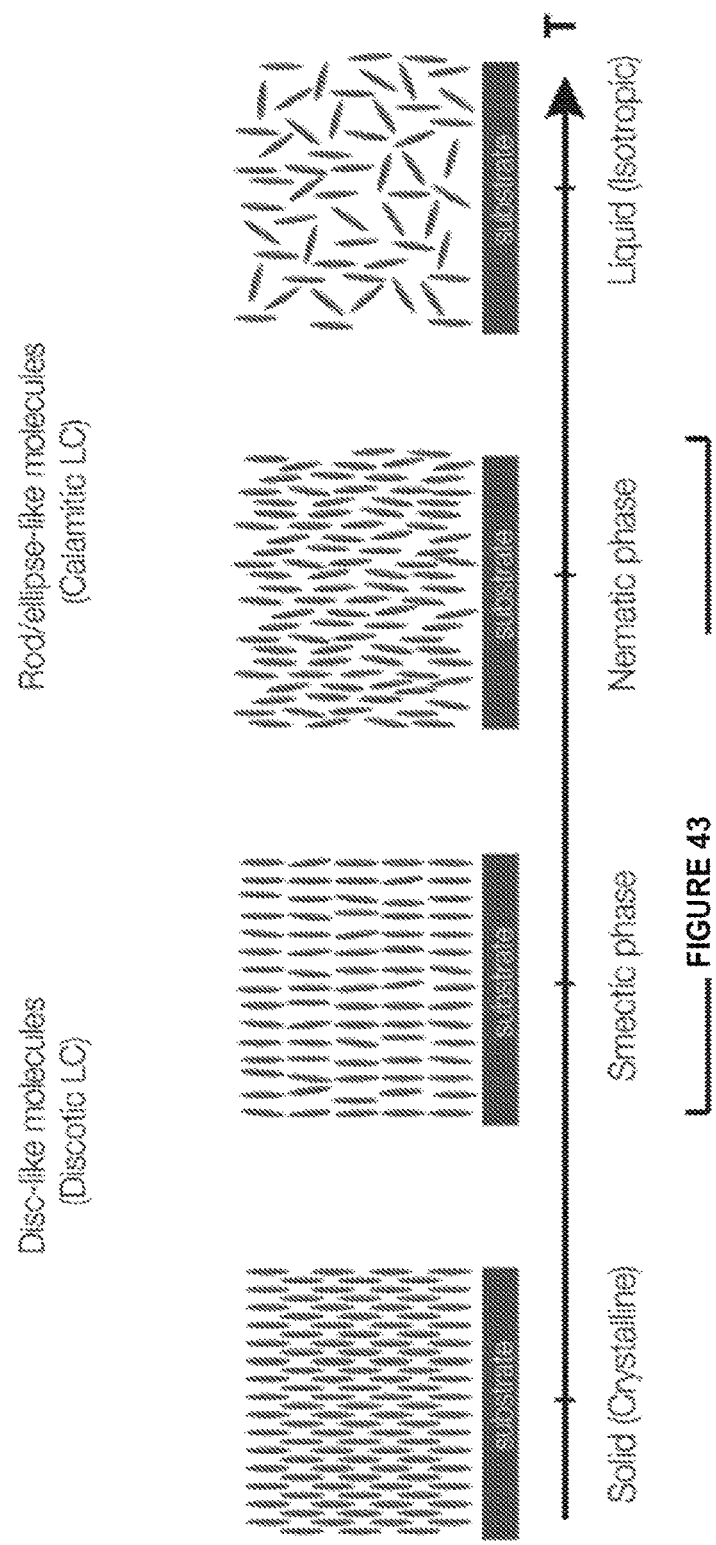

FIG. 43 shows a schematic with distinct liquid crystals, including discotic and calamitic liquid crystals and a transition of a liquid crystal material through distinct phases as temperature increases.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Thus, the description and specific examples, while indicating features and embodiments, are intended for purposes of illustration only and are not intended to limit the scope of the disclosure. Moreover, recitation of multiple embodiments having stated features is not intended to exclude other embodiments having additional features, or other embodiments incorporating different combinations of the stated features. Specific examples are provided for illustrative purposes of how to make and use the described methods, systems, and compositions and, unless explicitly stated otherwise, are not intended to be a representation that given embodiments have, or have not, been made or tested. Features discussed in the context of one embodiment are intended to be applicable to other embodiments, unless otherwise indicated.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges.

In various aspects, the present disclosure includes compositions and methods related to forming templated polymeric structures by chemical vapor deposition (CVD) polymerization. Chemical vapor deposition (CVD) involves the thermal activation of molecules and their subsequent polymerization at surfaces to form polymeric films. The deposition of polymer films by chemical vapor deposition (CVD) onto solid substrates is a solvent-free method of preparing functional coatings. One or more reactive monomers, for example, one or more paracyclophane or substituted paracyclophane units can be reacted and polymerized to form a polymer comprising a xylylene or substituted p-xylylene polymeric structure.

Methods are provided for making a polymeric nanostructure, which in certain preferred aspects, may be a polymeric nanofiber. The method may include introducing at least one reactive monomer, such as at least one paracyclophane reactive monomer, under reduced pressure conditions into a reaction chamber having a substrate. A structured fluid, which may comprise liquid crystals and may be an anisotropic medium, is disposed over exposed areas of the substrate. The at least one reactive monomer is deposited in the CVD process onto the substrate and polymerizes through the structured fluid (e.g., anisotropic medium) to form a polymeric nanostructure. The structured fluid may be a film of material disposed on one or more regions of the surface of the substrate. Liquid crystals exhibit properties of both liquids and solids and may have rod-shaped or disk-shaped molecules that permit anisotropic packing when assembled together. In certain aspects, the anisotropic medium comprises a plurality of liquid crystals that exhibit anisotropy in a single direction, but also exhibit fluidity, as will be discussed in greater detail below. The structured fluid thus assumes a liquid crystalline phase as the polymeric nanofiber is formed. In certain aspects, the structured fluid may comprise a liquid crystalline phase selected from the group consisting of: a nematic phase, a smectic phase, a C*-smectic phase (having a chiral state designated C*, where a director makes a tilt angle with respect to the smectic layer), a blue phase (e.g., a mesophase that occurs in a temperature range between a helical and isotropic phase of highly chiral materials), and combinations thereof, as will be discussed further below. The structured fluid may thus have elongate liquid crystals with an evident long axis (e.g., that are that rod shaped) are generally oriented in parallel to one another, but not necessarily in well-defined planes, and thus may be calamitic and have a nematic or smectic phase. The structured fluid may be a film of nematic liquid crystals.

After polymerization, the structured fluid can optionally then be removed to form a polymeric nanostructure on the substrate. The removal may be conducted by contacting the structured fluid with a solvent, such as ethanol, acetone, hexane, water, and the like. For example, the contacting may be rinsing, flushing, or immersing of the substrate with the structured fluid and polymeric nanostructures in a solvent solution, for example, in an ethanol bath. In other aspects, the structured fluid may be removed by heat treatment to evaporate the LC, for example, by heating to 75° C. under 0.1 mbar to remove the LC from the substrate while leaving the polymeric nanostructures intact. The nanostructures optionally may be further removed from the substrate, for example, by contacting the structured fluid with solvents.

In certain aspects, at least one of a shape or an orientation of the polymeric nanostructure is manipulated by modifying an orientation of the liquid crystals in the structured fluid. For example, the shape or orientation of the nanostructure may be controlled by controlling a director profile of the nematic liquid crystals in the structured fluid, which may be achieved by modifying an orientation of the liquid crystals.

In other aspects, the liquid crystals are thermotropic liquid crystals and at least one of a shape or an orientation of the polymeric nanostructure is manipulated by modifying a temperature of the structured fluid. In certain preferred aspects, the polymeric nanostructure formed by such a method is a nanofiber. For example, the polymeric nanostructure may comprise an array of nanofibers. In other aspects, the present disclosure contemplates forming a biomimetic composite coating via vapor-based polymerization techniques.

The methods of the present disclosure may be a one-step process that requires neither the use of any volatile solvents, additives or catalysts. The resulting nanostructures (e.g., nanowires/nanofibers) can be in the form of aligned nanowires/nanofibers arrays supported on any solid material, in the form of nanofibers mats supported on porous materials, or as individual free-standing nanowires/nanofibers. The nanowires/nanofibers have narrow size-distributions, as well as high and tunable aspect ratios. By controlling the geometry and type of structured fluid (e.g., liquid crystal film) within which the polymerization is carried, in certain variations, nanofibers/nanowires can be fabricated with uniform diameters, for example, having an average diameter of greater than or equal to about 50 nanometers to less than or equal to about 500 nanometers, optionally greater than or equal to about 55 nanometers to less than or equal to about 160 nanometers, optionally greater than or equal to about 55 nanometers to less than or equal to about 150 nanometers, and optionally greater than or equal to about 67 nanometers to less than or equal to about 140 nanometers. In certain variations, a uniform average length of the nanofibers formed may range from greater than or equal to about 200 nanometers to less than or equal to about 100 micrometers, optionally greater than or equal to about 500 nanometers to less than or equal to about 50 micrometers, optionally greater than or equal to about 750 nanometers to less than or equal to about 40 micrometers, optionally greater than or equal to about 1 micrometer to less than or equal to about 30 micrometers, optionally greater than or equal to about 4 micrometer to less than or equal to about 25 micrometers, and in certain variations, optionally greater than or equal to about 5 micrometer to less than or equal to about 22 micrometers.

In certain aspects, arrays of nanofibers may be formed having a plurality of distinct nanofibers having substantially similar orientations. The arrays may have nanofibers or nanostructures that are substantially monodisperse in terms of length and diameter. Monodisperse generally refers to size distributions that deviate less than about 25%, optionally less than about 20%, optionally less than about 15%, optionally less than about 10%, optionally less than about 5%, and in some aspects, less than about 1%. The nanostructures formed in accordance with the present disclosure may be considered to be monodisperse with respect to length and/or diameter (for example, having greater than 50% of the population having a length or diameter near the average length or diameter), but may deviate from the average length or diameter by less than or equal to about 25%, optionally deviating about 5% to about 20%. The arrays of nanofibers may be considered to be a nanofiber mat.

By using chiral liquid crystals in the structured fluid, chiral nanostructures, such as chiral nanofibers, can be fabricated. The functional nanowires/nanofibers can contain one or more types of surface reactive groups that allows for post surface chemical modifications on the nanowires/nanofibers. A range of potential applications based on these materials is contemplated.

Figure 1A:
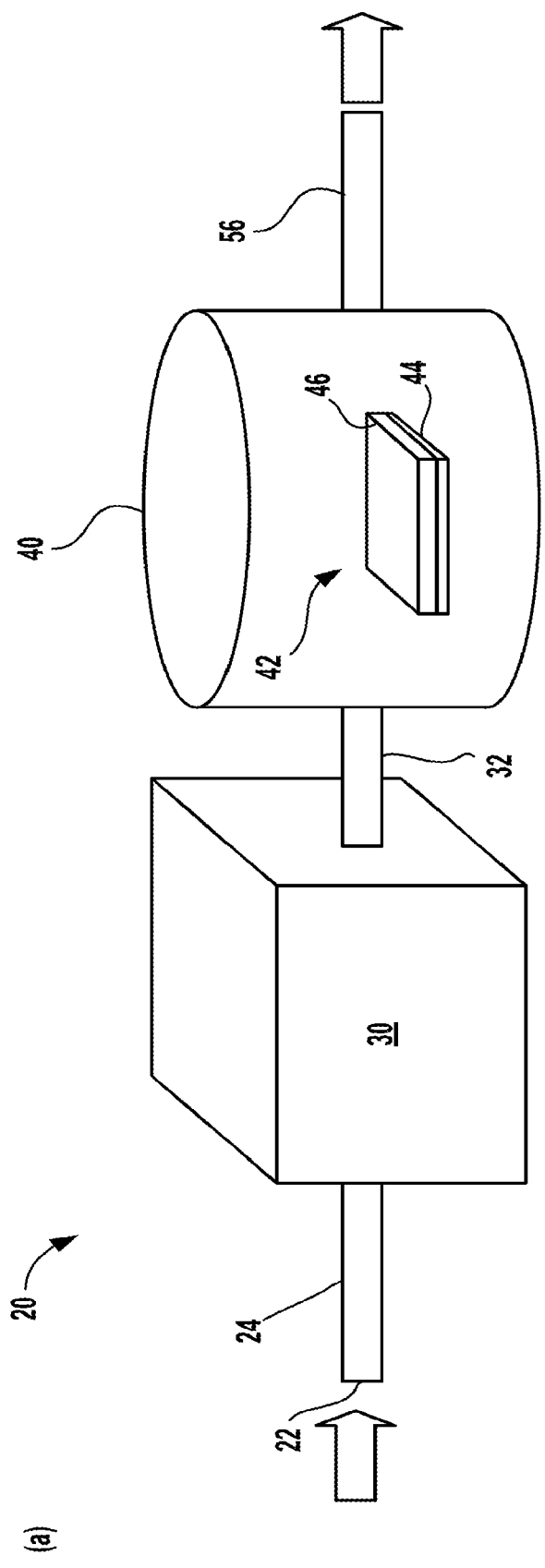
Figure 1B:
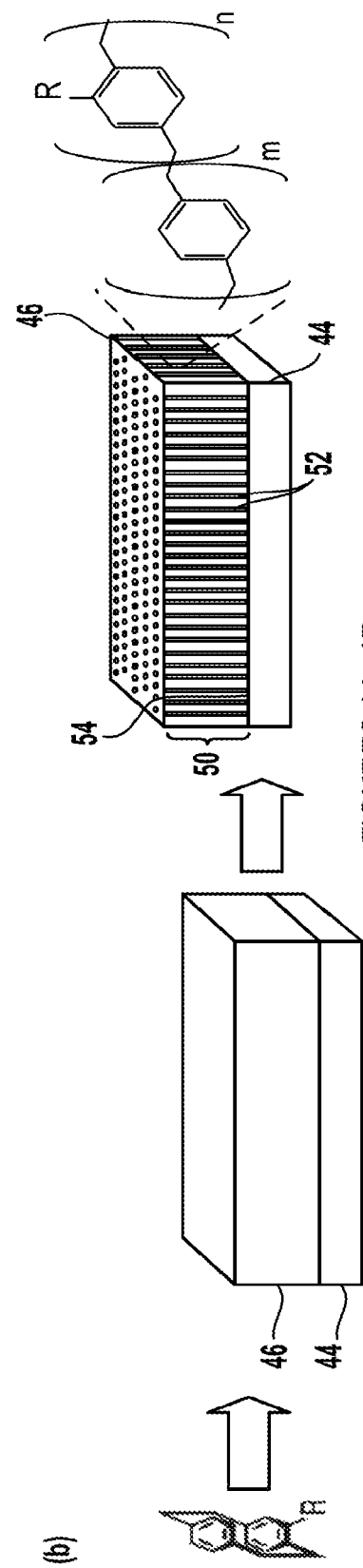

With reference to FIGS. 1A-1B, an example of a chemical vapor deposition (CVD) system 20 for making a polymeric nanostructure in accordance with certain is shown. In FIG. 1A, the system 20 includes an inlet 22 to a conduit 24 that receives a carrier gas and a precursor (e.g., of a reactive monomer). The conduit 24 is in fluid communication with a furnace or heat source 30 into which the carrier gas and precursor are introduced and heated. First, the precursor may be sublimed into a gas phase. As described further below, a suitable precursor may include a substituted [2,2]-paracyclophane, which is heated and pyrolyzed to form a reactive intermediate or reactive monomer, such as reactive paracyclophane monomer(s) like substituted poly(p-xylylene) (PPX-R), where R is a functional or side group. It should be noted that several distinct reactive co-monomers may be employed concurrently, which may have distinct R groups. The precursor(s) may be sublimated under vacuum (e.g., about 0.2 Torr to about 0.3 Torr) and transported by a carrier gas into an external heat source like the furnace 30. The heat source 30 may have a temperature of about 500° C. to about 800° C., for example, about 550° C. When the temperature is high enough, homolytic cleavage can occur across both bridge bonds of the substituted [2,2]-paracyclophane, resulting in reactive monomers, i.e., two quinodimethane diradicals or PPX-R. Such an activation or pyrolysis process serves as an initiation step.

Next, the heated PPX-R reactive monomers are carried from the heat source 30 through a second conduit 32 into a CVD polymerization reactor 40. Here, the thermally generated PPX-R radicals can polymerize and deposit on a target 42. The polymerization reactor 40 may have a temperature of about 75° C. to about 150° C., for example, about 120° C. The target 42 includes a substrate 44 having a structured fluid 46 disposed over select exposed surface regions of the substrate 44 in accordance with certain aspects of the present disclosure. As noted above, the structured fluid 46 may comprise a plurality of liquid crystals and desirably has fluidity. The structured fluid 46 may be a liquid, a semi-solid, or a solid material. In certain variations, the structured fluid 46 may be a semi-solid film comprising mesogen or liquid crystals, as described further below. While in preferred aspects, the structured fluid 46 comprises a liquid crystal or mesogen based material, other structured fluids, such as colloids and surfactant solutions, may also serve as templates for use with the methods of the present disclosure. The structured fluid 46 may have a thickness of greater than or equal to about 25 nanometers to less than or equal to 500 micrometers, optionally greater than or equal to about 50 nanometers to less than or equal to 300 micrometers, optionally greater than or equal to about 500 nanometers to less than or equal to 200 micrometers, optionally greater than or equal to about 1 micrometer to less than or equal to 200 micrometers, optionally greater than or equal to about 5 micrometer to less than or equal to 100 micrometers, and in certain variations, optionally greater than or equal to about 5 micrometer to less than or equal to 20 micrometers.

Figures 2A, 2B, 2C:
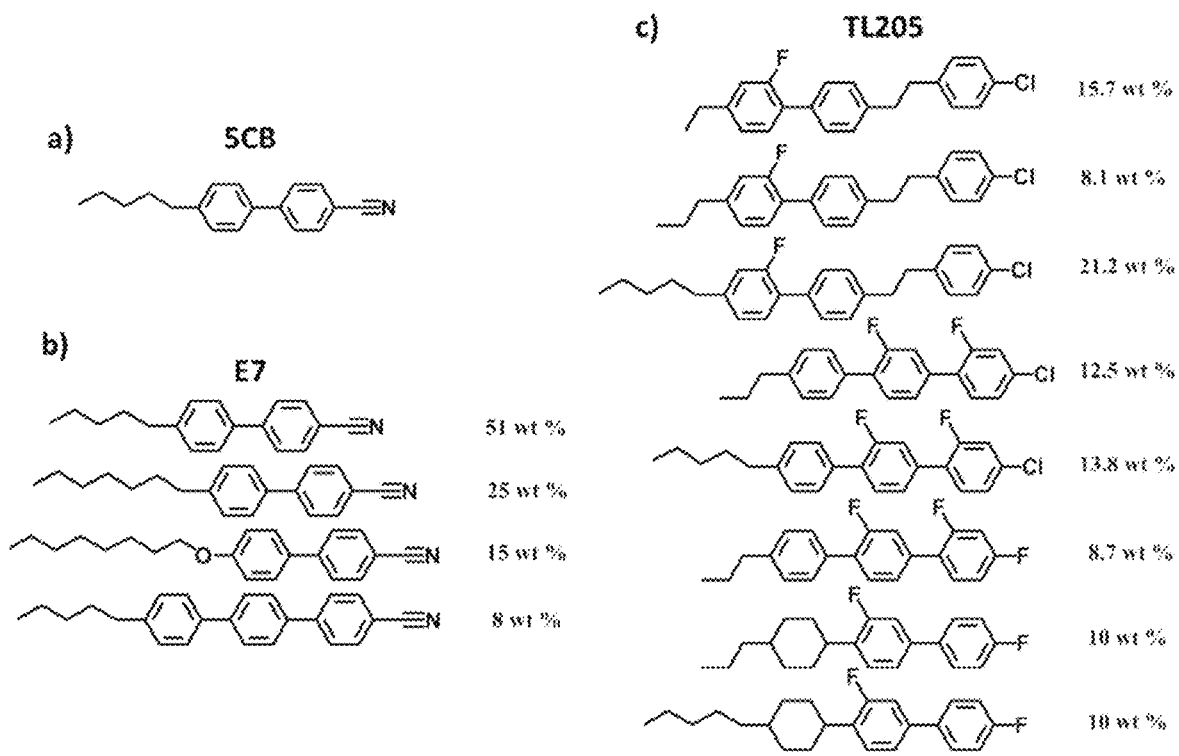

FIGS. 2A-2C show molecular structures of certain non-limiting suitable liquid crystal materials that may be used in the structured fluid 46: 4-pentyl-4'-cyanobiphenyl (5CB) in FIG. 2A, a nematic mixture of cyanobiphenyls and terphenyls referred to as E7 shown in FIG. 2B, and a nematic mixture of halogenated biphenyls and terphenyls referred to as TL205 shown in FIG. 2C. The weight % of the each respective compound in the mixtures is shown in FIGS. 2B-2C. The nematic-isotropic transition temperatures for these compounds are: 35° C. for 5CB, 60° C. for E7, and 87° C. for TL205. Nematic LCs are structured liquids within which the molecules exhibit long-range orientational order. Nematic liquid crystals typically have a plurality of elongate liquid crystals having an evident long axis (e.g., that are that rod shaped) that are generally oriented in parallel to one another, but not necessarily in well-defined planes. In other aspects, the liquid crystals may be cholesteric, which are characterized by having a helical twist in a director of the liquid crystal. Cholesteric liquid crystals may be formed by the addition of chiral molecules to nematic LCs. In one variation, a suitable chiral dopant for a liquid crystal may be 4-[[(2S)-2-octanyloxy] carbonyl] phenyl 4-(hexyloxy) benzoate (S-811) that may have either left handed chirality (S-811) or right handed chirality (R-811). The chiral dopant may be present in the structured fluid at less than or equal to about 20% by weight, optionally less than or equal to about 15% by weight, optionally less than or equal to about 10% by weight, optionally less than or equal to about 5% by weight, and in certain variations at about 3% by weight. In certain aspects, the structured fluid comprises a liquid crystalline phase selected from the group consisting of: a nematic phase, a smectic phase, a C*-smectic phase, a blue phase, and combinations thereof.

With renewed reference to FIG. 1A, the substrate 44 may be a liquid, a semi-solid, or a solid material. The substrate 44 may have a variety of shapes, including planar structures, such as solid layers, films, grids, mesh and other porous structures, arcuate structures, such open tubes, cylinders, round structures, spheres, droplets, and the like. By way of non-limiting example, the substrate 44 may be formed of metals, polymers, glass, fabrics, cellulose-based materials, and the like. In one non-limiting variation, the substrate may be a stainless steel mesh. In certain aspects, the target 42 including the substrate 44 and structured fluid 46 may be provided on a rotating stage that may be cooled to a predetermined temperature, so that the target 42 is likewise cooled.

The reactive monomer radicals may then deposit and polymerize onto the substrate 44 having the structured fluid 42. As noted above, the substrate 44 may be cooled to a predetermined temperature (for example, about −40° C. and 60° C.) that helps to provide the liquid crystals in a predetermined orientation (e.g., where the liquid crystals in the structured fluid 46 are thermotropic) to facilitate deposition and polymerization of the reactive monomers within the structured fluid 46 within the CVD chamber/reactor. As shown in the general schematic in FIG. 1B, after the substituted [2,2]-paracyclophane precursor is heated and forms the PPX-R radicals introduced into the CVD polymerization reactor 40, these radicals polymerize to form a polymeric layer 50 comprising one or more substituted p-xylylene units. It should be noted that more than one precursor or reactive monomer may be employed in such a system to form copolymers. Notably, the polymeric layer 50 may define a plurality of nanostructures 52 within the structured fluid 46, where the structured fluid 46 serves as a template for the polymeric nanostructure to form from an exposed surface 54 of the substrate 44 through preselect regions of the structured fluid 46. Further, it should be noted that the polymeric layer 50 does not necessarily form a continuous surface layer on the structured fluid 46, but rather the polymeric layer 50 may comprise only the discrete plurality of nanostructures 52 created within the structured fluid 46. The effluent from the CVD polymerization reactor 40 may be removed via a third exit conduit 56. It should be noted that the system 20 is a simplified depiction and may include various conventional equipment, such as various valves, pumps, including vacuum pumps, stages, thermocouples, pressure sensors, and additional fluid flow conduits, by way of non-limiting example. As discussed further herein, the polymeric nanostructures 52 thus formed may comprise a polymer comprising one or more substituted p-xylylene units. In certain variations, the polymeric nanostructures may comprise copolymers comprising distinct substituted p-xylylene units.

As discussed further herein, after formation into a polymeric nanostructure, the one or more substituted p-xylylene units may be modified with a wide variety of materials or compounds, for example, by reaction or conjugation of the reactive functional groups in the polymer with one or more external compounds or species. After such a modification, the surface bearing the one or more conjugated compounds can be used to interact with and/or immobilize various biomolecules or other target moieties.

The present disclosure thus contemplates methods of making a polymeric structure. The polymeric structure may be a "microstructure" that encompasses "nanostructures," as discussed below. In certain variations of the present teachings, a microstructure component has at least one spatial dimension that is less than about 1,000 µm (i.e., 1 mm), optionally less than or equal to about 500 µm (i.e., 500,000 nm), and optionally less than or equal to about 100 µm (i.e., 100,000 nm). In certain aspects, a microstructure has at least one spatial dimension that is less than about 10 µm (i.e., 10,000 nm), optionally less than about 5 µm (i.e., 5,000 nm), and optionally less than about 1 µm (i.e., 1,000 nm).

There is often some overlap between microstructures and nanostructures. For example, in certain aspects, nanostructures are formed by the present methods that are "nano-sized" or "nanometer-sized" and have at least one spatial dimension that is less than about 10 µm (i.e., 10,000 nm), optionally less than about 5 µm (i.e., 5,000 nm), optionally less than about 1 µm (i.e., 1,000 nm), optionally less than about 0.5 µm (i.e., 500 nm), optionally less than about 0.4 µm (i.e., 400 nm), optionally less than about 0.3 µm (i.e., 300 nm), optionally less than about 0.2 µm (i.e., 200 nm), and in certain variations, optionally less than about 0.1 µm (i.e., 100 nm). In certain variations, a nanostructure may have at least one spatial dimension of about 5 nm to about 500 nm. It should be noted that so long as at least one dimension of the nanostructure or microstructure falls within the above-described nano-sized or micro-sized scales (for example, diameter), one or more other axes may well exceed the nano-size or micro-size (for example, length and/or width).

In certain variations, the polymeric microstructure or nanostructure that is formed is an axial geometry nanostructure. Axial geometry structures are anisotropic and have a cylindrical, rod, tube, or fibrous shape with an evident elongated longitudinal axis, which is longer than the other dimensions (e.g., diameter or width), thus having an axial anisotropic geometry. Generally, an aspect ratio (AR) for cylindrical shapes (e.g., a fiber, a wire, pillar, a rod, tube, and the like) is defined as AR=L/D, where L is the length of the longest axis (here a major longitudinal axis) and D is the diameter of the fiber or cylinder. Suitable axial geometry structures for use in the present technology generally have high aspect ratios, for example, ranging from at least about 100 to in excess of 1,000, for example. In yet other aspects, such axial geometry structures may have an aspect ratio of 5,000 or more and in certain variations 10,000 or more. The axial geometry structures will generically be referred to as "fibers" herein. It should be noted that other structures are also contemplated as being formed in alternative variations of the present disclosure, such as flakes or particles that do not have an axial geometry.

The methods of the present disclosure thus contemplate introducing at least one reactive monomer, such as a paracyclophane reactive monomer, into a reaction chamber having a substrate disposed therein. A structured fluid comprising liquid crystals is disposed over exposed areas of the substrate. The at least one paracyclophane reactive monomer polymerizes through the structured fluid onto the substrate. Then, the structured fluid may be removed. After removal of the structured fluid, a polymeric nanostructure is formed on the substrate.

In certain aspects, at least one of a shape, an orientation, or a chirality of the polymeric nanostructure is manipulated by modifying an orientation of the liquid crystals in the structured fluid.

In other aspects, the liquid crystals are thermotropic liquid crystals and at least one of a shape or an orientation of the polymeric nanostructure is manipulated by modifying a temperature of the structured fluid.

In further aspects, the polymeric nanostructure is a nanofiber. The polymeric nanostructure thus formed may comprise an array of nanofibers. In certain variations, a thickness of the structured fluid comprising liquid crystals relates to a length of the nanofiber formed, so that the length of the nanofiber is substantially equal to a thickness of the structured fluid comprising liquid crystals. The nanofibers may have the dimensions previously discussed above.

In certain variations, one or more select regions of the substrate and the structured fluid may be masked during the polymerizing and removed after the polymerizing, so that only select regions of the substrate having the polymeric nanostructure formed thereon.

In other aspects, the structured fluid comprising liquid crystals further comprises a steric dopant that creates a cholesteric liquid crystal material that imparts chirality on the polymeric nanostructure that is formed after deposition thereon.

In other aspects, the method further comprises treating a surface of the polymeric nanostructure. For example, the treating may include reacting one or more groups on a surface of the polymeric nanostructure comprising one or more substituted p-xylylene units with molecules/reactants or etching, oxidizing, or reducing one or more regions of the surface of the polymeric nanostructure. In other aspects, the method further comprises reacting a moiety with a surface of the polymeric nanostructure.

In certain variations, the one or more xylylene units in the polymer comprise a first functional group that may be reactive with a target molecule comprising a second functional group. In certain aspects, the target molecule is, by way of example, a biomolecule and/or a ligand, such as DNA, RNA, proteins, amino acids, growth factors, oligopolysaccharides, hormones, and the like, by way of non-limiting example. Thus, different types of biomolecules or moieties can be chemically attached to the surface of the nanostructures. In certain aspects, the first and second functional groups may undergo a conjugation reaction, for example, a click chemistry reaction by selective covalent bonding to join small units or molecules together. Examples of reactive functional groups include dienes, dienophile, alkyne, azides, hydroxyls, carboxyls, amines, aldehydes, imides, and the like. Click chemistry can provide a benefit of providing stereoselective conversion with high yields, while being insensitive to solvents and pH conditions. Examples of click chemistry regioselective reactions include five broad classes of reactions: 1) cycloaddition of unsaturated species: [1,3]-dipolar cycloaddition; 2) cycloaddition of unsaturated species: [2,4]-cycloaddition (Diels-Alder); 3) nucleophilic substitution reaction-ring opening reactions; 4) carbonyl reactions of the non-aldol type; and 5) addition to carbon-carbon multiple bonds. For example, reactive functional groups include dienes, dienophile, alkyne, azides, where distinct functional groups from this group can undergo a Diels-Alder reaction [1,3]-dipolar cycloaddition reaction. In one variation, an azide-containing molecule binds to the alkyne groups in the polymeric nanofiber via click chemistry.

The polymeric nanostructures may also be treated to change surface properties, for example, the polymeric nanostructures may be treated to be oxidized, reduced, hydrophobic, positively-charged (cationic), negatively-charged (anionic), polyethylene glycol (PEG)-ylated, covered with a zwitterion, hydrophobic, superhydrophobic (for example having with water contact angles in excess of 150°), hydrophilic, superhydrophilic (for example, where the water contact angle is near or at 0°), olephobic/lipophobic, olephilic/lipophilic, and/or nanostructured, by way of non-limiting example.

In various aspects, the present methods permit facile synthesis of organized assemblies of polymeric nanofibers with precisely controlled diameters, lengths, and surface biochemical functionality. Manipulation of the structured fluid/anisotropic medium/liquid crystal template permits versatile control of the shape, orientation and chirality of the fiber assemblies, and allows for fabrication of nanofiber arrays on surfaces with complex concave and convex geometries.

The present disclosure thus provides highly-organized polymeric nanostructures (e.g., nanofiber arrays) that can be created through chemical reaction in a structured fluid. More specifically, polymerization can be conducted in a structured fluid, such as a medium comprising liquid crystals/mesogens, to create highly-organized anisotropic nano-structures. The present disclosure thus provides a CVD process into structured materials, such as thermotropic liquid crystals, that can be used to synthesize dense arrays of surface-immobilized and shape-controlled nanostructures (e.g., nanofibers) that can be systematically manipulated by tuning properties of the liquid crystal. In a typical CVD reaction process, the starting material, [2,2] paracyclophane, is vaporized and breaks down into reactive monomers under a high temperature oxygen-free environment. In the present methods, the reactive monomer vapor then diffuses into a layer of liquid crystal and self-polymerizes into individual nano-structures with high aspect-ratios inside the liquid crystal. Such a process may be considered to be anisotropic polymerization within the structured fluid.

The nanostructures formed from such processes (e.g., nanofiber arrays) have programmable geometry, alignment and chemistry that make them versatile in a variety of applications, ranging from biomedical sensors, to filtration to catalytic supports.

In various aspects, the present technology provides one or more of the following features or advantages: nanostructures (e.g., nanofibers) having controlled/programmable dimensions and alignment; the chemistry of the nanostructures (e.g., nanofibers) can be finely tuned; the arrangement of the nanostructures (e.g., nanofibers) can be controlled by tuning the alignment of the liquid crystals; the nanostructures (e.g., nanofibers) exhibit unique optical anisotropy due to the alignment of the polymer chains in the nanostructures (e.g., nanofibers); nanostructures (e.g., nanofibers) include surface functional groups that enable for surface modification; where the nanostructures are nanofibers, the nanofiber arrays can be patterned and can be applied on 3D objects; and/or where the nanostructures are nanofibers, twisted/helical fiber bundles can be created by introducing chirality into the liquid crystal medium.

In various aspects, the present disclosure contemplates a vapor-based polymerization process known as the chemical vapor deposition (CVD) polymerization of substituted [2,2] paracyclophane in a liquid crystal as the structured fluid. In certain aspects, the present disclosure thus provides chemical vapor deposition (CVD) of one or more substituted poly(p-xylylenes) (PPX-R) as the paracyclophane reactive monomer into micrometer-thick films of nematic liquid crystals (LCs). In certain aspects, the present disclosure relates to a use of LCs as a template for polymerization of PPX into shape-specific fibers with both narrow distributions of micrometer-scale lengths (5.9-21.4±1 µm) and nanometer-scale diameters (67-140 nm±10 nm). The results reveal that the fibers nucleate at the interface between the LC film and the supporting substrate (e.g., solid substrate) and then grow along a direction or director of the LC. Generally, the nanofiber growth is believed to follow an anisotropic growth mechanism where monomers pass within the liquid crystals in the structured fluid and are adsorbed onto a surface of the substrate, followed by nucleation of monomers/polymer on the substrate, with propagation from the nucleated monomers/polymer as it grows upwards through the liquid crystal medium to form a polymeric nanofiber within the liquid crystals, which terminates at or near the exposed surface of the liquid crystal structured fluid. The growth of PPX nanofibers from the solid-LC interface is consistent with a mechanism by which a local region of high strain in the LC is generated near the nanofiber tip, which in turn leads to preferential diffusion and subsequent addition of monomer to the apex of the growing polymeric structure. This mechanism of anisotropic polymerization continues until the fiber reaches the free interface of the LC film. By controlling the director profile across the LC film (e.g., by changing surface anchoring of the LC or adding a chiral dopant), nanofibers with distinct shapes (straight, bent, twisted) can be fabricated. The diameters of the nanofibers can be tuned by choice of the LC, in a manner that appears correlated with the elastic moduli of the LCs. This approach permits the preparations of surfaces presenting arrays of shape-controlled nanofibers that are optically active, provide high surfaces areas, can be surface-functionalized by covalent reactions with substituted PPXs (e.g., PPX-alkyne or PPX-CH$_2$OH) and can be formed on complex geometries, such as the pores of a stainless steel mesh. Overall, these results define versatile methods for surface-initiated polymerization in structured fluids that yield nanofibers with properties that are useful for a broad range of applications, including biomedicine, biological assays, sensing or filtration/separation systems, energy harvesting, wetting, or design of stimuli-responsive optical films, by way of non-limiting example.

Figure 1C:
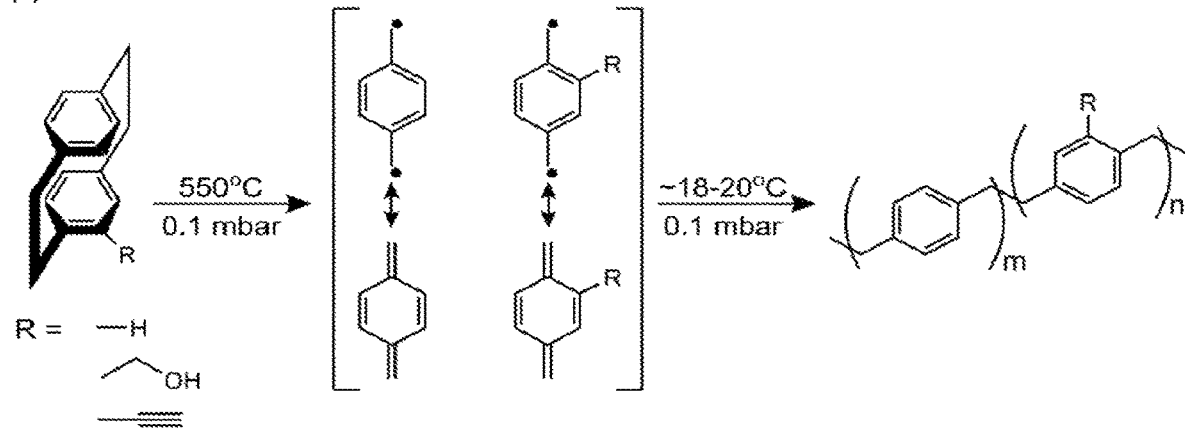
Figure 1D:
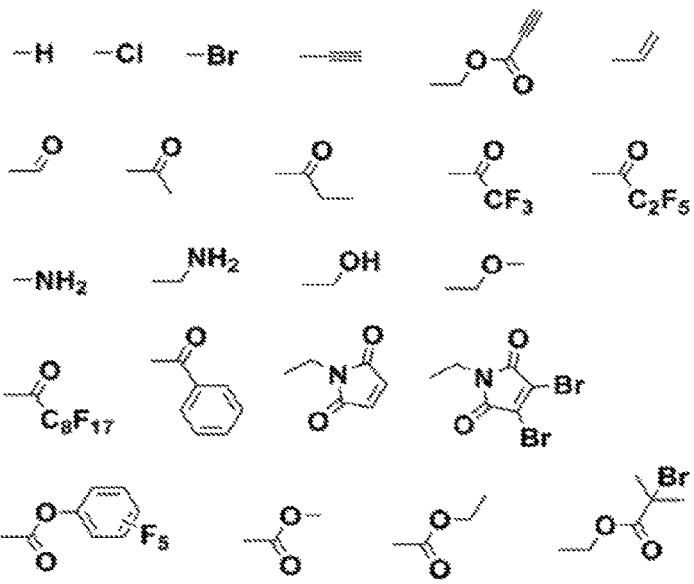

As noted above, to deposit a polymer film using chemical vapor deposition (CVD), a precursor is sublimed into a gas phase, and pyrolyzed to form reactive intermediates (reactive paracyclophane monomer(s)) that are subsequently deposited and polymerized onto a solid substrate. A commonly used precursor for CVD of polymer films is a substituted [2,2]-paracyclophane (dimer), which undergoes pyrolysis at 550° C. to form the reactive intermediate (FIG. 1C). Under typical experimental conditions, the polymerization does not occur in the gas phase due to the low concentration of the intermediate. Instead, the radical monomer concentrates via physisorption onto a solid surface, where polymerization begins by the dimerization of two radical monomers, leading to a noncoupled biradical dimer (a dimer with two radials). The polymer chain then grows by the attachment of monomer to a radical chain end.

In certain aspects, the present disclosure contemplates use of micrometer-thick, supported films of nematic liquid crystals (LCs) as substrates for CVD polymerization of substituted poly(p-xylylenes) (PPX) containing exemplary hydroxymethyl (—CH$_2$OH) or alkyne (—C≡CH) functional groups. Initial experiments are performed with the goal of achieving a conformal coating of PPX on the surface of LC film, but instead it is unexpectedly discovered that the LC templated the polymerization of PPX to form surface-immobilized mats of nanofibers with well-defined shapes and very high aspect ratios. Subsequent investigation shows that diameters of the fibers are influenced by the choice of LC and the length of the fibers related to a thickness of the film of LC. Specifically, results suggest that formation of a point defect in the LC by the growing fiber leads to preferential growth of the fiber structure parallel to the LC director. The versatility of the methodology is demonstrated by showing that manipulation of strain in the LC film (e.g., bend or twist) can be used to control the fiber shape which, for twisted fibers, leads to optically active arrays. Further, a ratio of R- and/or S-configured side groups can control the degree of twisting that occurs in the nanofiber. For example, as a % enantiomeric excess (% EE) is increased, the amount of twisting in a given direction is likewise increased, where $$\% \ EE = \frac{S_{configured} - R_{configured}}{S_{configured} + R_{configured}}.$$

Further, diameter of the nanofibers can be controlled by the chemistry and elasticity of the liquid crystal.

Further, by using PPX-CH$_2$OH or PPX-alkyne as exemplary systems, it is possible to covalently react a fluorophore with the surface of the fibers. The resulting fluorescence intensity of the array of fibers is fifteen times larger than the intensity of an unstructured PPX film, suggesting that the high surface area of the mats can be used, for example, to increase the binding capacity of surfaces during detection of biologically relevant molecules. Finally, fibers can be synthesized also on the surfaces of complex geometries, such as inside the micro-scale pores of a metal grid. In this case, the length of the nanofibers spans the pore of the grid, suggesting that LC-templated nanofibers might find applications in the synthesis of hierarchically structured materials in filtration and separation systems.

Figures 3A, 3B, 3C:
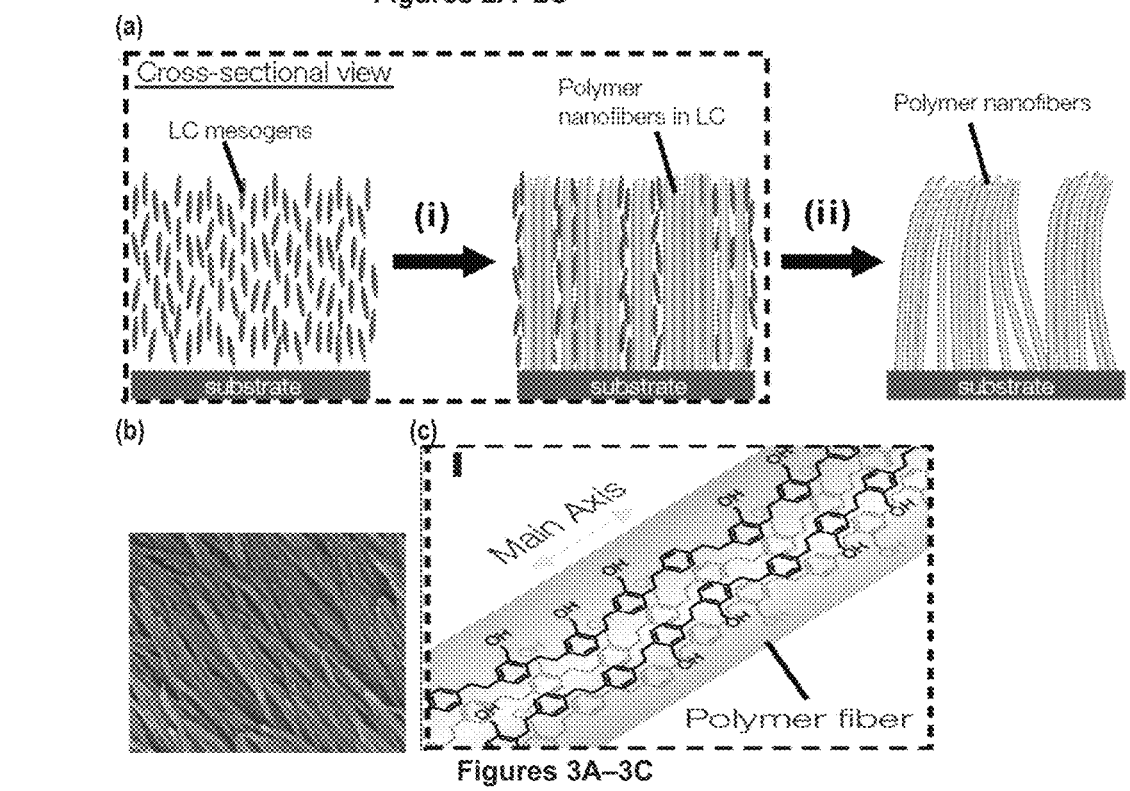

In another aspect, chemical vapor deposition (CVD) is conducted in accordance with certain variations of the present disclosure to thermally activate molecules, such as [2.2]paracyclophanes to form diradical species, and facilitate their subsequent polymerization at surfaces to form polymeric films. As shown in FIG. 3A, first a substrate of glass having a layer of liquid crystal mesogens, such as a micrometer-thick film of the 5CB nematic liquid crystal (LC) is provided. In this embodiment, compound 1a is then reacted via CVD onto a glass surface covered with the micrometer-thick film of the nematic liquid crystal (LC). Then, the LC is removed (as confirmed by FTIR spectroscopy), resulting in formation of a surface decorated with an aligned array of nanofibers as shown in FIG. 3B. The polymer nanofibers are anchored at one end to the surface, and are determined to be structurally amorphous, yet optically birefringent, as confirmed by cross-polarized light microscopy. Insertion of a quarter wave plate confirms that the refractive index is greatest along a fiber axis, consistent with the alignment of polymer chains along the main axis of the nanofibers (FIG. 3C). Thus, the orientation of the polymer chains align with the optical axis of the polymer nanofibers formed.

As discussed above, nematic LCs are structured liquids within which the molecules exhibit long-range orientational order. FIG. 43 shows a schematic illustrating various aspects of the long range orientational order. A discotic LC having disc-like molecules is shown as is a calamitic LC having rod/ellipse-like molecules. In certain variations, calamitic LCs are selected for use as the structured fluid into which the reactive monomers will be deposited via CVD. Further the effects of temperature are shown in a structured fluid in FIG. 43, where a solid is crystalline, while increasing temperature leads to a liquid crystalline smectic phase, followed by a liquid crystalline nematic phase, and finally at the highest temperature a liquid that is isotropic. The crystalline solid material exhibits anisotropy, but generally lacks fluidity. As temperature increases, the smectic LC phase begins to introduce more fluidity, while also providing anisotropy. The nematic LC phase provides even greater fluidity than the smectic phase, while still providing anisotropy. As temperature rises, the liquid crystal loses anisotropy to become isotropic, while it gains significant fluidity. In certain variations, nematic LCs show particularly desirable long-range orientational order for forming the polymeric nanostructures in accordance with the principles of the present disclosure. The nematic LCs exhibit both fluidity and anisotropy that facilitates formation of the polymeric nanostructures during the CVD polymerization process.

Conducting CVD into films that lack this long-range order, for example, solid crystalline 5CB, isotropic 5CB, and silicone oil did not yield nanofibers, indicating that the ordered, yet fluid properties of the nematic LC is necessary for the shape-controlled synthesis of nanofibers. Replacement of 5CB with a nematic LC called E7, which is a mixture of cyanobiphenyls that is nematic over a wider temperature range than 5CB, or TL205, which is a halogenated LC with a lower solubility for hydrocarbon compounds than 5CB or E7, also yield organized assemblies of nanofibers. The diameters of the nanofibers, however, are dependent on the composition of the LC (67±9 nm in TL205, 86±9 nm in E7, and 141±11 nm in 5CB (FIG. 4A)). In contrast to 5CB and E7, nanofibers synthesized using TL205 display a broadening of the fiber tip furthest from the surface, which indicates preferential polymer fiber growth near the surface of the LC film due to lower solubility of the monomers in TL205, as compared to the non-halogenated LCs. Overall, these results are consistent with a theorized mechanism of growth in which the thermally generated radicals partition into the structured LC fluid, adsorb to the solid-LC interface, and initiate growth of the nanofibers. The polymer chains preferentially grow along the alignment direction of the LC molecules, creating well-organized nanofibers inside the structured fluid.

Figure 4A:
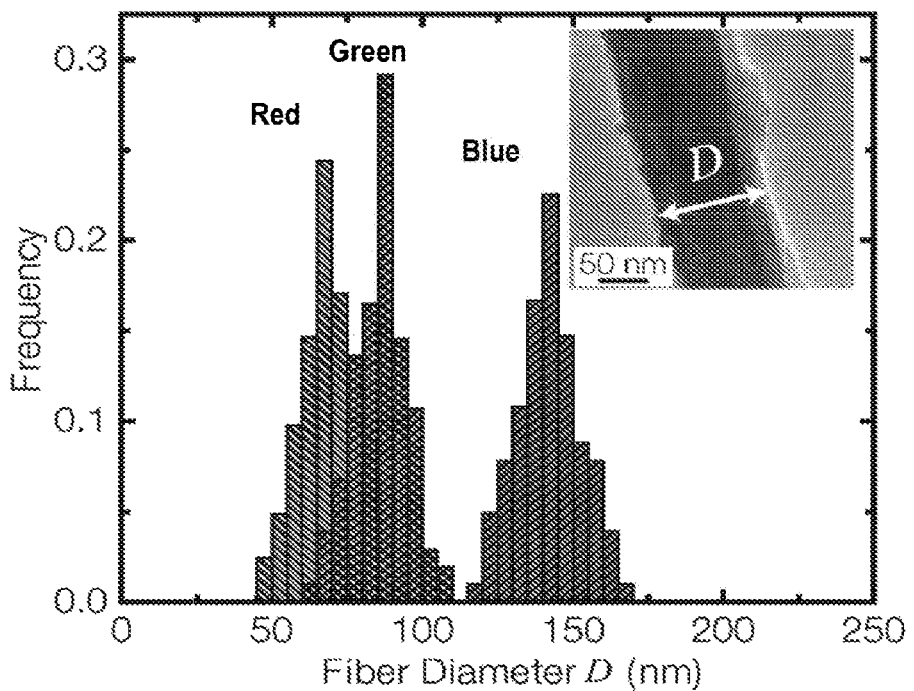
Figure 4B:
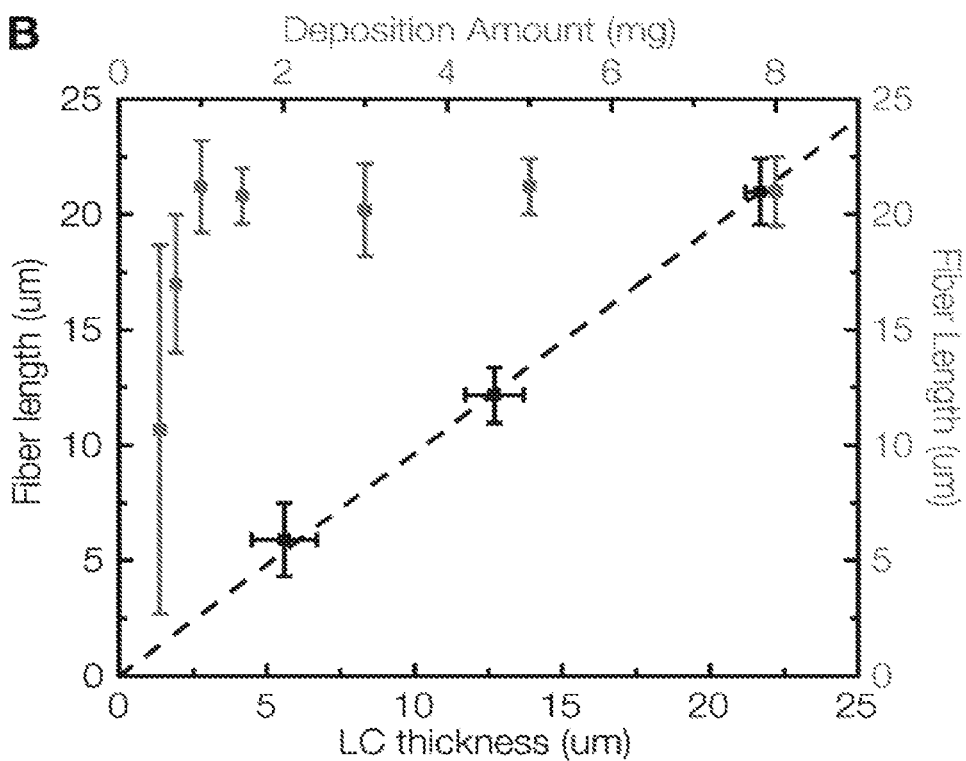
Figures 4C, 4D, 4E, 4F, 4G, 4H:
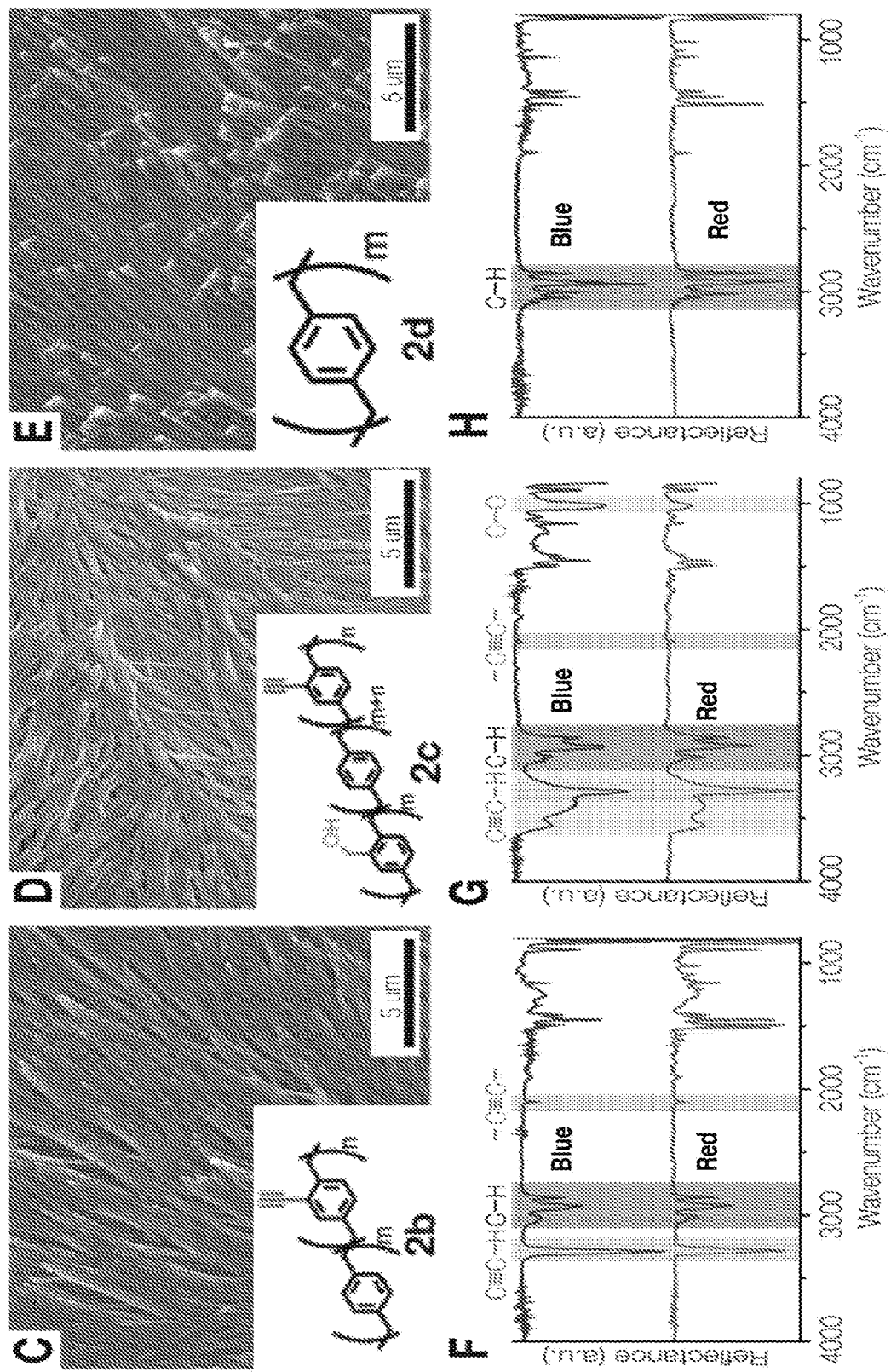

FIGS. 4A-4H. FIG. 4A shows frequency distribution of nanofiber diameters obtained by polymerizing 6 mg of compound 1a to form compound 2a into distinct liquid crystals, namely 5CB (blue), E7 (green) and TL205 (red). The inset shows a typical TEM image of an individual fiber templated in 5CB. FIG. 4B shows nanofiber length as a function of the LC film thickness used during the polymerization process. Representative SEM images and FTIR spectra of FIGS. 4C, 4F showing polymer/compound 2b shown in inset of FIG. 4C, FIGS. 4D and 4G showing polymer/compound 2c shown in inset of FIG. 4D, and FIGS. 4E and 4H showing polymer/compound 2d shown in inset of FIG. 4E templated into TL205 liquid crystal. TL205 is removed prior to imaging and IR analysis. FIGS. 4F-4H show IR spectra of the nanofibers (red) compared to the corresponding polymer films synthesized without the LC phase (blue).

CVD polymerization to form polymer/compound 2a using E7 films with thicknesses ranging from 5 to 22 µm is conducted and it is found that the lengths of the fibers formed closely match the LC film thicknesses as shown in FIG. 4B. CVD of chemically functionalized [2.2]paracyclophanes can be used to synthesize (i) alkyne-functionalized nanofibers for reaction with azide derivatives (polymer/compound 2b as shown in FIG. 4C, nanofibers that simultaneously present alkyne and hydroxyl groups for reaction with azides and activated carboxylic acids in polymer/compound 2c shown in the inset of FIG. 4D, and nanofibers without functional groups from polymer/compound 2d shown in the inset of FIG. 4E that can act as a non-reactive reference. When grown into TL205 liquid crystal, these nanofibers are morphologically identical (FIG. 4C-4E) yet display the spectroscopic signatures of the respective functional groups, as measured by FTIR spectroscopy (FIG. 4F-4H). The FTIR data thus suggest that the chemical functionality of shape controlled nanofiber assemblies can be altered, while maintaining their original morphology. This is a powerful tool for surface patterning of complex topologies, such as the controlled presentation of high-density protein arrays as an illustrative example.

Figures 5A, 5B, 5C:
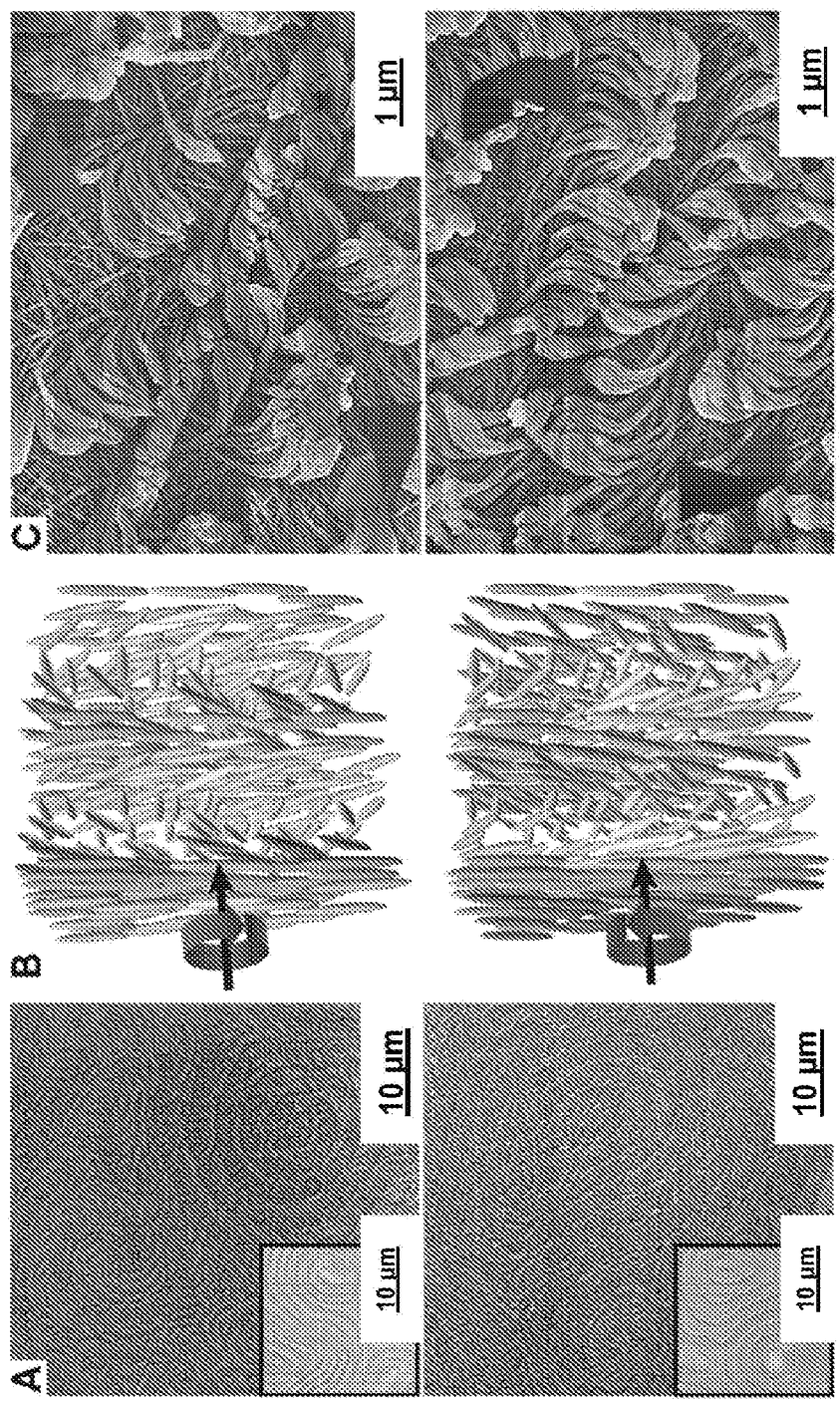
Figures 5D, 5E, 5F:
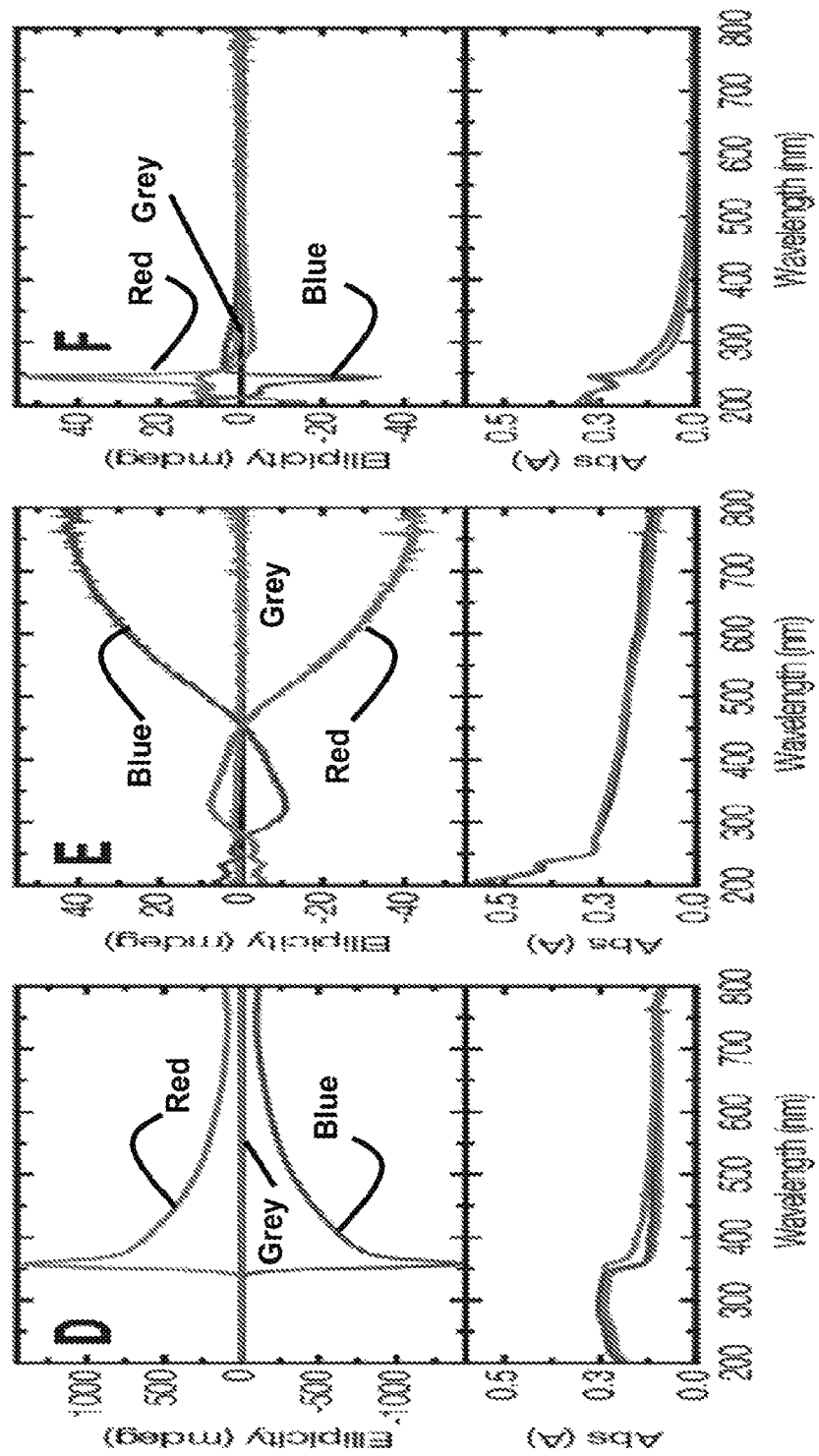

The internal ordering of LC films can be manipulated by changing surface interactions, topology or chirality, thus offering a diverse range of nanofiber templates. 5% wt./wt. is added of either enantiomer (R or S) of a chiral dopant to E7 to create cholesteric LC films in which the helical axes are opposite in handedness as shown in FIGS. 5A-5F. Templated CVD into the chiral LC films, and subsequent removal of the LC reveals shape-controlled nanofiber assemblies with micrometer-scale periodicities (4.7±0.9 um and 4.9±1.3 um for S- and R-templated nanofibers, respectively) and an organization consistent with the fingerprint pattern characteristic of the chiral LC films (periodicity of 4.4±1.2 um and 4.7±1.1 um for S- and R-handed cholesteric phase, respectively; FIG. 5A). The right-handed configuration of the cholesteric phase templated nanofibers into counterclockwise helices (S-configuration, red arrows in FIGS. 5B-5C) and, in contrast, the S-configured cholesteric phase resulted in R-configured nanofiber assemblies (blue arrows in FIGS. 5B-5C). Circular dichroism spectroscopy of the R- and S-configured nanofiber helices reveals distinct bands below 280 nm for the polymer chains, such as the aromatic rings of polymer 2a (FIGS. 5D-5E). Independent of the angle of incident light, the spectra further display broad bands between 300 to 800 nm, which vanish, when the nanofibers are dispersed in methanol (FIG. 5F), thus suggesting that they arise from cooperate effects of the helical nanofibers bundles.

Figures 6A, 6B, 6C, 6D:
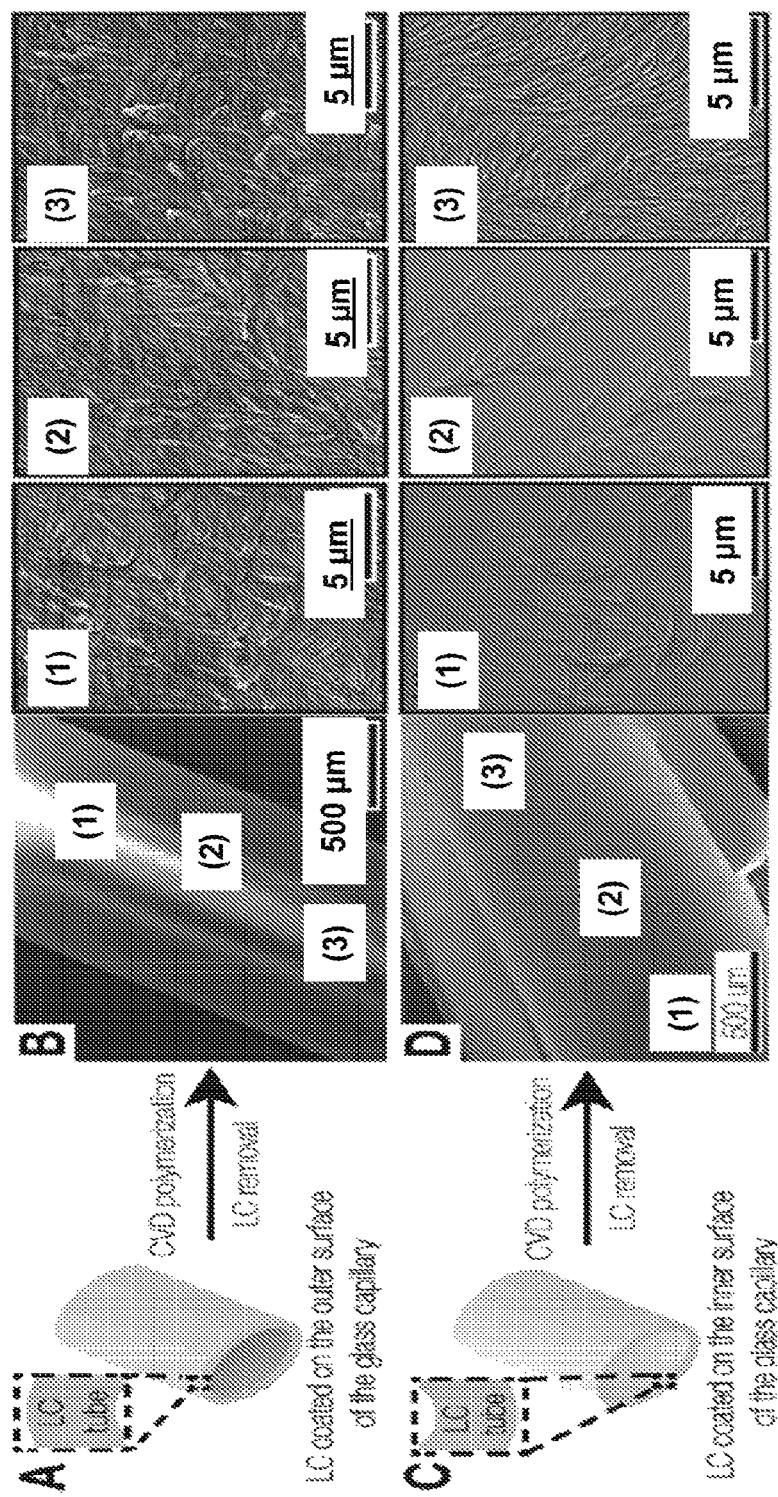
Figures 6E, 6F, 6G, 6H, 6I:
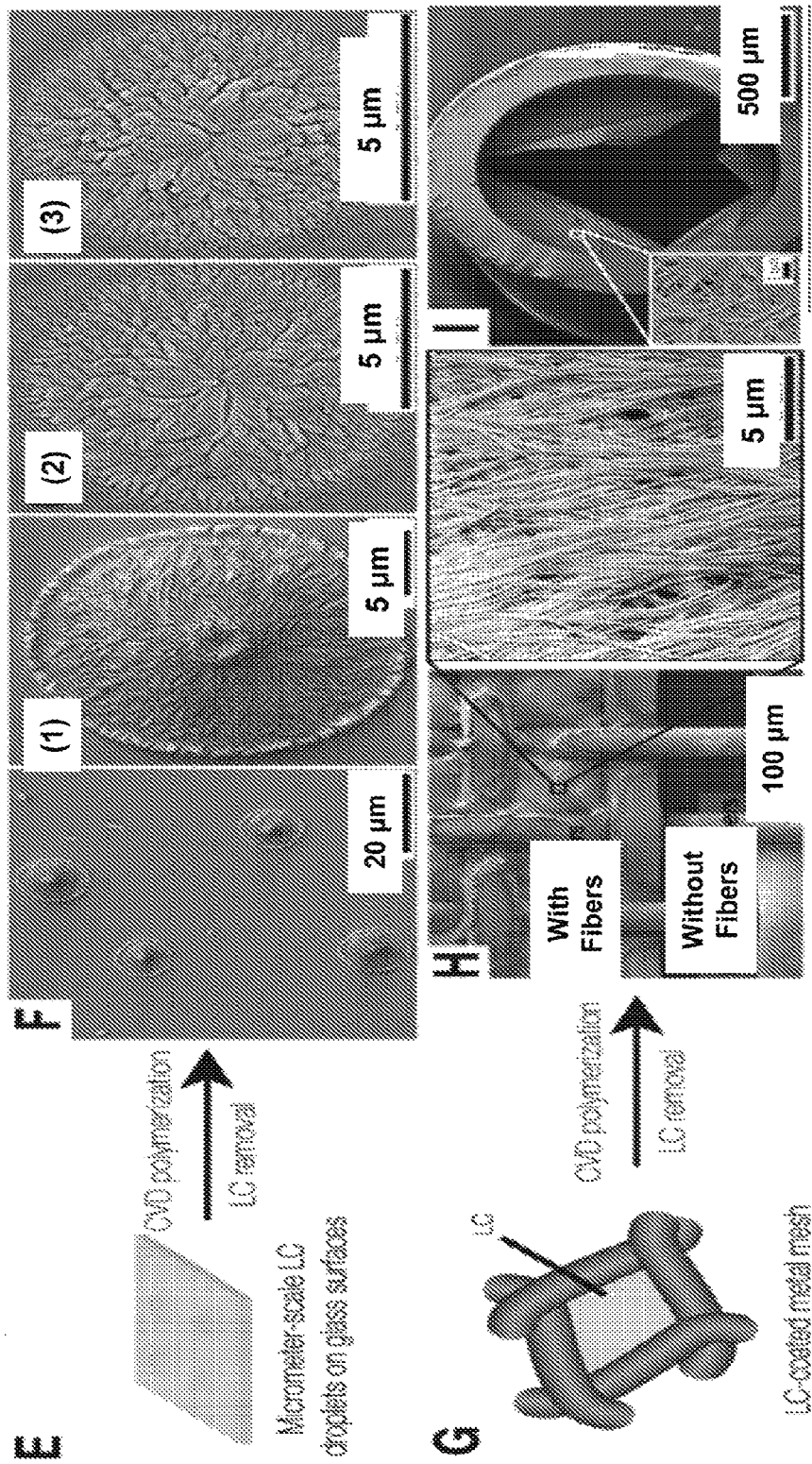
Figures 6J, 6K, 6L, 6M, 6N, 6O, 6P:
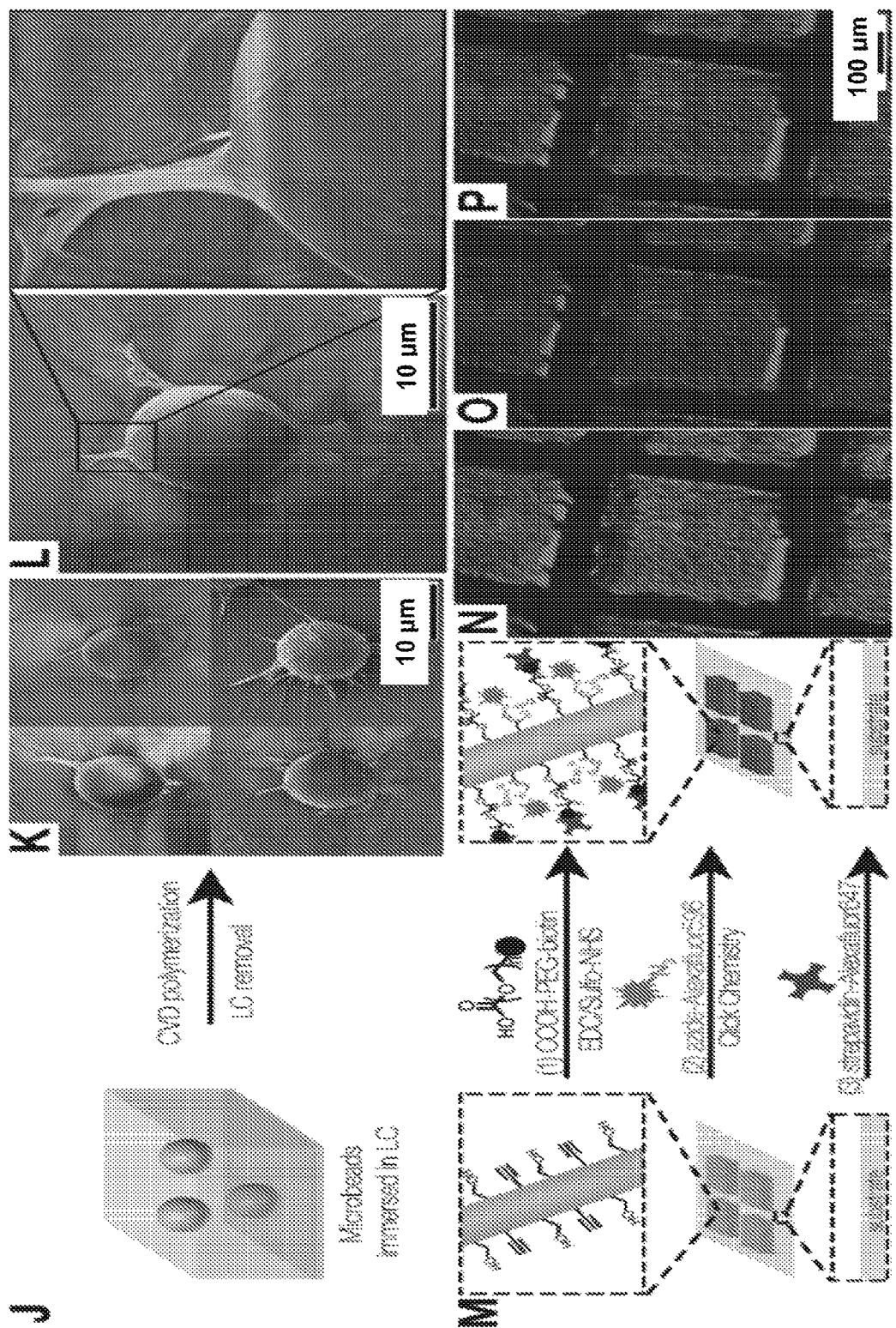

The feasibility of LC-templated CVD in systems with complex topologies and interfacial interactions prepared in accordance with various aspects of the present technology is further explored. In FIG. 6A, a conformally achiral LC film with a thickness of 5.1±2.1 um is formed on the entire surface of a cylinder. After CVD polymerization and subsequent LC removal, a homogenous array of nanofibers (97.5±17.5 nm diameter) decorated the curved surface of the cylinder, as indicated by the SEM images associated with representative regions 1-3 in FIG. 6B. Interestingly, CVD of compound 1a into a thin film of E7 spread onto the luminal surface of a glass capillary also leads to templated nanofibers, where the density of the nanofibers decreases with increasing distance from the orifice. A scalable approach towards mesoscopic nanofiber structures (FIG. 6E) involved the deposition of micron-sized LC droplets onto a glass substrate using electrospraying followed by CVD and removal of the templating phase. FIG. 6F confirms that spherical nanofiber patterns can be prepared with micron-scale resolution. FIG. 6G shows that a free-standing LC films can also template aligned nanofiber assemblies. FIG. 6H shows a metallic mesh with 110 μm-wide pores that are partially coated with a thin film of LC. After CVD polymerization and LC removal, highly aligned and uniform nanofibers are observed to span the LC-coated pores. In contrast, parts of the metal mesh that are not coated with LC are covered with a conformal polymer coating. At a larger scale, FIG. 6I confirms this finding for a glass capillary that is filled with LC prior to CVD polymerization. A free-standing film of nanofibers is formed at the orifice of the capillary. In contrast to FIG. 6H, the templated nanofibers are no longer aligned, suggesting that the LC phase lacked uniform order over extended areas. When glass microbeads are dispersed in the LC fluid prior to CVD polymerization (FIG. 6J), complex fiber bundles are formed locally at various locations on the beads, suggesting that topological defects induced by the particles in the templating LC phase may influence fiber initiation and growth (FIG. 6K-6L).

The CVD polymerization of functionalized [2.2]paracyclophanes not only provides access to a broad variety of functional groups, but also allows for co-presentation of multiple chemical groups on the same surface, which subsequently enables concurrent immobilization of different biomolecules. FIG. 6M shows a synthetic route used to synthesize multifunctional nanofibers followed by co-immobilization of two distinct ligands using bio-orthogonal immobilization strategies. After CVD co-polymerization of compounds 1a and 1b into a patterned substrate which presented 285 micron squares of an 18 micron thick film of E7 and LC removal, nanofiber assemblies are found resembling the original LC patterns. Chemical analysis of the nanofibers confirmed the presence of free hydroxy and ethynyl groups on the nanofibers (FIG. 4G). Next, the nanofiber assemblies are reacted with an activated biotin ester that readily binds to hydroxyl groups, as well as azide-functionalized Alexa Flour® 596, which exhibits high selectivity towards the ethynyl groups (FIG. 6N). Finally, Alexa Flour® 647-conjugated streptavidin derivative is used to visualize the presence of biotin groups on the surface of the nanofibers (FIG. 6O). Co-immobilization and homogenous distribution of both molecules are revealed in the overlay of images shown in FIG. 6P. Comparing two two-dimensional films of the same composition, the overall binding capacity is increased by 2.5-fold, which is attributed to the increased surface area of the nanofiber assemblies.

Thus, the present technology opens a new platform for designing functional polymer nanostructures with programmable geometry, alignment and chemistry. In particular, templated nanofiber assemblies are stable material' structures that can effectively modulate the circular polarization of light. The simple and potentially scalable approach to chiral films of controlled thicknesses provides the ability for systematic studies of chiral material properties that may guide further progress in the development of optical and optoelectronic functionalities. The ability to create functional and programmable nanostructures on a broad range of materials and complex geometries, demonstrated in FIGS. 6A-6P is attractive to a variety of applications, ranging from biomedical sensors, to filtrations, to catalytic reaction supports, by way of non-limiting example.

Various embodiments of the inventive technology can be further understood by the specific examples contained herein. Specific Examples are provided for illustrative purposes of how to make and use the compositions, devices, and methods according to the present teachings and, unless explicitly stated otherwise, are not intended to be a representation that given embodiments of this invention have, or have not, been made or tested.

Example

Materials and Methods

Figure 1E:
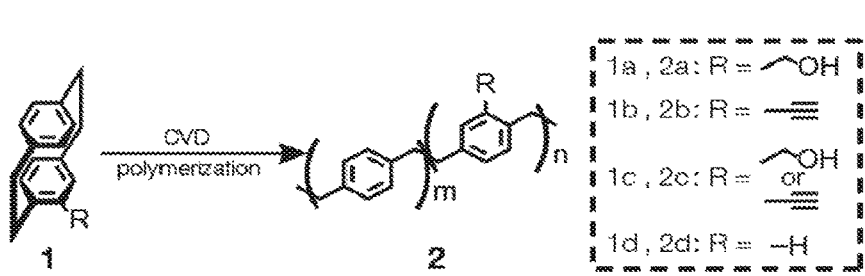

FIG. 1E shows structures for representative substituted paracyclophane precursors that are used herein to form substituted poly(p-xylylene) (PPX-R) reactive monomers. For compound 1a, R is a methoxy group and after CVD in accordance with certain aspects of the present disclosure polymer 2a is formed therefrom. For compound 1b, R is an ethynyl group and polymer 2b is formed therefrom. Compound 1c is a mixture of two distinct substituted poly(p-xylylene) (PPX-R) reactive monomers, where R is either a methoxy or an ethynyl group, and a copolymer 2c is formed after CVD polymerization. R is hydrogen and therefore substituted for compound 1d and the polymer 2d formed therefrom. 4-hydroxymethyl[2,2]paracyclophane (compound 1a) and 4-ethynyl [2,2]paracyclophane (compound 1b), are synthesized using the procedures described in L. Bondarenko, et al., "Part LII: Ethynyl[2,2]paracyclophanes—New building blocks for molecular scaffolding," Synthesis-Stuttgart, 2751-2759 (2004) and J. Lahann, et al., "Surface-initiated ring-opening polymerization of epsilon-caprolactone from a patterned poly(hydroxymethyl-p-xylylene)," Macromol. Rapid Commun. 22, 968-971 (2001), the relevant portions of which are hereby incorporated by reference. [2,2]Paracyclophane (compound 1d) is purchased from Kisco Conformal Coating LLC (San Jose, Calif.). The following nematic liquid crystals are obtained from EMD Millipore (Billerica, Mass.): 4-pentyl-4'cyanobiphenyl (5CB), E7 (a nematic mixture of cyanobiphenyls and terphenyls), and TL205 (a nematic mixture of halogenated biphenyls and terphenyls). The chemical structures of these nematic LCs are presented in FIGS. 2A-2C. The nematic-isotropic transition temperatures for these compounds are: 35° C. for 5CB, 60° C. for E7; and 87° C. for TL205, and 4-{[(1-methylheptyl)oxy]carbonyl}phenyl-4-(hexyloxy) benzoate (chiral dopant S-/R-811). Toluene (99.5% purity), acetone, hexane (CHROMA SOLV® grade), TWEEN® 20 surfactant, copper (II) sulfate, sodium ascorbate and octyl-trichlorosilane (OTS) are purchased from Sigma-Aldrich (St. Louis, Mo.) and used as received. Ethanol (anhydrous, 200 proof) is purchased from Pharmco-AAPER (Brookfield, Conn.) and used as received.

For the functionalization of the nanofibers with a fluorophore, the following molecules are utilized: monodisperse or "discrete" polyethylene glycol (dPEG®)-biotin acid is obtained from Quanta Biodesign, LTD (Plain City, Ohio). 1-Ethyl-3-(3-dimethylaminopropyl)carbodiimide (EDC), N-hydroxysulfosuccinimide (NHS), phosphate-buffered saline (PBS) solution, sulfuric acid and hydrogen peroxide are obtained from ThermoFisher Scientific (Waltham, Mass.). TWEEN® 20 surfactant is purchased from Sigma-Aldrich. The fluorophore-labeled molecules streptavidin-alexafluor647 conjugate and azide-Alexafluor596 are obtained from Life Technologies (Waltham, Mass.). TEM copper grids and quartz slides are purchased from Electron Microscopy Sciences (Hatfield, Pa.). SU-8 photoresist is purchased from MicroChem Corp. (Newton, Mass.).

Preparation of LCs.

5CB, E7 and TL205 are used as received from the vendor. Cholesteric LCs are prepared by adding 5 wt. % of S-/R-811 into the LC. Specifically, 3.5 mg of S-811 and R-811 is first dissolved in a small amount of toluene (about 7 mg). Then, the solution is added into 67 mg of LC, and the entire mixture is left in vacuum overnight to allow the toluene to evaporate.

LC Sample Preparation.

Solutions containing various concentrations of SU-8 photoresist are spin-coated onto glass slides to obtain films of the desired thickness between 5.6±1.1 and 21.7±0.5 µm. Pre-exposure bake, UV-exposure and post-exposure bake are carried out according to the specifications provided by the manufacturer. Prior to development of the photoresist with solvent, the films of cross-linked SU-8 are exposed to oxygen plasma and functionalized with a fluorinated monolayer. The samples are then sonicated in a solution of SU-8 developer, obtained from the manufacturer, for 3-5 minutes. A final baking step is carried at 95° C. for 10 minutes to remove any remaining solvent. The thicknesses of the resulting microwells are measured using a surface profilometer (Tencor, AlphaStep). A 5 µL droplet of the LC is spincoated onto the microwell arrays. The thicknesses of the LC are characterized by first measuring the retardance of the layer using a Berek compensator purchased from Olympus America Inc. (Melville, N.Y.) and are based on the value of the birefringence of the LC films obtained from literature. To create a layer of LC with uniform homeotropic alignment, clean glass slides are functionalized with OTS. The fabrication of the microwells is then carried out according to the procedure outlined below.

Alternatively, glass substrates are first sonicated in isopropanol and are then rinsed with ethanol. A TEM grid is subsequently placed on a cleaned glass substrate, and about a 1 µL droplet of LC is placed on top of the grid, allowing the LC to fill the whole grid. Excess LC is then removed from the grid using a capillary tube, yielding an approximate 18 µm thick LC layer.

10 µL or 50 µL glass capillaries are first sectioned into approximately 1 cm long tubes. The tubes are then incubated in piranha solution (3 sulfuric acid: 1 hydrogen peroxide volume ratio) for 30 minutes, followed by thorough rinse in deionized water (DI-$H_2O$). Subsequently, a drop of LC is either spread along the surface of the outer or inner glass capillary to form into a thin layer on the outer or inner surface of the tubes, or is filled into the entire capillary tube.

LC Films Supported in Microwells.

Briefly, details of the procedure for the preparation of microwells to support films of LC with controlled thickness and diameter are formed in solutions containing various concentrations of SU-8 photoresist (MicroChem Corp., Newton, Mass.) that are spin-coated onto glass slides to obtain films of the desired thickness between 5.6±1.1-21.7±0.5 µm. Pre-exposure bake, UV-exposure and post-exposure bake are carried according to the specifications by the manufacturer. Prior to development of the photoresist with solvent, the films of cross-linked SU-8 are exposed to oxygen plasma and functionalized with a fluorinated monolayer. The samples are then sonicated in a solution of SU-8 developer, obtained from the manufacturer, for 3-5 min. A final baking step is carried at 95° C. for 10 minutes to remove any remaining solvent in the SU-8 structure. The thicknesses of the resulting microwells are measured using a surface profilometer (Tencor, AlphaStep). A 5 µL droplet of the LC is spincoated onto the arrays containing the microwells. The thicknesses of the LC films are characterized by first measuring the retardance of the films using a Berek compensator purchased from Olympus America Inc. (Melville, N.Y.) and using the value of the birefringence of the LC from literature. To create films of LC with uniform homeotropic alignment, clean glass slides are functionalized with octyltrichlorosilane (OTS) obtained from Sigma Aldrich according to previously reported procedures. The fabrication of the microwells is then carried according to procedure outlined herein.

LC Films Supported on Pores of TEM Grid.

Glass substrates are sonicated in isopropanol, followed by a rinse with ethanol prior to use. A TEM grid is placed on a cleaned glass substrate, and a droplet with a volume of about 1 µL of LC is placed on top of the grid, allowing the LC to fill the whole grid. Excess LCs are then removed from the grid using a capillary tube.

LC Films Supported on Stainless-Steel Mesh.

Stainless steel meshes are sonicated in isopropanol, followed by a quick rinse in ethanol prior to use. A droplet of LCs is spread across the mesh using a pipette tip such that the LCs formed into "hanging" droplets at the pores of the mesh.

Microparticles Immersed in LC.

Polystyrene (PS) microparticles with an average diameter of 10.0±0.2 µm are obtained from Sigma-Aldrich. CVD polymerization is performed into films of E7 containing these microparticles. The films are supported on OTS-treated substrates using TEM grids with thickness of 18 µm.

Polymerization by Chemical Vapor Deposition (CVD).

Figure 7:
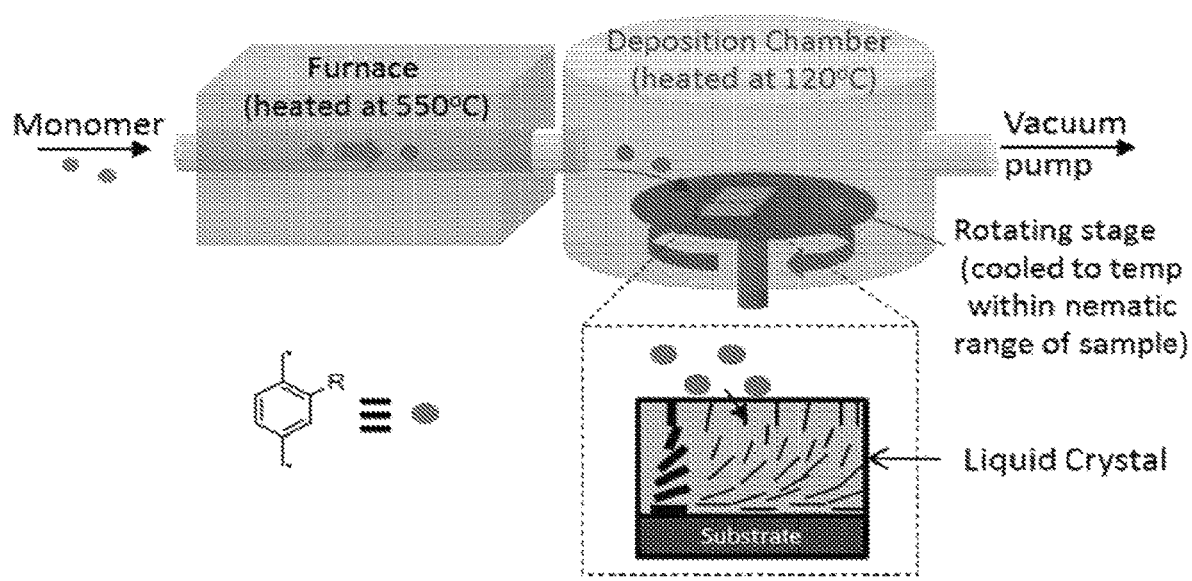
FIG. 7 is a schematic illustration of an example of a CVD process used to form polymeric nanofibers in LCs according to certain aspects of the present disclosure.

CVD polymerization is carried out on a custom-built CVD system that contained a sublimation zone, pyrolysis zone and deposition chamber as shown in FIG. 7. Specimens (LC supported in microwells, pores of TEM grids or on complex geometries and the like) are placed on a cooled rotating stage inside the deposition chamber and are pumped to reduced pressure slightly above 2 mbar. The rotating stage is subsequently cooled to a temperature within the liquid crystalline phase of the LC and the pressure inside the deposition chamber is further reduced to 0.1 mbar. Under these conditions, no significant evaporation of LCs is observed. For 5CB LC at 23° C., for example, the partial pressure is 0.0007 mbar. Subsequently, the starting material is sublimed at a temperature and pressure of 120° C. and 0.1 mbar, respectively, and is transferred to the pyrolysis zone by a stream of argon flow. Thus, precursors of compounds 1a, 1b, 1c (1c is a combination of compounds 1a and 1b) or 1d are sublimed at a temperature of 120° and pressure of 0.1 mbar inside the sublimation zone, and is then transferred to the pyrolysis zone by a stream of argon flow. Pyrolysis is performed at 550° C. and results in a stream of reactive molecules (e.g., di-radicals). Following pyrolysis, the di-radicals are transferred into the deposition chamber where they are exposed to films of LC prepared as described above. After the CVD process, the specimens are either rinsed with solvents, such as ethanol, acetone or hexane, or heat-treated at 75° C. under 0.1 mbar to remove the LC from the specimen.

To disperse the nanofibers from the supporting substrate after the CVD process, the LC is removed by repeatedly rinsing the specimen with ethanol and acetone. The specimen is then incubated in either methanol or ethanol and is placed in a bath sonicator for about 1 to 2 minutes. The nanofibers are then removed from the supporting substrates and dispersed into the solvent that the specimen is incubated in.

The procedure used for the fabrication of polymer-coated glass surface containing square patterns of PPX-CH$_2$OH nanofiber mats is as follows: a homogenous PPX-CH$_2$OH film is first coated on the glass surface. A TEM copper square grid is then placed on the PPX-CH$_2$OH-coated surface and filled with LCs, using a previously developed procedure. Subsequently, the PPX-CH$_2$OH is once again deposited by CVD. Following the CVD process, the sample is rinsed with ethanol to remove the LCs and the copper grid is peeled off from the sample, leaving the surface with square islands of PPX-CH$_2$OH fibers on the PPX-CH$_2$OH-coated surface.

To fabricate square islands of polymer 2c nanofiber arrays on a glass surface, first a TEM copper square grid is placed on the glass surface, and an approximate 1 µL droplet of LC is then placed on top of the grid, allowing the LC to fill the whole grid. Excess LC is then removed from the grid using a capillary tube. Subsequently, the specimen is coated with polymer 2c by CVD, where the polymer will form into nanofibers inside the LC layers filled inside the TEM grid. Following the CVD process, the sample is rinsed with ethanol to remove the LCs and the copper grid is peeled off from the sample, leaving the surface with square islands of polymer 2c nanofiber array.

Surface Functionalization.

2.5 mg of dPEG®$_{48}$-biotin acid and 2 mg of EDC are first added to 1 mL PBS solution (1 mM; pH 7.4) containing 0.02% (v/v) Tween 20, and the solution is mixed for 10 minutes. Subsequently, 0.2 mg of NHS is added into the solution, and the entire solution is mixed for another 10 minutes. A glass coverslip with square islands of polymer 2c nanofiber array (as shown in FIG. 41) is incubated in the mixture for 2 hours. Upon completion, the specimen is rinsed with PBS with 0.02% (v/v) Tween 20 to remove unbound molecules. Following the rinsing step, the specimen is incubated in an aqueous solution containing 10 µg/ml azide-Alexafluor596, 0.1 mM copper sulfate, 100 mM sodium ascorbate and 0.02% (v/v) Tween 20 for 1 hour, and is subsequently rinsed with DI-H$_2$O containing 0.02% (v/v) Tween20. Afterwards, the specimen is incubated in a PBS solution containing 0.1% (m/v) bovine serum albumin and 0.02% (v/v) Tween 20 for 10 minutes, and is then transferred to another PBS solution with 10 µg/ml Alexafluor647-strepavidin, 0.1% (m/v) bovine serum albumin and 0.02% (v/v) Tween20. The specimen is kept in the solution for 1 hour. After the incubation, the specimen is rinsed in PBS multiple times and analyzed with a Nikon Eclipse E800 epifluorescence microscope (Nikon Instruments, Japan).

Characterization of Nanofibers.

The morphology and sizes (diameter and length) of the nanofibers are analyzed using scanning electron microscopy (SEM) (FEI Helios NanoLab). A thin layer of gold is sputtered onto the samples prior to SEM imaging to minimize surface charging. Prior to imaging, the nanofibers are incubated in ethanol under constant gentle agitation for 30 minutes to remove LC. For length and diameter measurements, over 100 images are analyzed. The diameter of the nanofibers is also confirmed with transmission electron microscopy (TEM) (JEOL 2010F).

The birefringent of the nanofibers are characterized using cross-polarized light microscopy (PLM). The chemical composition of the polymer nanofibers is characterized via X-ray photoelectron spectroscopy (XPS) and Fourier transform infrared spectroscopy (FTIR). XPS data are obtained using an Axis Ultra X-ray photoelectron spectrometer (Kratos Analyticals, UK) equipped with a mono-chromatized Al Kα X-ray source at a power of 150 kW. The survey and high-resolution spectra are taken at 160 eV and 20 eV, respectively. All spectra are calibrated with respect to the non-functionalized aliphatic carbon with a binding energy of 285 eV. FTIR spectra are obtained on a Nicolet 6700 spectrometer with grazing angle accessory (Smart SAGA) at a grazing angle of 80°. A total of 128 scans are taken for each specimen. Circular dichroism (CD) and ultraviolet-visible (UV-Vis) absorption spectra of the helical nanofiber arrays anchored on quartz surfaces are obtained using a JASCO J-815 spectrometer.

For single-fiber analysis, POM and TEM are used. Prior to imaging, the samples are rinsed with ethanol as described above. Subsequently, the samples are placed in an ultra-sonication bath containing ethanol for 1-2 minutes to disperse the nanofiber into the ethanol solution. The dispersed nanofibers are then washed extensively to remove any residue of LC. Subsequently, the dispersed nanofibers are either drop-casted onto a pre-cleaned glass cover slip for POM, or are caught by a holey carbon-coated copper grid via the "fishing method" for TEM.

Chemical Characterization Via X-Ray Photoelectron Spectroscopy (XPS) and Fourier Transform Infrared Spectroscopy (FTIR).

XPS data are obtained using an Axis Ultra X-Ray photoelectron spectrometer (Kratos Analyticals, UK) equipped with a monochromatized Al Kα X-ray source at a power of 150 kW. The survey and high-resolution spectra are taken at 160 eV and 20 eV, respectively. All spectra are calibrated with respect to the non-functionalized aliphatic carbon with a binding energy of 285 eV. Fourier Transform Infrared (FTIR) spectra are obtained on a Nicolet 6700 spectrometer with the grazing angle accessory (Smart SAGA) at a grazing angle of 80°. A total of 128 scans are taken for each sample.

Surface Functionalization.

Samples of 2.5 mg of dPEG®$_{48}$-biotin acid and 2 mg of 1-Ethyl-3-(3-dimethylaminopropyl)carbodiimide (EDC) are first added to 1 mL PBS solution (1 mM; pH7.4) containing 0.02% (v/v) Tween 20 and mixed for 10 minutes. Subsequently, 0.2 mg of N-hydroxysulfosuccinimide (NHS) is added and the solution is mixed for another 10 minutes. A glass coverslip patterned with polymer nanofiber mats made by CVD polymerization of PPX-CH$_2$OH onto E7 is incubated in the mixture for 2 hours, followed by rinsing in PBS with 0.02% (v/v) Tween20 for multiple times. Following rinsing, the specimen is incubated in a PBS solution containing 0.1% (m/v) bovine serum albumin and 0.02% (v/v) Tween20 for 10 min., and is then transferred to another PBS solution with 10 μg/ml Alexafluor647-strepavidin, 0.1% (m/v) bovine serum albumin and 0.02% (v/v) Tween20 and is incubated in the solution for 1 hour. After the incubation, the specimen is rinsed in PBS multiple times and analyzed under a Nikon Eclipse E800 epifluorescence microscope (Nikon Instruments, Japan).

Discovery of Formation of LC-Templated Nanofibers.

Figure 8:
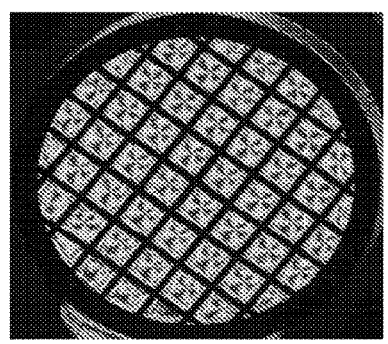
FIG. 8 shows a film of a liquid crystal 5CB material supported on a glass substrate coated with PPX-CH$_2$OH. The film appears colored, indicating that the LC director aligns parallel (planar) to the LC-polymer interface.

As described above, initially, an original goal is to encapsulate micrometer-thick films of LCs with thin polymeric films formed using CVD. Before carrying out the CVD polymerization of PPX onto the LC films, the alignment of nematic films of 5CB and E7 supported on substrates coated with substituted PPX are studied. In FIG. 8, a polarized light micrograph (transmission mode using white light illumination) of a film of 5CB supported on a PPX-CH$_2$OH-coated transparent substrate. The TEM grid evident in the image is used to stabilize the LC film against dewetting. The thickness of the TEM grid is 18 μm and the thickness of the LC films is similar to it (as discussed below). As shown in FIG. 8, the sample, when viewed through crossed polars, appear colored due to the birefringence of the LC, indicating that the orientation of the LC is parallel to (or tilted away from the surface normal) the PPX-CH$_2$OH-coated surface. At the free surface of the LC, the orientation of the LC is along the surface normal, and thus the birefringence evident in FIG. 8 can be attributed to the orientation of the LC at the PPX-CH$_2$OH film. Similar results are obtained for nematic films of E7 supported on PPX-CH$_2$OH. Through this observation, it is concluded that if CVD deposition onto the free interface of the LC led to formation of a thin film of PPX-CH$_2$OH at that interface, the LC would assume a planar or tilted anchoring of the LC at that interface.

Initially, films of PPX-CH$_2$OH are deposited onto the free surface of a supported film of the LC. Films of nematic E7 that are prepared by hosting the LC within microwells fabricated on the surface of a glass substrate are employed. The microwells created films of LC that had diameters of 200 μm and thicknesses of 21.7±0.5 μm. In response to the anchoring conditions imposed by the glass and the free surface of the LC, the orientation of the director of the LC in the microwell changes continuously from parallel at the glass surface to perpendicular at the free surface (so-called hybrid alignment). Deposition of the PPX-CH$_2$OH is carried out according to the procedure described above. The mass of dimer used during the deposition is 50 mg, and it is believed that it would lead to a polymer film with a thickness of 46 nm (based on prior experiments in which deposition is carried out onto solid substrates). In addition, because the deposition of the polymer film would cause the LC to change from a perpendicular to parallel orientation at the free/polymer-coated interface (see above), it is predicted that formation of a thin film of polymer at the free interface of the LC would cause the optical retardance of the LC to double in magnitude. Contrary to these expectations, a significant change in the optical appearance or retardance of the LC film after performing the CVD polymerization is not measured (see FIGS. 9A-9B). Note that there is little difference in the optical appearance of the films in FIGS. 9A and 9B. The LC films had thicknesses of 21.7±0.5 μm and diameters of 200 μm. This observation indicates that either a thin film of PPX-CH$_2$OH is not formed at the free surface of the LC or, if the polymer is deposited, the film did not cause planar anchoring of the LC.

To provide insight into the above observations, the optical retardance of the samples as a function of temperature is quantified. An image of an E7 film after CVD polymerization is shown in FIG. 10A. The optical retardance of the sample is measured to be 2330±25 nm. Because the thickness of the LC film is 21.7±0.5 μm and adopted a hybrid-aligned configuration, the effective birefringence of the sample is calculated to be 0.106±0.005. In contrast, the expected birefringence of a sample of E7 within which the director adopts a uniform planar orientation throughout the thickness of the film would be 0.224. This result indicates that the director of the LC film maintained the hybrid alignment after CVD polymerization. As the temperature of the LC sample is increased, a continuous decrease in retardance is observed (FIG. 10D), consistent with a decrease in nematic order of the E7 with increasing temperature. For E7, a phase transition from a nematic to an isotropic phase occurs at 60° C., and at this temperature, the LC sample is expected to lose all birefringence (retardance drops to zero) and thus appear dark when viewed through cross-polars. In contrast, however, the birefringent properties of the samples are observed to persist above the nematic-to-isotropic phase transition temperature of the LC. At the elevated temperatures (70° C., or 10° C. above the nematic-isotropic transition of E7), the sample appears as a series of discontinuous domains of bright yellow and white colors (FIG. 10B). The optical retardance of the sample at these temperatures is measured to be 240±50 nm. This series of observations suggested that a birefringent polymeric structure, distinct from E7, had formed within the volume of the E7 during the CVD process. It is also observed that cooling of the sample below 60° C. (the nematic-isotropic transition temperature of the E7) resulted in a spatial patterning (texture) that is different from that observed prior to heating, hinting that the birefringent structure present within the E7 is able to re-organized when the E7 transformed from a nematic to an isotropic phase (compare FIGS. 10A and 10C). However, when the optical retardance of the sample is quantified as a function of temperature, the temperature-induced change in retardance is measured to be reversible, consistent with the presence of nematic E7 within the film (FIG. 10D).

To characterize further the LC films following CVD, the E7 is evaporated from the samples by placing the samples under high vacuum (<$10^{-5}$ mTorr) for several minutes. After the E7 has evaporated, the samples are imaged and measured their optical retardance as a function of temperature. An image of a region of the sample following removal of E7 is presented in FIG. 11 (FIGS. 10A-10C and 11 are from two different regions of the sample). Inspection of FIG. 11, even at this low magnification image, reveals evidence of bristle-like elements within and at the edges of the circular structure. Moreover, after heating of the sample to 70° C., the retardance remained constant at 240±50 nm. The optical appearance of the sample did not change when it is submerged in toluene, ethanol or water, or after the sample had been blown with a stream of nitrogen. These observations led to the conclusion that the structure shown in FIG. 11 is firmly attached to the supporting substrate and did not contain any additional LC material.

To provide information about the nanoscopic structure of the sample shown in FIG. 11, scanning electron microscopy (SEM) is performed. The images obtained by SEM are presented in FIGS. 12A-12B. Inspection of FIGS. 12A-12B reveals the presence of a mat of fibers, with the fibers having lengths of micrometers and diameters of nanometers (additional quantification of the lengths and diameters of the fibers is presented below). Qualitatively similar mats of nanofibers are observed after CVD of PPX-$CH_2OH$ into films of nematic 5CB or TL205 (discussed below). Finally, the nanofibers are observed to form only in the areas of the substrate covered by the LC. Outside of these regions (between the LC-filled microwells), the CVD process led to the deposition of uniform and continuous films of PPX-$CH_2OH$.

Characterization of the Length, Diameter and Number Density of Fibers.

The results above suggest that CVD of PPX-$CH_2OH$ into the LC films leads to the formation of mats of nanofibers. To characterize the length, diameter and number density of these fibers, the CVD polymerization of PPX-$CH_2OH$ into films of E7 supported on microwells functionalized with octyltrichlorosilane (OTS) are conducted. The thickness of the LC films is 21.7±0.5 μm. On OTS-treated substrates and at the free surface, the LC director orients in the direction perpendicular (homeotropic) to these surfaces. Because the director orientation propagates into the bulk of the film, the average director orientation throughout the film is also perpendicular to the confining surfaces (see FIG. 13A). When viewed with crossed-polarized light these films appeared dark (FIG. 13B), but imaging of these films under conoscopic illumination, a bright white circle overlaid by a black cross is observed (see bottom right corner of FIG. 13B), confirming that LC director adopted a uniform homeotropic alignment.

In the first experiment, 8 mg of the precursor is introduced into the reaction system and performed CVD. After CVD polymerization, the LC is removed by submerging the samples into a bath of ethanol for 30 minutes. Subsequent imaging of these samples with crossed-polarized light reveals the appearance of birefringent, bristle-like domains associated with the mat of nanofibers (FIG. 13C). By imaging this sample by SEM, fibers are observed that extend from the OTS-coated substrate up into the vacuum (FIG. 13D). The fibers are firmly anchored at the substrate and do not detach or disperse upon immersion in an ethanol bath (used to remove the LC). As discussed below, the lengths of the fibers in this sample is uniform, with an average length of about 21.2±1.2 μm. Fibers with significantly smaller or larger lengths are not observed in this sample. The average length of the fibers matches the thickness of the film of E7 used to fabricate the fibers (21.7±0.5 μm).

To characterize the length of the fibers, several SEM images of the fibers are taken and analyzed using the image processing software ImageJ. To facilitate measurements of the lengths, images are used where the fibers lay uniformly on the supporting substrate (FIG. 14A). The segments within the fibers are measured to account for changes in curvature in the fibers (FIG. 14B). The sum of the length of these segments is used as an approximation for the length of the fiber.

Next, the average fiber length as a function of the mass of dimer introduced during CVD polymerization (0.5 mg to 8 mg of precursor is loaded into the reactor) is characterized. The average and standard error of the fiber length are obtained by measuring the length of approximately 30 to 50 fibers from at least five microwells. As shown in FIG. 15A, the average fiber length is 21.4±2 μm when using between 1 mg and 8 mg of precursor. While the average length of the individual fibers changed little with the amount of precursor deposited, the number of fibers deposited per unit area is observed to increase, as discussed below. The close correspondence between the length of the fibers and the thickness of the LC films hints that the upper limit of the fiber length is determined by the thickness of the LC film. Interestingly, the fibers fabricated using 0.5 mg of precursor had a bimodal distribution of lengths. These samples contained a few fibers that had grown above 20 μm in length along with a large number of fibers with much shorter lengths (fibers with length as small as about 1 μm are observed in this sample). These short fibers are still firmly attached to the substrate and are not removed by immersion into ethanol or exposure to a stream of nitrogen gas, indicating that fibers grow from the solid-LC interface into the bulk of the LC. The distribution of the length of the fibers (FIG. 15B) also suggests that individual fibers nucleate at the substrate and that a subset of these fibers grow rapidly until they reach the free interface of the LC. Without being bound by any particular theory, it is theorized that the rapidly growing fibers deplete the concentration of monomer near the solid substrate, thus limiting the rate of growth of the second population of fibers.

To provide further support for the concept of the thickness of the LC film controlling the length of the nanofibers, the CVD polymerization is also carried out into homeotropic aligned E7 films with thicknesses of 5.6±1.1 μm and 12.7±1 μm. The mass of precursor used in each experiment is 3 mg. The thicknesses of the LC films are confirmed by measuring the optical retardance generated by LC added to the microwells without OTS-pretreatment. Representative images of the fibers fabricated on the 5.6±1.1 μm films and the 21.7±0.5 μm are presented in FIGS. 16A and 16B, respectively. Comparing these two images, a clear difference in the length of the resulting fibers (see area enclosed by dotted lines in FIGS. 16A and 16B) is observed. As shown in FIG. 16C, the fibers exhibit a narrow distribution of lengths, with the average length matches closely with the thickness of the LC films used for their fabrication. The lengths of the three groups of fibers are 5.9±1.6 μm, 12.1±1.2 μm and 20.9±1.2 μm. The results support the hypothesis that the thickness of the LC film sets an upper limit on the length of the fibers.

Next experiments that characterize the diameter of the fibers are conducted. These experiments are performed with nematic films of three LCs, 5CB and TL205 in addition to E7, all with an average thickness of about 21.7±0.5 μm. For each of these LCs, CVD polymerization of 6 mg of the dimer generates mats of fibers similar to those discussed above.

However, differences in the diameters of the fibers grown in each of the three LCs (see FIGS. 17A-17C and 18) are observed. First, the fibers grown in 5CB and E7 possess uniform diameters along their lengths, although the average diameters for these two sets of fibers are markedly different (141±11 nm in 5CB and 86±9 nm in E7) (FIGS. 17A and 17B). In contrast, the fibers obtained using TL205 had uniform diameters (67±9 nm) except at their free end (FIG. 18). Specifically, within about 500 nm of their free ends, the diameters of the fibers expanded to about 100 nm. This enlargement of the fiber diameter is also observed on fibers grown in E7 or 5CB when large amounts (greater than about 45 mg) of the dimer are used during CVD polymerization. This increase in the fiber diameter close to the free end of the fibers grown in TL205 (or 5CB/E7 with >45 mg of dimer) is due to polymerization of the reactive radical species at the free interface of the LC. The accumulation of polymer at the free interface of the TL205 may arise due to the lower solubility of reactive intermediates in TL205 as compared to E7 or 5CB. Past studies have observed the mixing of TL205 and amphiphiles (e.g., phospholipids) to be limited as compared to E7 and 5CB. TL205 is structurally distinct from 5CB and E7, the former comprising F-substituted mesogens, whereas the latter contain nitrile groups. Overall, these results suggest that the mechanism for nucleation and growth of the fibers during CVD polymerization is similar for all three of the LCs but that quantitative differences in the fiber structures emerge due to the differences in the physical properties of the LCs.

As discussed above, the lengths of the fibers prepared in LC films with thickness of 21.7±0.3 μm do not substantially change as the mass of the dimer used during CVD increases from 1 to 8 mg (see FIG. 15A). This result suggests that the density of the fibers on the surface grows with mass of dimer deposited. This effect is evident in FIGS. 19A-19D, which show a series of polarized light microscope (PLM) images of mats fabricated with increasing mass of dimer (these images are obtained using the samples discussed in FIG. 15B). The bright circular area containing bristle-like structures at the center of each image is the area inside the microwell where the LC is originally deposited. Note that, after removal of the LC following CVD polymerization by submerging the sample in ethanol, this area, supporting the mat of fibers, exhibits birefringence because it appears bright when viewed by cross-polarized light microscopy. The areas that did not contain LC prior to CVD polymerization (outside the microwells) appear dark when viewed through cross-polars. Although these areas are covered with a homogeneous film of PPX-CH$_2$OH during CVD polymerization, the areas outside the microwell do not exhibit birefringence. Homogeneous films of PPX-CH$_2$OH are not birefringent, but nanofibers are birefringent. Because individual fibers exhibit birefringence (see below), the increase in brightness in the series of images presented in FIGS. 19A-19D is believed to be associated with an increase in the number density of nanofibers within the microwell. Note that when 1.5 mg of the dimer is used, only a few strands of fibers are visible under the microscope (FIG. 19A). However, a clear increase in the brightness of the images is observed as the mass of dimer is increased from 3 mg (FIG. 19B), to 5 mg (FIG. 19C), and then 8 mg (FIG. 19D). This increase in brightness is measured quantitatively with ImageJ and the results are reported in FIG. 19E. The plot shows a generally linear relationship between the image intensity and the mass of dimer used during CVD polymerization, which suggests that the number density of fibers increases linearly with the amount of dimer used. These observations provide general support for the hypothesis that each fiber nucleates and grows independently of the other fibers in the mat.

Role of Nematic Order of LC in Templating the Formation of the Nanofibers.

To explore further the role of the nematic structure of the LC in templating the formation of the nanofibers, CVD polymerization of PPX-CH$_2$OH (mass of dimer is about 10 mg) is carried out with nematic 5CB (at 25° C.), crystalline 5CB (at 15° C.), isotropic 5CB (at 37° C.) and isotropic silicone oil (25° C.). It is noted that the phase behavior of 5CB is: a solid crystalline phase below 21° C.; a nematic phase between 21° C. and 35° C.; and an isotropic phase of 5CB above 35° C. The polymer structures formed by CVD polymerization into the different phases of 5CB and silicone oil are shown in FIGS. 20A-20D. Most significantly, the formation of nanofibers is observed only when the CVD polymerization is carried out using nematic 5CB (FIG. 20A). When cooled below its crystallization temperature, a thin polymer film formed on top of the crystalline 5CB (no nanofibers formed) (FIG. 20B). This observation indicates that the formation of the fibers requires the fluidity of the LC, presumably so that the reactive dimer formed during pyrolysis can diffuse into the LC film. When the CVD polymerization is performed in isotropic 5CB, the formation of a porous film with a thickness consistent with that of the isotropic 5CB film is observed as shown in FIG. 20C. This result indicates that fluidity of the film alone is not sufficient for nanofiber formation, but that the anisotropic ordering of molecules within the LC is needed to template the formation of the nanofibers. Similarly, when CVD polymerization is carried onto a film of isotropic silicon oil, clumps of polymer attached to the solid substrate are observed, but no nanofibers (FIG. 20D).

Chemical Characterization of Nanofibers.

To determine if the mesogens participate in the reaction leading to the nanofibers, XPS is used to survey for the presence of nitrogen in the nanofibers (398 eV). As a reference sample, a homogeneous film of PPX-CH$_2$OH is deposited onto a clean silicon wafer and its XPS spectrum is measured along with that of a nanofiber mat deposited into 5CB. The XPS emission spectra for these two samples (FIG. 1.17(a)) are almost identical with only two peaks being observed. The peak at 285 eV corresponds to the 1 s orbital energy for carbon while the peak at 533 eV corresponds to the 1 s orbital energy of oxygen. The peak corresponding to nitrogen (1 s) at 398 eV is not observed, indicating that the molecules of 5CB are not incorporated into the structure of the nanofibers. To provide further support for this conclusion, the ratio of the oxygen and carbon signal is calculated from the chemical structure of PPX-CH$_2$OH polymer alone, and compared the result with the experimental data obtained by XPS. This comparison is presented in the upper left corner of FIG. 21A. Note that the relative intensity of the carbon and oxygen peaks for the nanofibers and the homogeneous films matches very closely with theoretical values. These additional data confirm that the LC is not incorporated into the nanofibers, but rather that it provided a physical (structured) environment that directs the growth of the nanofibers.

For comparison, in FIG. 21B shows a high-resolution spectrum of a film of PPX-CH$_2$NH$_2$, which contains nitrogen, deposited onto a silicon wafer (purple trace). The spectra for the nanofibers and homogeneous film of PPX-CH$_2$OH correspond to the yellow and red traces, respectively, in FIG. 21B. Whereas the spectrum for PPX-CH$_2$NH$_2$ exhibits a peak at 398 eV due to nitrogen, the nanofibers and the homogeneous film do not have a signal for nitrogen.

To further validate the conclusions regarding the chemical composition of the nanofibers, the infra-red absorbance spectra of the mats of fibers using Fourier Transform Infra-red (FTIR) spectroscopy is characterized. The FTIR absorption spectra obtained from the mats of fibers show a strong resemblance to the spectra obtained from unstructured, homogeneous films of PPX-CH$_2$OH (see FIG. 22). In both spectra it is observed evidence of the PPX polymer backbone, characterized by the peaks at 2857, 2921, 3004 and 3044 cm$^{-1}$, and the hydroxyl group (peaks at 1020, broad peak at 3350 and 3600 cm$^{-1}$). However, the characteristic band of the nitrile (found in E7 and 5CB) at 2220 cm$^{-1}$ is not observed, confirming that the nanofibers are composed purely of the PPX-CH$_2$OH polymer.

The structure of individual fibers is also characterized by using electron diffraction spectroscopy within a transmission electron microscope (TEM). An image of a single fiber prepared in accordance with certain aspects of the present disclosure by CVD polymerization of PPX-CH$_2$OH in nematic E7 is presented in FIG. 23A, with the corresponding electron diffraction pattern shown in FIG. 23B. Inspection of the image of the nanofiber shows no obvious internal structure. Consistent with the absence of internal crystalline structure, a diffuse ring only is observed in the electron diffraction pattern of the fiber shown in FIG. 23B. Thus, the electron diffraction pattern in FIG. 23B, obtained by TEM from the fiber presented in FIG. 23A, indicates that the polymer in the fibers is amorphous.

Optical Characterization of Individual Nanofibers.

As noted above, mats of fibers exhibit birefringence (See FIGS. 11 and 19A-19E). Here the source of the optical anisotropy is addressed. Specifically, polarized light micrographs of individual nanofibers reveal that the fibers individually exhibit birefringence (see FIGS. 24A-24C and 25A-25D). The fibers in the image shown in FIGS. 24A-24C and 25A-25D are fabricated in accordance with certain aspects of the present disclosure by CVD polymerization of PPX-CH$_2$OH into a film of 5CB with thickness of 21.7±0.5 μm and supported on glass. The fibers are then detached from the glass substrate by vigorous sonication in ethanol and re-deposited onto a clean glass slide by the drop-casting technique. When the fiber is not aligned parallel to the orientation of either the polarizer or analyzer, FIGS. 24A and 24C, the fiber appears bright. In contrast, changing the orientation of the fiber so that it is aligned with the polarizer or the analyzer results in a dark image (FIG. 24B). Although the fibers are not crystalline (see FIGS. 23A-23B), the presence of birefringence in individual fibers indicates that there must be orientational ordering of the PPX-CH$_2$OH within each fiber.

To characterize the optical axis of the fiber, a quarter wave plate is inserted into the cross-polarized light microscope. The optical (slow) axis of a birefringent material indicates the direction of high refractive index. An image of the fiber observed with crossed polarized light microscopy, but without the quarter wave plate, is presented in FIG. 25A. As described above, the fiber appears bright when not aligned in the direction of the polarizer or analyzer. Images of the fiber observed using the quarter wave plate are presented in FIGS. 25B and 25C. In FIG. 25B, the fiber is oriented in the direction perpendicular to the slow axis of the quarter wave plate and the fiber appeared red. In FIG. 25C, the fiber is oriented parallel to the slow axis of the plate and appears blue. These observations indicate that the slow axis of the fiber is oriented along the length of the fiber. For materials where the birefringence arises due to the orientational ordering of aromatic groups (e.g., 5CB, rubbed poly(aromatic imides) or rubbed polystyrene), the slow axis is associated with the direction parallel to the plane of the aromatic groups. By analogy, it is concluded that the polymer chains of PPX-CH$_2$OH within the fiber are preferentially oriented along the length of the fiber (FIG. 25D).

Influence of the LC Director Configuration on Nanofiber Shape and Mat Morphology.

The results above suggest that the nematic order of the LC plays a key role in templating the formation of the nanofibers. To further explore this proposal, CVD polymerization is performed using films of E7 that are prepared with distinct director profiles. In these experiments, nematic E7 is used as the liquid crystal film. For experiments performed with the achiral nematic LC, films are used with thicknesses of 5.6±1.1 μm supported on octyltrichlorosilane (OTS)-treated glass or untreated glass (leading to films of LC with uniform homeotropic alignment (on OTS) or hybrid alignment (on glass)).

FIG. 26A shows polarized light micrographs of films of nematic E7 with uniform homeotropic alignment and FIG. 26B with nematic E7 with hybrid alignment prior to the films being introduced into the CVD reactor chamber in accordance with certain aspects of the present disclosure. The LC films exhibit distinct optical appearances consistent with the differing director profiles in each sample. Cartoons of the different director profiles of the LC samples are shown in FIGS. 26C and 26D. The dark black lines represent the local orientation of the director within the LC film. As discussed below, the different director orientations give rise to fibers with different shapes. Note that for the homeotropic aligned LC film, the director orientation is uniform throughout the film (FIG. 26C). In contrast, the nematic LC with hybrid alignment is characterized by a smooth change in the orientation of the director from parallel (planar) at the interface between the LC and the substrate, to perpendicular at the free interface of the LC (FIG. 26D).

Following CVD of 1.5 mg of the precursor into each LC film, the LC is removed by extraction with ethanol. Subsequently, the fibers are dislodged mechanically from the surface of the substrates by vigorous sonication. A droplet of ethanol containing a dispersion of fibers is then deposited onto a silicon wafer and imaged by SEM. Images of individual fibers are presented in FIGS. 26E-26F, where it can be observed that the morphology of the nanofibers depends on the configuration of the LC within the film during CVD polymerization. For example, straight, needle-like fibers are observed when films of E7 with uniform homeotropic alignment are used during CVD polymerization (FIG. 26E). However, when films of E7 with hybrid alignment are used, the resulting fibers had an arching form (a smooth change in orientation along the length of the fiber), as shown in (FIG. 26F). These results suggest that the director profile of the LC guides the growth of the nanofibers created during CVD polymerization.

Images of the intact mats of nanofibers, prior to sonication, reveal that the director configuration of the LC film also influences the higher-level organization of the fibers within the mats (FIGS. 26G-26H). Without limiting the present teachings to any particular theory, it is hypothesized that the bundling of the fibers occurs when the nematic LC is removed by immersion of the sample in ethanol and that the inter-fiber forces that underlie bundling are dependent on fiber morphology (and thus, in turn, the LC director profile in the film). For example, the bundles shown in FIG. 26H extend across the plane of the supporting substrate and then rise above the plane of the substrate. This arched morphology mirrors the director profile across the hybrid aligned LC film. These results support the observations that the director profile of the LC templates the formation of the mats nanofibers.

CVD Polymerization onto Cholesteric LCs.

Having established that the director profile across the LC film affects the morphology of fibers templated by LCs during CVD polymerization, mats of nanofibers are synthesized using chiral LCs. FIG. 27A shows a schematic of chiral LCs, also known as cholesterics, which are formed by the addition of chiral molecules to nematic LCs, such as E7, and characterized by a helical twist of the director. The pitch size, p, of the helix depends on the concentration, c, of chiral additive in the LC according to the following relationship: pc=H, where H is a constant called the helical twisting power of the chiral molecule. In FIG. 27B, a chemical structure of S-811, a chiral additive used in the liquid crystal of this experiment is shown. In this experiment, cholesteric LC containing E7 and 1.5 wt. % and 20 wt. % of S-811 are prepared. The films of the cholesteric LCs are supported on OTS-treated surfaces of microwells. The approximate thickness of the resulting films is 5.6±1.1 µm. CVD polymerization onto these films is carried according to the procedure established above using 1.5 mg of dimer.

PLM images of the cholesteric LCs with chiral dopant concentrations of 1.5 wt. % and 20 wt. % are presented in FIGS. 28A and 28B, respectively. The image of the sample containing 1.5 wt. % of S-811 displays a fingerprint texture, indicating that the helical pitch of the cholesteric is commensurate with the thickness of the LC film. The width of the fingerprints (=p/2) is measured as 3.9±0.3 µm, which is comparable to the thickness of the LC film (5.6±1.1 µm). In contrast, the image of the sample with 20 wt. % S-811 has a complicated granular structure (FIG. 28B), characteristic of cholesteric films with thickness that are much larger than the helical pitch. Using the H value for S-811 provided by the manufacturer (10.9 µm$^{-1}$), the pitch of the cholesteric with 20 wt. % of S-811 is estimated to be 460 nm.

The images in FIGS. 28A-28B provide insight into the director profile within the film. For the cholesteric LC, the director is oriented homeotropically at both interfaces. Between these two interfaces, however, the LC accommodates a helical twist of the director in the direction parallel to the interfaces. The colors of the bright regions of the fingerprint texture (FIG. 28A) depend on the local orientation of the director of the LC and indicate that, within the bulk of the film, the local orientation of the director is tilted away from the surface normal. The black domains that delineate the fingerprint pattern indicate that in these regions the director is orientation is uniformly homeotropic through the thickness of the film. These observations are summarized in the schematic for the director orientation presented in FIG. 28C, which shows the helical rotation parallel to the interfaces of the LC film that gives rise to the fingerprint pattern observed in FIG. 28A. The image in FIG. 28B can also be described by this model. In this case, the sample accommodates several rotations in the director orientation within the film since the pitch is much smaller than the film thickness (FIG. 28D).

After CVD polymerization into the cholesteric LC films and subsequent removal of the LC, the resulting fiber mats are imaged using SEM. Representative images of the mats of fibers obtained from CVD polymerization into the cholesteric films containing 1.5 wt. % and 20 wt. % of the chiral dopant are presented in FIGS. 29A-29D. The individual fibers grown in these LC are much more complex and had greater diversity of shapes than those fibers fabricated using other types of LC films (for example, see FIGS. 26A-26H). The fibers in FIGS. 29A-29B, for example, exhibit a distinct helical shape and form bundles that have a preferential clockwise (or left-handed) twist, defined when traversing the fiber or bundle from bottom (at OTS-coated substrate) to the top (into the vacuum). The average width of these bundles (see red dashed line in FIG. 29B is 4.1±0.2 µm, similar to the width of the fingerprints in FIG. 28A. While not limiting the present teachings to any particular theory, it is hypothesized that these structures are templated within the fingerprint of the cholesteric. In this sample, and between the chiral bundles, straight fibers are also observed with no helical bent, similar to those shown in FIG. 26E, suggesting that these fibers are templated within the homeotropic regions of the cholesteric film. Finally, several of the fibers within this sample had branching points, where multiple fibers connected. The origin of these branching points is not well understood. Images of the fibers fabricated on the cholesteric with 20 wt. % chiral dopant are shown in FIGS. 29C-29D. These fibers exhibit a twist within the structure of the fiber. If any section within the body of the fibers continues until reaching the top of the fiber (at the vacuum), the twist within the fiber is in the clockwise (left-handed direction). However, the characteristic pitch of this twist remains difficult to quantify.

To confirm that the chirality of the cholesteric LC controls the chirality of the fibers, CVD polymerization is performed onto cholesteric LC films with left-handed or right-handed chirality. In this experiment, films of E7 containing 5 wt. % of S-811 (left handed) or R-811 (right handed) are prepared according to the procedure described above. At this concentration of chiral dopant, the pitch of the cholesteric is 1.8 µm. As described below, circular dichroism (CD) spectroscopy is performed on these samples to confirm their chirality. To eliminate the optical effects that might arise from glass or S-811 photoresist, these cholesteric films are not supported on microwells. Instead, thin layers of cholesteric LC are spread onto quartz substrates functionalized with OTS. As discussed above, OTS induces homeotropic alignment of the LC at the substrate. The thickness of these LC films is not determined quantitatively. After CVD polymerization onto these cholesteric films, the samples are rinsed with ethanol several times to completely remove the LC.

Low magnification images of the mats of nanofibers resulting from CVD polymerization onto cholesterics containing S-811 or R-811 are shown in FIGS. 30A and 30B, respectively. These images revealed that the mats of nanofibers form circular structures. The separation distance between these circular structures is 1.6±0.1 µm, consistent with the pitch of the cholesteric (1.8 µm). High magnification images of the polymer nanofibers resulting from CVD polymerization onto cholesterics containing S-811 or R-811 are presented in FIGS. 30C and 30D, respectively. From these images, the fibers assemble into structures that have a preferential helical twist. Defining the twist from the bottom of the fiber (at the OTS-coated substrate) to the top (towards the vacuum), the fiber assemblies in FIG. 30C exhibit a clockwise (left-handed) twist. In contrast, the fiber assemblies in FIG. 30D have a bottom-to-top counter-clockwise (right-handed) twist. The handedness of the twist in these assemblies of nanofibers is similar to the handedness of the chiral molecule within the cholesteric LC film used during CVD polymerization, suggesting that the nanofibers adopted the chirality of the cholesteric.

To confirm the chirality of the fiber assemblies that resulted from the CVD polymerization into the cholesteric LCs, circular dichroism (CD) spectroscopy is performed using a J-815 CD spectrometer from Jasco Analytical Instruments (Easton, Md.). CD spectroscopy measures the difference between the absorbance of polarized light with left-handed circular polarization and right-handed circular polarization over a range of wavelengths. The CD spectra of achiral molecules or achiral molecular assemblies are not expected to exhibit a peak, but the spectra of chiral chromophores can exhibit both positive and negative peaks. As shown in FIG. 31A where S-811 is blue and R-811 is red, the CD spectra of the cholesteric LCs exhibits a sharp peak at 360 nm; the sample containing S-811 gives rise to a negative peak while the sample containing R-811 gives rise to a positive peak. Next, CD spectroscopy is performed on the mats of nanofibers formed by CVD polymerization onto these LC films. As demonstrated by the CD spectra (FIG. 31B), fiber mats templated from left-handed cholesteric LC (containing S-811) exhibit a negative peak at 305 nm, while those fabricated onto a right-handed cholesteric LC (containing R-811) display a positive peak at the same wavelength. These results show that the mats of nanofibers are optically active. Moreover, the peak at 305 nm is within the UV range, indicating that this peak corresponds to electronic transitions in the molecules of PPX-$CH_2OH$. For comparison, the CD spectra of a homogeneous film of PPX-$CH_2OH$ supported on quartz do not exhibit any peak. As discussed above, the chemical characterization of the nanofibers via XPS and FTIR reveal that the composition of the nanofibers and the homogeneous PPX-$CH_2OH$ film is identical. Thus, the CVD polymerization of PPX-$CH_2OH$ onto cholesteric LCs gives rise to a helical twist on the polymer chains of PPX-$CH_2O$ in addition to the helical twist in the fibers and fiber assemblies.

In the context of the results described above, it is noted that conventionally, chiral LCs loaded with a Ziegler-Natta catalyst have been used to template the formation of helical polyacetylene (PA) films. Polymerization of PA readily leads to the formation of fibers even in the absence of the anisotropic environment of the LC, although these are randomly oriented and their length and diameter cannot be readily controlled. Previous work by Akagi et al. demonstrates that the use of catalyst-loaded cholesteric LCs during the polymerization of PA gives rise to helical fiber structures. In this case, the handedness of the helical PA films is opposite to that of the catalyst-loaded cholesteric LC used to template the polymerization of the helical PA.

The approach presented here for synthesis of helical mats of nanofibers via CVD polymerization thus differs from what has been reported previously on several points: (1) the present approach does not require preloading the LC with catalyst; (2) all the materials are commercially available, while the work by Akagi et al. utilized LC materials that are not commercially available; (3) the chirality of the mats of nanofibers fabricated by CVD polymerization is the same as the chirality of the LC; the chiral mats of PA fabricated by Akagi et al. possess opposite chirality to that of the catalyst-loaded cholesteric LC; (4) the present technology demonstrates that the formation of nanofibers through CVD polymerization in LCs depends entirely on the anisotropic environment of the LC (the formation of the nanofibers when using isotropic liquids or mesogen forming liquids above their nematic-isotropic transition temperature is not observed); in contrast, PA readily forms fibrils even in the absence of an anisotropic environment and the role of the LC is to direct the growth of the fibrils. Thus, the fabrication of the chiral mats of nanofibers via CVD polymerization onto cholesteric LCs has not been previously possible based on conventional techniques.

Mechanism of Nanofiber Formation in LCs.

FIG. 32 shows a schematic of a summary of a sequence of reaction events believed to occur during the processes provided by the present teachings. The experimental data presented in the sections above, when combined, are consistent with the concept that anisotropic polymerization of PPX within LC films occurs through the following sequence of events: (i) reactive diradical intermediates (circles) created during pyrolysis of the substituted paracyclophanes ([2,2']-paracyclophanes) partition into the LC, and diffuse across the thickness of the bulk anisotropic LC film to the interface with the supporting solid; (ii) the diradical species adsorb and accumulate at the solid-LC interface, where the polymerization of PPX is initiated due to the high local concentration of initiator and the director orientation of the LC templates the fiber morphology (black lines). The clusters or clumps of spheres represent the growing polymer structure on the surface of the substrate; (iii) polymerization propagates from the surface into the bulk of the LC, where the director of the LC guides the fiber growth. Anisotropic growth of polymer structure stops once the free interface of the LC film is reached. The diameter, D, and length, L, of the fibers are determined by the type of LC and the LC film thickness, respectively; and (iv) anisotropic polymerization continues until the fiber reaches the free interface of the LC. Once the LC is removed, the fibers collapse and form bundles.

While the above-described mechanism is supported by experimental observations, control of the location and direction of polymerization is further addressed herein. In this context, as the polymer particle nucleates and grows on the surface of the solid, it is believed that it will perturb the local order of the LC. At macroscopic interfaces, the LC aligns parallel to the surface of the polymer. When the growing polymer particle reaches a threshold size, it is hypothesized that the surface-induced alignment of the LC will generate a singular point defect in the LC (see FIG. 33). These defect structures (called Boojums) have been extensively described in the context of colloid particles suspended in LCs. Within the core region of the defect, which is a few nanometers in diameter, the degree of molecular ordering of the mesogens is substantially lower than the bulk LC. Correspondingly, the free energy density of the core of the defect is high. In addition, in the volume of LC surrounding the core, the elastic strain of the LC is high. A number of past studies have demonstrated that the high free energy density of the cores of LC defects (and surrounding strained LC) can recruit colloidal and molecular species.

Without limiting the present disclosure to any particular theory, it is believed that the diradical monomer likely partitions to the defects at the ends of the fibers, thus promoting anisotropic growth leading to fiber formation. Consistent with experimental observations, the growth of the fiber thus continues until the nanofiber reaches the free interface of the LC (where the defect is eliminated) or the monomer is depleted. In the former case, the length of the polymer fiber is limited by the thickness of the LC film; in the latter, the fiber length is smaller than the thickness of the LC film. This conclusion is supported by experimental results (previously discussed in the context of FIGS. 15A-15B and 16A-16C). This mechanism is consistent with observations for how the profile of the LC director templates the shape of the nanofiber: global deformations in the director profile, such as those arising from the hybrid-aligned LC films or cholesteric LCs, affect the position of the defect core at the end of the growing nanofiber and thus cause growth of the nanofiber along the director.

To provide experimental support for this proposed mechanism of fiber formation, CVD polymerization is performed onto films of E7 containing polystyrene (PS) particles. The particles are obtained from Sigma-Aldrich (St. Louis, Mo.) and have an average diameter of 10.0±0.2 µm. TEM grids supported onto OTS-coated glass substrates are used to contain the particle-loaded LC films. As detailed above, the LC director adopts a uniform homeotropic orientation at the interface with the OTS-coated substrate and at the free interface. The PS particles induce planar anchoring of the LC director, however, the resulting director deformation around the particle leads the formation of a pair of point defects (boojums) in the LC located at opposite ends of the particle. (See FIGS. 34A-34B). Upon imaging of the particle-loaded LC with a light microscope equipped with crossed-polars, the areas of the LC that did not contain particles appeared black, consistent with the uniform homeotropic alignment of the LC along the thickness of the film. However, areas of the LC associated with the PS particles appeared white with two dark lines going across the particle (See FIG. 34C). The birefringence of this sample is associated with the tilt of the LC director surrounding the PS particle away from the orientation perpendicular to the free interface. The PS is amorphous and does not exhibit birefringence. To confirm the orientation of the LC around the particle, the sample is imaged using a quarter-wave plate. As shown in FIG. 34D, the bottom left and top right areas of the image associated with the particle appeared blue, while the bottom right and top left areas of the image of the particle appeared red. The blue domains indicate that the LC director is aligned is the direction of the slow axis ($\gamma$) of the quarter-wave plate, while the red areas indicate that the LC director aligns perpendicular to the slow axis of the plate. The experimentally-determined orientation of the LC around the particle is consistent with the schematic presented in FIG. 34B. Thus, the boojum defect is expected to be located at the center of the particle shown in FIG. 34D, where the colored domains intercept.

According the model presented above, the pair of boojum defects at opposite ends of the PS particle could serve as preferential locations for polymer nucleation during CVD polymerization, leading to the formation of single fibers at opposite ends of the particle. This hypothesis is tested by carrying CVD polymerization onto the particle-loaded LCs presented above. The CVD polymerization is carried according to the procedures described in the previous sections using 0.3 mg of the precursor. The LC is evaporated by heating the samples to 70° C. under vacuum (0.1 mbar) for several hours.

Representative SEM images of PS-particles after CVD polymerization and subsequent evaporation of the LC are presented in FIGS. 35A-35C and 36A-36D. As shown in FIG. 35A, several elongated structures extending from the surface of the particles are observed. In this image, the structures extending from the top and bottom of the particle (highlighted by the white dotted circles) coincide with the expected locations of the boojum defects on the LC (see FIG. 34A). These structures have a much wider diameter than the nanofibers presented above and do not seem to possess the fibrous-like morphology that characterized the bundles of nanofibers. The diameter of the structure atop the particle varies from 2.5 µm to 3.6 µm, while the diameter of the structure at the bottom of the particle varies from 1 µm to 0.8 µm. High magnification images of these structures (FIGS. 35A-35C) reveal that these elongated polymer structures branch to form bundles of nanofibers. Although these structures extend from locations in the particle that coincide with the location of the boojum defects on the LC, two other elongated structures (highlighted by red dotted circles in FIG. 35A), are also positioned at locations in the particle that do not coincide with the expected location of boojum defects. As shown in FIGS. 36A-36D, all of the observed particles exhibit similar characteristics, with multiple structures extending from the PS particle. In view of these results, further experiments may be necessary to fully understand and characterize the mechanism for the formation of nanofibers via CVD polymerization onto LC films.

The mechanism described above invokes the existence of a surface-induced defect in the LC that guides the direction of polymerization. To form a defect, surface energy interactions must exceed the elastic energy penalty associated with straining of the LC in the vicinity of the defect, thus setting a minimum fiber size that leads to a defect of the order of approximately K/W, where K is the splay elastic constant of the LC and W is the anchoring strength of the LC at the interface with the polymer particle. K and W are material constants that depend on the chemical identity of the LC and polymer. Because the formation of a boojum defect atop the polymer nanofiber initiates anisotropic polymerization during CVD according to the proposed model (in the absence of a defect, isotropic polymerization and enlargement of the growing polymer particle is expected), it is believed that a critical threshold size of the nanofiber at which this boojum defect forms influences determines the final diameter of the fiber. Thus, a value for each LC will likely be correlated to the average diameter of the fibers resulting from CVD polymerization on the different LCs.

The frequency distributions for the diameter of fibers fabricated by CVD polymerization of PPX-CH$_2$OH on three different LCs are assessed as is shown in FIG. 18. The average diameters for these fibers are: 141±11 nm for fibers grown in 5CB, 86±9 nm for fibers grown in E7 and 67±9 nm for fibers grown in TL205. Reports from literature provide values for the splay elastic constant of these LCs: 6 pN for 5CB, 12 pN for E7 and 17 pN for TL205. Thus, from results, the values of the anchoring energies on the surface of PPX-CH$_2$OH are predicted to be 85 µJ/m$^2$ for 5CB, 280 µJ/m$^2$ for E7 and 507 µJ/m$^2$ for TL205.

Mats of nanofibers surface-functionalized with fluorophore-labeled biomolecules.

Mats of nanofibers formed in accordance with the present disclosure are used for the selective immobilization of a single or multiple types of biomolecules. In the first set of experiments, the fibers containing hydroxyl terminated side groups are functionalized with a fluorophore-labeled protein complex (strapavidin-Alexafluor647). In brief, glass slides coated with homogeneous films of PPX-CH$_2$OH are used to support TEM grids loaded with nematic E7, and CVD polymerization of PPX-CH$_2$OH is carried into these LC films to form the mats of nanofibers according to the procedure described above. Afterwards, the LC is removed by submerging these samples in a bath of ethanol. The TEM grid is removed manually from the surface. The fiber containing samples are then incubated into an aqueous solution containing dPEG®$_{48}$-biotin acid (biotin-PEG-COOH), 1-Ethyl-3-(3-dimethylaminopropyl)carbodiimide (EDC) and N-hydroxysulfosuccinimide (sulfo-NHS). The biotin-containing probes bind to the PPX-CH$_2$OH via carbodiimide (EDC) cross-linking chemistry, in which the —COOH groups on the biotin probes form ester bonds with the —OH groups on the polymer nanofibers and film. The resulting biotin-functionalized fibers are then incubated in a solution of strapavidin-Alexafluor647, a fluorophore-labeled protein that readily binds to biotin. See FIG. 37 for a schematic illustration of the procedure and conditions used for the functionalization of the nanofiber mats, where the surface of the substrate is patterned with PPX-CH$_2$OH fibers inside the square regions and PPX-CH$_2$OH film outside the square regions.

Images of the mats of nanofibers functionalized with the protein fluorophore are obtained by epifluorescence microscopy and shown in FIG. 38A. From this image, it can be readily observed that the areas of the sample containing the mats of fibers (purple squares) have a higher fluorescence intensity than those areas outside the mats, even though both surfaces are composed of PPX-CH$_2$OH functionalized with strapavidin-Alexafluor647. To quantitatively characterize this difference in fluorescence intensity in the regions within the mats of nanofibers and outside, the image processing software ImageJ is used. The results for the normalized fluorescence intensity of the image are presented in FIG. 38B. This plot shows that the mean fluorescence signal is 15 times stronger on the regions of the sample covered with nanofibers as compared to the regions without nanofibers, indicating that the nanofiber mats provide a much higher surface area than the unstructured polymer film. The higher surface area of the nanofiber mats allows them to bind to a significantly larger number of biotin probes, enabling surface higher loadings of the fluorophore-labeled streptavidin protein.

To verify that the streptavidin is specifically bound to the fibers (as opposed to physically adsorbed), a control experiment is performed in which the mats of nanofibers are incubated in biotin-PEG-COOH in the absence of EDC/NHS (the reagents required for the EDC click chemistry) and subsequently incubated the surface in alexafluor647-conjugated streptavidin. For this sample, only minimal fluorescence on the PPX-CH$_2$OH nanofiber mats (FIG. 39) is observed. This control experiment supports the conclusion that the functionalization of the hydroxyl groups on the fibers enables covalent attachment of the biotin to the surfaces of the fibers.

The incorporation of mixtures of two reactive groups (—CH$_2$OH and —C≡CH) into the nanofibers is also shown. By extending the chemical functionality of the nanofibers to include the alkyne group, the range of molecules that can selectively attach at the surface of the nanofibers is extended. To fabricate fibers containing both the hydroxyl and alkyne groups, an equal mass of 4-hydroxymethyl [2,2]paracyclophane dimer and 4-ethynyl [2,2]paracyclophane dimer are introduced simultaneously during the CVD polymerization onto TL205 films supported on TEM grids. The reaction conditions are identical to those discussed above. The resulting mats of nanofibers are characterized by FTIR. For comparison, the FTIR spectra of unstructured films (blue trace) and nanofibers (red trace) contain only PPX-CH$_2$OH (FIG. 40A) or PPX-C≡CH (FIG. 40B). As discussed in the above, the peaks at 1020, 3350 and 3600 cm-1 are associated with the hydroxyl group, while the peaks at 3325 cm$^{-1}$ and 2126 cm$^{-1}$ are associated with the alkyne group. In FIG. 40C, the FTIR spectra for the unstructured films and nanofibers contain both —C≡CH and —CH$_2$OH functional groups. In these spectra, multiple peaks are observed consistent with the successful incorporation of both —CH$_2$OH (peaks at 1020, 3350 and 3600 cm$^{-1}$) and —C≡CH (3325 cm$^{-1}$ and 2126 cm$^{-1}$).

When the alkyne containing dimer is used for the CVD polymerization into TL205, the resulting nanofibers exhibit a uniform diameter throughout the length of the fiber. As discussed previously, the polymerization of PPX-CH$_2$OH alone into TL205 results in fibers that have a significantly enlarged diameter at the free end of the fiber. It is hypothesized that the different fiber morphologies are the result of the different miscibility properties between hydroxyl-containing diradical monomer and the alkyne-containing diradical monomer in the environment of nematic TL205.

Next, the copolymer nanofibers are functionalized with different molecules, a biotin probe and an azide-Alexafluor596 probe, which selectively bind to the —CH$_2$OH and —C≡CH groups, respectively, present in the fibers. The details for the biotinylation procedure are described above. In order to visualize the presence of biotin probes on the fibers, the mats of nanofibers are functionalized with streptavidin-Alexafluor647 according to the procedure above. For the functionalization of nanofibers with azide-Alexafluor596, the substrate containing patterned areas of nanofibers are submerged on an aqueous solution containing 0.1% of azide-Alexafluor596. This azide-containing molecule binds to the alkyne groups in the fiber via click chemistry.

A schematic for the reaction scheme is shown in FIG. 41A. The presence of both fluorophores on the mats of nanofibers is confirmed by imaging the samples via epifluorescence microscopy (see FIGS. 41B-41C). Surfaces functionalized with the azide-Alexafluor596 appears orange-red when observed under the fluorescence microscope (FIG. 41B), confirming the reactivity of the —C≡CH groups in the nanofibers. In contrast, the presence of the streptavidin-Alexafluor647 is confirmed by the bright purple colors observed in FIG. 41C.

Accordingly, different types of biomolecules can be chemically attached to the surface of the nanofibers, for example, those containing hydroxyl and alkyne groups. The range of biomolecules than can interact with the nanofibers can be easily expanded by CVD polymerization of PPX containing other functional groups such as amines, aldehydes, imides, and the like. Dimer precursors containing these functional groups can be used to produce mats of nanofibers containing these reactive groups. These high-surface-area mats of nanofibers can be used in various applications for molecular recognition of a range of biologically relevant compounds such as proteins (as demonstrated here), peptides, saccharides, nucleic acids, fatty acids, and the like.

Formation of Fibers on Complex Geometries.

Methods of fabrication of nanofibers provided by the present disclosure enable fibers to be formed on the surfaces of materials and devices with complex geometries. Here the formation of nanofibers within the pores (area 100 μm×100 μm) of stainless steel (SS) grid or mesh is provided. For this experiment, a drop of E7 is spread onto a SS mesh using a pipette tip such that the LC filled inside the pores of the mesh. In FIG. 42A, a PLM image of an SS grid with regions filled with LC is shown, which appears as bright squares with dark cross in the center due to the birefringence of E7. Mesh pores that did not contain LC (bottom of image) appear black. To visualize both regions with and without LC simultaneously, the LC-containing mesh is imaged using a quarter-wave plate (see FIG. 42B). In FIG. 42B, the bottom pores without LC have a uniform pink color while the metal mesh appears dark. The pores filled with LC exhibit different colors which provide information on the director orientation of the LC inside the pores. The pink color at the center of the pore, consistent with the black cross observed in FIG. 42A, indicates that the director orientation is perpendicular to the plane of the image. In contrast, the blue color at the top right and bottom left corners of the pores, and orange color at the top left and bottom right corners, indicate that the LC director is slightly tilted into the plane of the image. In particular, the blue color indicates that the director orientation tilts parallel to the slow axis of the quarter-wave plate while the red color indicates that the tilt is in the direction perpendicular to the slow axis of the plate. The slow axis of the plate (indicated in the bottom left corner of FIG. 42B, is oriented from bottom left to top right of the image.

The CVD polymerization of PPX-CH$_2$OH is carried on these samples according to the procedures outlined above. As shown in FIG. 42C, the appearance of the LC films inside the pores of the mesh after CVD polymerization is markedly different than previous to CVD polymerization (compare FIGS. 42A and 42C). After CVD polymerization, the LC within the pore of the mesh had a uniform gold color, indicating that the director of the LC is oriented in the plane of the image throughout the area of the pores. This result suggests that CVD polymerization altered the director profile of the LC film within the pores of the mesh. The image of the LC after CVD polymerization using the quarter-wave plate is presented in FIG. 42D. The red and blue colors that are observed in the LC previously are not observed after CVD polymerization. Afterwards, the LC is removed by submerging the meshes in a bath of ethanol and imaged again with a PLM. As shown in FIG. 42E, the areas of the mesh previously filled with LC still exhibit birefringence, appearing white when viewed through crossed polarized light. In contrast, the areas that did not contain LC previous to CVD polymerization appeared black. As discussed previously, the residual birefringence observed in areas previously filled with LC is associated with the formation of nanofibers. Further evidence for the formation of the nanofibers within the pores of the mesh will be presented below. Confirming the observations of fiber formation described above, the fibers are firmly attached to the surface of the SS mesh and their length spanned the area of the pore, suggesting that the fibers nucleated at the LC-interface with the SS mesh and grew into the void of the pores. Although prior to CVD polymerization the LC director orientation is perpendicular to the plane of the image at the center of the pore of the mesh, the fibers are not observed to follow this orientation. Instead, the orientation of the fibers is parallel to the plane of the image, as confirmed by the images using a quarter-wave plate (FIG. 42F). The red colors in this image indicate that the local orientation of the fibers is perpendicular to the slow axis of the quarter-wave plate. In this complex geometry, the formation of the growing polymer fiber changes the orientation of the director at the center of the pore of the SS mesh.

To further confirm the formation of the nanofibers within the pores of the mesh previously filled with LC, these samples are imaged with SEM. A low magnification image of these fibers is shown in FIG. 42G (scale is 100 µm), which confirms that the regions where the fibers are formed coincide with the regions filled with LC. In contrast, pores of the mesh that are not filled with LC prior to CVD polymerization did not contain nanofibers. This experiment demonstrates that the mats of nanofibers can be readily fabricated on complex geometries, and since the fibers will only appear on regions coated with LC, various areas within a material or geometry can be selectively patterned with nanofibers. The mats of nanofibers could find applications in filtration or separation systems, where the high surface area of the mats can be advantageous for efficient and rapid performance.

In FIG. 42H, a high magnification SEM image of the nanofibers contained within the pore of the mesh is shown. It is noted that the orientation of the fibers is parallel to the plane of the image, confirming the observations discussed previously that, in this geometry, the orientation of the fibers did not follow the initial LC director orientation prior to CVD polymerization.

In summary, the fabrication of mats of nanofibers via CVD polymerization of substituted PPX into micrometer-thick films of LCs is provided by certain aspects of the present disclosure. The present teachings establish that the anisotropic environment of the LC permits the anisotropic polymerization of the PPX into fibers with nanometer-scale diameters. These results suggest that other structured fluids, such as colloids and surfactant solutions, may also serve as templates for the CVD-based synthesis of a diverse family of nanostructures. Controlling the orientation of the LC director leads to control of the shape of the nanofibers. Furthermore, chiral mats of nanofibers can be fabricated using cholesteric LCs in accordance with certain aspects of the present teachings. Finally, the present disclosure provides methods for successful functionalization of nanostructures, such as mats of nanofibers, with various biomolecules and the growth of nanofibers in complex geometries. In this manner, chemically- and biologically-active surfaces are formed that can be used in various applications related to biomedicine.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of creating a polymeric nanofiber comprising:
introducing at least one reactive monomer subjected to vacuum conditions into a reaction chamber having a substrate, wherein a structured fluid is disposed over one or more exposed areas of the substrate and the at least one reactive monomer polymerizes through the structured fluid onto the substrate to form the polymeric nanofiber on the substrate.

2. The method of claim 1, further comprising removing the structured fluid.

3. The method of claim 1, wherein at least one of a shape, an orientation, or a chirality of the polymeric nanofiber is manipulated by modifying an orientation of the structured fluid.

4. The method of claim 1, wherein the structured fluid assumes a liquid crystalline phase as the polymeric nanofiber is formed.

5. The method of claim 4, wherein the structured fluid comprises thermotropic liquid crystals and at least one of a shape or an orientation of the polymeric nanofiber is manipulated by modifying a temperature of the structured fluid.

6. The method of claim 4, wherein the nanofiber has a diameter of greater than or equal to about 50 nanometers (nm) to less than or equal to about 500 nanometers (nm) and a length of greater than or equal to about 200 nanometers (nm) to less than or equal to about 100 micrometers (μm).

7. The method of claim 1, wherein the polymeric nanofiber is a plurality of nanofibers that form an array of aligned nanofibers on the substrate.

8. The method of claim 1, wherein a thickness of the structured fluid is substantially equal to a length of the nanofiber formed.

9. The method of claim 1, further comprising reacting a reactive functional group on a surface of the polymeric nanofiber with a second reactive functional group on a moiety to conjugate the moiety to the surface.

10. The method of claim 1, wherein the structured fluid comprises a liquid crystalline phase selected from the group consisting of: a nematic phase, a smectic phase, a C*-smectic phase, a blue phase, and combinations thereof.

11. The method of claim 1, wherein the structured fluid comprises calamitic liquid crystals.

12. The method of claim 1, wherein the structured fluid further comprises a chiral dopant to form a cholesteric liquid crystal, so that polymeric nanofiber exhibits chirality.

13. The method of claim 1, wherein the reactive monomer is derived from a [2,2]-paracyclophane.

14. The method of claim 13, further comprising sublimating a precursor comprising a substituted [2,2]-paracyclophane under vacuum; and
introducing the precursor into a heat source having a temperature of greater than or equal to about 500° C. to less than or equal to about 800° C. to pyrolyze the precursor to form the at least one paracyclophane reactive monomer.

15. The method of claim 1, wherein the reactive monomer is derived from a 1,4-xylylene.

16. A method of making a plurality of polymeric nanofibers comprising:
introducing at least one paracyclophane reactive monomer into a chemical vapor deposition chamber onto one or more regions of a surface of a substrate coated with a structured fluid, so as to conduct anisotropic polymerization of the one paracyclophane reactive monomer from the one or more regions of the substrate through the structured fluid; and
removing the structured fluid to form a plurality of polymeric nanofibers on the one or more regions of the substrate.

17. The method of claim 16, wherein the structured fluid comprises a liquid crystalline phase and at least one of a shape, an orientation, or a chirality of the plurality of polymeric nanofibers is manipulated by controlling a director profile of liquid crystals in the structured fluid.

18. The method of claim 16, wherein the structured fluid comprises thermotropic liquid crystals and at least one of a shape or an orientation of the plurality of polymeric nanofibers is manipulated by modifying a temperature of the structured fluid.

19. The method of claim 16, wherein the plurality of nanofibers has an average diameter of greater than or equal to about 50 nanometers (nm) to less than or equal to about 500 nanometers (nm) and a length of greater than or equal to about 200 nanometers (nm) to less than or equal to about 100 micrometers (μm).

20. The method of claim 16, wherein the plurality of nanofibers forms an array of aligned nanofibers on the substrate.

21. The method of claim 16, wherein a thickness of the structured fluid is substantially equal to an average length of the plurality of nanofibers formed.

22. The method of claim 16, further comprising reacting a reactive functional group on a surface of the plurality of polymeric nanofibers with a second reactive functional group on a moiety to conjugate the moiety to the respective surfaces.

23. The method of claim 16, wherein the structured fluid comprises a liquid crystalline phase selected from the group consisting of: a nematic phase, a smectic phase, a C*-smectic phase, a blue phase, and combinations thereof.

24. The method of claim 16, wherein the structured fluid further comprises a chiral dopant to form a cholesteric liquid crystal, so that polymeric nanofiber exhibits chirality.

25. The method of claim 16, further comprising sublimating a precursor comprising a substituted [2,2]-paracyclophane under vacuum; and
introducing the precursor into a heat source having a temperature of greater than or equal to about 500° C. to less than or equal to about 800° C. to pyrolyze the precursor to form the at least one paracyclophane reactive monomer.

* * * * *